United States Patent
Meyer et al.

(10) Patent No.: US 12,170,579 B2
(45) Date of Patent: Dec. 17, 2024

(54) USER INTERFACES FOR MULTI-PARTICIPANT LIVE COMMUNICATION

(71) Applicant: Apple Inc., Cupertino, CA (US)

(72) Inventors: Adam Stern Meyer, Cupertino, CA (US); Durrell Bishop, London (GB); James H. Foster, Oxfordshire (GB); Peter C. Tsoi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/684,843

(22) Filed: Mar. 2, 2022

(65) Prior Publication Data

US 2022/0286314 A1 Sep. 8, 2022

Related U.S. Application Data

(60) Provisional application No. 63/157,503, filed on Mar. 5, 2021.

(51) Int. Cl.
*H04L 12/18* (2006.01)
*G06F 3/01* (2006.01)
*H04N 7/14* (2006.01)
*H04N 7/15* (2006.01)

(52) U.S. Cl.
CPC .......... *H04L 12/1831* (2013.01); *G06F 3/013* (2013.01); *H04L 12/1827* (2013.01); *H04N 7/147* (2013.01); *H04N 7/15* (2013.01)

(58) Field of Classification Search
CPC . G06F 3/013; H04L 12/1827; H04L 12/1831; H04N 7/147; H04N 7/15
See application file for complete search history.

(56) References Cited

U.S. PATENT DOCUMENTS

| | | |
|---|---|---|
| 5,617,526 A | 4/1997 | Oran et al. |
| 6,726,094 B1 | 4/2004 | Rantze et al. |
| 6,728,784 B1 | 4/2004 | Mattaway |
| 6,731,308 B1 | 5/2004 | Tang et al. |
| 7,185,054 B1 | 2/2007 | Ludwig et al. |
| 7,571,014 B1 | 8/2009 | Lambourne et al. |
| 7,801,971 B1 | 9/2010 | Amidon et al. |
| 7,903,171 B2 | 3/2011 | Takabatake et al. |
| 8,169,463 B2 | 5/2012 | Enstad et al. |
| 8,274,544 B2 | 9/2012 | Kurtz et al. |
| 8,370,448 B2 | 2/2013 | Galchev |
| 8,462,961 B1 | 6/2013 | Bywaters et al. |

(Continued)

FOREIGN PATENT DOCUMENTS

| | | |
|---|---|---|
| AU | 2015100713 A4 | 6/2015 |
| CA | 2845537 A1 | 9/2014 |

(Continued)

OTHER PUBLICATIONS

Applicant-Initiated Interview Summary received for U.S. Appl. No. 17/476,404, dated Jun. 2, 2023, 2 pages.

(Continued)

*Primary Examiner* — Thomas J Dailey
(74) *Attorney, Agent, or Firm* — DLA Piper LLP (US)

(57) ABSTRACT

The present disclosure generally relates to methods and user interfaces for managing live communication between multiple participants using a computer system in accordance with some embodiments.

55 Claims, 29 Drawing Sheets

(56) References Cited

U.S. PATENT DOCUMENTS

| | | |
|---|---|---|
| 8,914,752 B1 | 12/2014 | Spiegel |
| 9,185,062 B1 | 11/2015 | Yang et al. |
| 9,253,531 B2 | 2/2016 | Relyea et al. |
| 9,380,264 B1 | 6/2016 | Vakalapudi |
| 9,445,048 B1 | 9/2016 | Nariyawala et al. |
| 9,462,017 B1 | 10/2016 | Siracusano, Jr. |
| 9,635,314 B2 | 4/2017 | Barkley et al. |
| 9,800,951 B1 | 10/2017 | Carlson et al. |
| 9,819,877 B1 | 11/2017 | Faulkner et al. |
| 9,992,450 B1 | 6/2018 | Yuan et al. |
| 10,157,040 B2 | 12/2018 | Ballinger et al. |
| 10,194,189 B1 | 1/2019 | Goetz et al. |
| 10,270,983 B1 | 4/2019 | Van Os et al. |
| 10,284,812 B1 | 5/2019 | Van Os et al. |
| 10,300,394 B1 | 5/2019 | Evans et al. |
| 10,339,769 B2 | 7/2019 | Mixter et al. |
| 10,353,532 B1 | 7/2019 | Holz et al. |
| 10,362,272 B1 | 7/2019 | Van Os et al. |
| 10,389,977 B1 | 8/2019 | Van Os et al. |
| 10,410,426 B2 | 9/2019 | Kamini et al. |
| 10,523,625 B1 | 12/2019 | Allen et al. |
| 10,523,976 B2 | 12/2019 | Hemmati et al. |
| 10,645,294 B1 | 5/2020 | Manzari et al. |
| 10,757,366 B1 | 8/2020 | Kwatra et al. |
| 10,771,740 B1 | 9/2020 | Reynolds et al. |
| 10,771,741 B1 | 9/2020 | Reynolds et al. |
| 10,783,883 B2 | 9/2020 | Mixter et al. |
| 10,909,586 B2 | 2/2021 | Avedissian et al. |
| 10,924,446 B1 | 2/2021 | Paul |
| 10,929,099 B2 | 2/2021 | Querze et al. |
| 10,963,145 B1 | 3/2021 | Voss et al. |
| 10,972,655 B1 | 4/2021 | Ostap et al. |
| 11,012,575 B1 | 5/2021 | Leblang et al. |
| 11,079,913 B1 | 8/2021 | Kim et al. |
| 11,144,885 B2 | 10/2021 | Rosenberg |
| 11,164,113 B2 | 11/2021 | Howard |
| 11,164,580 B2 | 11/2021 | Kraker |
| 11,212,449 B1 | 12/2021 | Manzari et al. |
| 11,258,619 B2 | 2/2022 | Libin |
| 11,283,916 B2 | 3/2022 | Coffman et al. |
| 11,290,687 B1 | 3/2022 | Becchetti |
| 11,316,709 B2 | 4/2022 | Brown et al. |
| 11,343,613 B2 | 5/2022 | Gordon et al. |
| 11,360,634 B1 | 6/2022 | Chang et al. |
| 11,449,188 B1 | 9/2022 | Chang et al. |
| 11,523,166 B1 | 12/2022 | Tu et al. |
| 11,726,647 B2 | 8/2023 | Kim |
| 2001/0030597 A1 | 10/2001 | Inoue et al. |
| 2001/0041007 A1 | 11/2001 | Aoki |
| 2002/0101446 A1 | 8/2002 | Tang et al. |
| 2003/0112938 A1 | 6/2003 | Kanakubo et al. |
| 2003/0160861 A1 | 8/2003 | Barlow et al. |
| 2003/0225836 A1 | 12/2003 | Lee et al. |
| 2004/0003040 A1 | 1/2004 | Beavers et al. |
| 2004/0239763 A1 | 12/2004 | Notea et al. |
| 2005/0015286 A1 | 1/2005 | Rudnik et al. |
| 2005/0099492 A1 | 5/2005 | Orr |
| 2005/0124365 A1 | 6/2005 | Balasuriya et al. |
| 2005/0144247 A1 | 6/2005 | Christensen et al. |
| 2005/0233780 A1 | 10/2005 | Jani et al. |
| 2006/0002315 A1 | 1/2006 | Theurer et al. |
| 2006/0002523 A1 | 1/2006 | Bettis et al. |
| 2006/0098085 A1 | 5/2006 | Nichols et al. |
| 2006/0098634 A1 | 5/2006 | Umemoto et al. |
| 2006/0158730 A1 | 7/2006 | Kira |
| 2007/0004389 A1 | 1/2007 | Wallace et al. |
| 2007/0124783 A1 | 5/2007 | Ahiska et al. |
| 2008/0074049 A1 | 3/2008 | Kitai et al. |
| 2008/0122796 A1 | 5/2008 | Jobs et al. |
| 2008/0129844 A1 | 6/2008 | Cusack et al. |
| 2008/0313278 A1 | 12/2008 | Hochberg |
| 2009/0007017 A1 | 1/2009 | Anzures et al. |
| 2009/0046075 A1 | 2/2009 | Kim et al. |
| 2009/0117936 A1 | 5/2009 | Maeng |
| 2009/0164587 A1 | 6/2009 | Gavita et al. |
| 2009/0174763 A1 | 7/2009 | Bengtsson et al. |
| 2009/0183125 A1 | 7/2009 | Magal et al. |
| 2009/0228938 A1 | 9/2009 | White et al. |
| 2009/0249244 A1 | 10/2009 | Robinson et al. |
| 2009/0256780 A1 | 10/2009 | Small et al. |
| 2009/0262206 A1 | 10/2009 | Park |
| 2009/0287790 A1 | 11/2009 | Upton et al. |
| 2009/0309897 A1 | 12/2009 | Morita et al. |
| 2010/0011065 A1 | 1/2010 | Scherpa et al. |
| 2010/0039498 A1 | 2/2010 | Liu et al. |
| 2010/0040292 A1 | 2/2010 | Clarkson |
| 2010/0085416 A1 | 4/2010 | Hegde et al. |
| 2010/0097438 A1 | 4/2010 | Ujii |
| 2010/0121636 A1 | 5/2010 | Burke et al. |
| 2010/0162171 A1 | 6/2010 | Felt et al. |
| 2010/0169435 A1 | 7/2010 | Osullivan et al. |
| 2010/0177156 A1 | 7/2010 | Kim et al. |
| 2010/0247077 A1 | 9/2010 | Yamamoto et al. |
| 2010/0251119 A1 | 9/2010 | Geppert et al. |
| 2010/0251158 A1 | 9/2010 | Geppert et al. |
| 2010/0318928 A1 | 12/2010 | Neuman et al. |
| 2010/0318939 A1 | 12/2010 | Moon |
| 2011/0085017 A1 | 4/2011 | Robinson et al. |
| 2011/0107216 A1 | 5/2011 | Bi |
| 2011/0115875 A1 | 5/2011 | Sadwick et al. |
| 2011/0126148 A1 | 5/2011 | Krishnaraj et al. |
| 2011/0161836 A1 | 6/2011 | Mu et al. |
| 2011/0164032 A1 | 7/2011 | Shadmi |
| 2011/0193995 A1 | 8/2011 | Goh et al. |
| 2011/0249073 A1 | 10/2011 | Cranfill et al. |
| 2011/0249086 A1 | 10/2011 | Guo et al. |
| 2011/0252146 A1 | 10/2011 | Santamaria et al. |
| 2011/0273526 A1 | 11/2011 | Mehin et al. |
| 2011/0296163 A1 | 12/2011 | Abernethy et al. |
| 2012/0002001 A1 | 1/2012 | Prentice |
| 2012/0019610 A1 | 1/2012 | Hornyak et al. |
| 2012/0033028 A1 | 2/2012 | Murphy et al. |
| 2012/0054278 A1 | 3/2012 | Taleb et al. |
| 2012/0062784 A1 | 3/2012 | Van et al. |
| 2012/0092436 A1 | 4/2012 | Pahud et al. |
| 2012/0114108 A1 | 5/2012 | Katis et al. |
| 2012/0173383 A1 | 7/2012 | Badawiyeh et al. |
| 2012/0182381 A1 | 7/2012 | Abate et al. |
| 2012/0185355 A1 | 7/2012 | Kilroy |
| 2012/0188394 A1 | 7/2012 | Park et al. |
| 2012/0293605 A1 | 11/2012 | Seferian et al. |
| 2012/0296972 A1 | 11/2012 | Backer |
| 2012/0304079 A1 | 11/2012 | Rideout et al. |
| 2012/0320141 A1 | 12/2012 | Bowen et al. |
| 2013/0055113 A1 | 2/2013 | Chazin et al. |
| 2013/0061155 A1 | 3/2013 | Hon |
| 2013/0070046 A1* | 3/2013 | Wolf .................. G06F 3/013 382/190 |
| 2013/0088413 A1 | 4/2013 | Raffle et al. |
| 2013/0111603 A1 | 5/2013 | Sakai et al. |
| 2013/0132865 A1 | 5/2013 | Li |
| 2013/0151623 A1 | 6/2013 | Weiser et al. |
| 2013/0162781 A1 | 6/2013 | Hubner et al. |
| 2013/0166580 A1 | 6/2013 | Maharajh et al. |
| 2013/0169742 A1 | 7/2013 | Wu et al. |
| 2013/0216206 A1 | 8/2013 | Dubin et al. |
| 2013/0219276 A1 | 8/2013 | Shan |
| 2013/0225140 A1 | 8/2013 | Greisson |
| 2013/0282180 A1 | 10/2013 | Layton |
| 2013/0325949 A1 | 12/2013 | Virani et al. |
| 2013/0328770 A1 | 12/2013 | Parham |
| 2013/0332856 A1 | 12/2013 | Sanders et al. |
| 2014/0018053 A1 | 1/2014 | Cho et al. |
| 2014/0026074 A1 | 1/2014 | Cortes et al. |
| 2014/0043424 A1 | 2/2014 | Gava et al. |
| 2014/0063176 A1 | 3/2014 | Modai et al. |
| 2014/0099004 A1 | 4/2014 | Dibona et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0201126 A1 | 7/2014 | Zadeh et al. |
| 2014/0201632 A1 | 7/2014 | Kunigita et al. |
| 2014/0215356 A1 | 7/2014 | Brander et al. |
| 2014/0215404 A1 | 7/2014 | Kong et al. |

(56) References Cited

U.S. PATENT DOCUMENTS

| | | |
|---|---|---|
| 2014/0218371 A1 | 8/2014 | Du et al. |
| 2014/0218461 A1 | 8/2014 | Deland |
| 2014/0229835 A1 | 8/2014 | Ravine |
| 2014/0247368 A1 | 9/2014 | Chinn |
| 2014/0280812 A1 | 9/2014 | Bealkowski et al. |
| 2014/0331149 A1 | 11/2014 | Labey |
| 2014/0349754 A1 | 11/2014 | Kaneoka et al. |
| 2014/0354759 A1 | 12/2014 | Cranfill et al. |
| 2014/0368719 A1 | 12/2014 | Kaneko et al. |
| 2014/0373081 A1 | 12/2014 | Dodson et al. |
| 2014/0375747 A1 | 12/2014 | Martinez et al. |
| 2015/0033149 A1 | 1/2015 | Kuchoor |
| 2015/0040012 A1 | 2/2015 | Faaborg et al. |
| 2015/0058413 A1 | 2/2015 | Ge |
| 2015/0062158 A1 | 3/2015 | Hildreth et al. |
| 2015/0067541 A1 | 3/2015 | Owens et al. |
| 2015/0070272 A1 | 3/2015 | Kim et al. |
| 2015/0078680 A1 | 3/2015 | Shakib et al. |
| 2015/0085057 A1 | 3/2015 | Ouyang et al. |
| 2015/0095804 A1 | 4/2015 | Grossman et al. |
| 2015/0106720 A1 | 4/2015 | Backer |
| 2015/0116353 A1 | 4/2015 | Miura et al. |
| 2015/0135098 A1 | 5/2015 | Geppert et al. |
| 2015/0177914 A1 | 6/2015 | Coyner et al. |
| 2015/0193196 A1 | 7/2015 | Lin et al. |
| 2015/0206529 A1 | 7/2015 | Kwon et al. |
| 2015/0248167 A1 | 9/2015 | Turbell et al. |
| 2015/0256796 A1 | 9/2015 | Ma |
| 2015/0264304 A1 | 9/2015 | Chastney et al. |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1 | 10/2015 | Bader-natal et al. |
| 2015/0304413 A1 | 10/2015 | Park |
| 2015/0319006 A1 | 11/2015 | Plummer et al. |
| 2015/0319144 A1 | 11/2015 | Barton et al. |
| 2015/0334140 A1 | 11/2015 | Singh et al. |
| 2015/0350143 A1 | 12/2015 | Lemay et al. |
| 2015/0350533 A1 | 12/2015 | Harris et al. |
| 2015/0358484 A1 | 12/2015 | Permude |
| 2015/0358584 A1 | 12/2015 | Mattson |
| 2015/0365306 A1 | 12/2015 | Chaudhri et al. |
| 2015/0370426 A1 | 12/2015 | Carrigan et al. |
| 2015/0373065 A1 | 12/2015 | Holmquist et al. |
| 2015/0373178 A1 | 12/2015 | Felt et al. |
| 2016/0014059 A1 | 1/2016 | Rathod |
| 2016/0014477 A1 | 1/2016 | Siders |
| 2016/0029004 A1 | 1/2016 | Campbell et al. |
| 2016/0057173 A1 | 2/2016 | Singman et al. |
| 2016/0065832 A1 | 3/2016 | Kim et al. |
| 2016/0072861 A1 | 3/2016 | Woolsey et al. |
| 2016/0073185 A1 | 3/2016 | Kannappan et al. |
| 2016/0099901 A1 | 4/2016 | Allen et al. |
| 2016/0099987 A1 | 4/2016 | Shamma |
| 2016/0127636 A1 | 5/2016 | Ito et al. |
| 2016/0139785 A1 | 5/2016 | Griffin et al. |
| 2016/0142450 A1 | 5/2016 | Paul et al. |
| 2016/0180259 A1 | 6/2016 | Marianko et al. |
| 2016/0210602 A1 | 7/2016 | Siddique et al. |
| 2016/0212374 A1 | 7/2016 | Usbergo et al. |
| 2016/0227095 A1 | 8/2016 | Yoshizawa et al. |
| 2016/0231902 A1 | 8/2016 | Sirpal et al. |
| 2016/0259528 A1 | 9/2016 | Foss et al. |
| 2016/0261653 A1 | 9/2016 | Kim |
| 2016/0277708 A1 | 9/2016 | Rintel et al. |
| 2016/0277903 A1 | 9/2016 | Poosala et al. |
| 2016/0291824 A1 | 10/2016 | Grossman et al. |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0316038 A1 | 10/2016 | Jolfaei |
| 2016/0320849 A1 | 11/2016 | Koo |
| 2016/0335041 A1 | 11/2016 | Wachter et al. |
| 2016/0352661 A1 | 12/2016 | Yang et al. |
| 2016/0364106 A1 | 12/2016 | Koum et al. |
| 2016/0380780 A1 | 12/2016 | Stephenson et al. |
| 2017/0006162 A1 | 1/2017 | Bargetzi et al. |
| 2017/0024100 A1 | 1/2017 | Pieper et al. |
| 2017/0031557 A1 | 2/2017 | Xiangli et al. |
| 2017/0034583 A1 | 2/2017 | Long et al. |
| 2017/0048817 A1 | 2/2017 | Yang et al. |
| 2017/0064184 A1 | 3/2017 | Tsai |
| 2017/0083189 A1 | 3/2017 | Yang et al. |
| 2017/0094019 A1 | 3/2017 | Ahmed et al. |
| 2017/0097621 A1 | 4/2017 | Ackmann et al. |
| 2017/0111587 A1 | 4/2017 | Herbst et al. |
| 2017/0111595 A1 | 4/2017 | Soni et al. |
| 2017/0126592 A1 | 5/2017 | El |
| 2017/0150904 A1 | 6/2017 | Park et al. |
| 2017/0206779 A1 | 7/2017 | Lee et al. |
| 2017/0220212 A1 | 8/2017 | Yang et al. |
| 2017/0230585 A1 | 8/2017 | Nash et al. |
| 2017/0230705 A1 | 8/2017 | Pardue et al. |
| 2017/0244932 A1 | 8/2017 | Pistilli et al. |
| 2017/0280494 A1 | 9/2017 | Jung et al. |
| 2017/0309174 A1 | 10/2017 | Gonzales et al. |
| 2017/0324784 A1 | 11/2017 | Taine et al. |
| 2017/0336960 A1 | 11/2017 | Chaudhri et al. |
| 2017/0344253 A1 | 11/2017 | Zhang |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0357917 A1 | 12/2017 | Holmes et al. |
| 2017/0359191 A1 | 12/2017 | Smith et al. |
| 2017/0359285 A1 | 12/2017 | Weinig et al. |
| 2017/0367484 A1 | 12/2017 | Salvoni et al. |
| 2017/0373868 A1 | 12/2017 | Deets, Jr. |
| 2018/0013799 A1 | 1/2018 | Davies |
| 2018/0047200 A1 | 2/2018 | O'Hara et al. |
| 2018/0048820 A1 | 2/2018 | Hinkel et al. |
| 2018/0061158 A1 | 3/2018 | Greene |
| 2018/0070144 A1 | 3/2018 | Tang et al. |
| 2018/0081522 A1 | 3/2018 | Greenberg et al. |
| 2018/0091732 A1 | 3/2018 | Wilson et al. |
| 2018/0095616 A1 | 4/2018 | Valdivia et al. |
| 2018/0101297 A1 | 4/2018 | Yang et al. |
| 2018/0103074 A1 | 4/2018 | Rosenberg |
| 2018/0123986 A1 | 5/2018 | Faulkner et al. |
| 2018/0124128 A1 | 5/2018 | Faulkner et al. |
| 2018/0124359 A1 | 5/2018 | Faulkner |
| 2018/0131732 A1 | 5/2018 | Aronoff et al. |
| 2018/0139374 A1 | 5/2018 | Yu |
| 2018/0157455 A1 | 6/2018 | Troy et al. |
| 2018/0191965 A1 | 7/2018 | Faulkner et al. |
| 2018/0199164 A1 | 7/2018 | Bargetzi et al. |
| 2018/0203577 A1 | 7/2018 | Astavans et al. |
| 2018/0204111 A1 | 7/2018 | Zadeh et al. |
| 2018/0205797 A1 | 7/2018 | Faulkner |
| 2018/0213144 A1 | 7/2018 | Kim et al. |
| 2018/0227341 A1 | 8/2018 | Rizzi |
| 2018/0228003 A1 | 8/2018 | O'Driscoll et al. |
| 2018/0249047 A1 | 8/2018 | Marlatt |
| 2018/0253152 A1 | 9/2018 | Forsblom et al. |
| 2018/0286395 A1 | 10/2018 | Li et al. |
| 2018/0293959 A1 | 10/2018 | Monga et al. |
| 2018/0295079 A1 | 10/2018 | Longo |
| 2018/0308480 A1 | 10/2018 | Jang et al. |
| 2018/0309801 A1 | 10/2018 | Rathod |
| 2018/0332559 A1 | 11/2018 | Gudivada et al. |
| 2018/0338038 A1 | 11/2018 | Ly et al. |
| 2018/0341448 A1 | 11/2018 | Behzadi et al. |
| 2018/0348764 A1 | 12/2018 | Zhang et al. |
| 2018/0359293 A1 | 12/2018 | Faulkner et al. |
| 2018/0364665 A1 | 12/2018 | Clymer et al. |
| 2018/0367483 A1 | 12/2018 | Rodriguez et al. |
| 2018/0367484 A1 | 12/2018 | Rodriguez et al. |
| 2018/0375676 A1 | 12/2018 | Bader-Natal et al. |
| 2019/0005419 A1 | 1/2019 | Howard |
| 2019/0025943 A1 | 1/2019 | Jobs et al. |
| 2019/0028419 A1 | 1/2019 | Sullivan |
| 2019/0034849 A1 | 1/2019 | Romaine et al. |
| 2019/0068670 A1 | 2/2019 | Adam et al. |
| 2019/0102049 A1 | 4/2019 | Anzures et al. |
| 2019/0102145 A1 | 4/2019 | Wilberding et al. |

(56) References Cited

U.S. PATENT DOCUMENTS

| | | |
|---|---|---|
| 2019/0110087 A1 | 4/2019 | Parasseeri et al. |
| 2019/0124021 A1 | 4/2019 | Demattei |
| 2019/0138951 A1 | 5/2019 | Brownhill et al. |
| 2019/0149768 A1 | 5/2019 | McArdle |
| 2019/0149887 A1 | 5/2019 | Williams et al. |
| 2019/0173939 A1 | 6/2019 | Lewis et al. |
| 2019/0199963 A1 | 6/2019 | Ahn et al. |
| 2019/0199993 A1 | 6/2019 | Babu et al. |
| 2019/0205861 A1 | 7/2019 | Bace |
| 2019/0222775 A1 | 7/2019 | Ahn |
| 2019/0228495 A1 | 7/2019 | Tremblay et al. |
| 2019/0236142 A1 | 8/2019 | Balakrishnan et al. |
| 2019/0279634 A1 | 9/2019 | Tak et al. |
| 2019/0297039 A1 | 9/2019 | Rodriguez et al. |
| 2019/0303861 A1 | 10/2019 | Mathias et al. |
| 2019/0332400 A1 | 10/2019 | Spoor et al. |
| 2019/0339769 A1 | 11/2019 | Cox et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0342621 A1 | 11/2019 | Carrigan et al. |
| 2019/0347181 A1 | 11/2019 | Cranfill et al. |
| 2019/0354252 A1 | 11/2019 | Badr |
| 2019/0361575 A1 | 11/2019 | Ni et al. |
| 2019/0361694 A1 | 11/2019 | Gordon et al. |
| 2019/0362555 A1 | 11/2019 | Chen et al. |
| 2019/0370805 A1 | 12/2019 | Van Os et al. |
| 2020/0005539 A1 | 1/2020 | Hwang et al. |
| 2020/0034033 A1 | 1/2020 | Chaudhri et al. |
| 2020/0050502 A1 | 2/2020 | Ghafourifar et al. |
| 2020/0055515 A1 | 2/2020 | Herman et al. |
| 2020/0106952 A1 | 4/2020 | Missig et al. |
| 2020/0106965 A1 | 4/2020 | Malia et al. |
| 2020/0135191 A1 | 4/2020 | Nourbakhsh |
| 2020/0143593 A1 | 5/2020 | Rudman et al. |
| 2020/0152186 A1 | 5/2020 | Koh et al. |
| 2020/0183548 A1 | 6/2020 | Anzures et al. |
| 2020/0186378 A1 | 6/2020 | Six et al. |
| 2020/0195887 A1 | 6/2020 | Van Os et al. |
| 2020/0213530 A1 | 7/2020 | Ahn |
| 2020/0242788 A1 | 7/2020 | Jacobs et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1 | 9/2020 | Marcinkiewicz |
| 2020/0335187 A1 | 10/2020 | Lefkofsky et al. |
| 2020/0383157 A1 | 12/2020 | Lee et al. |
| 2020/0385116 A1 | 12/2020 | Sabripour et al. |
| 2020/0395012 A1 | 12/2020 | Kim et al. |
| 2020/0400957 A1 | 12/2020 | Van Heugten |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0096703 A1 | 4/2021 | Anzures et al. |
| 2021/0097768 A1 | 4/2021 | Malia et al. |
| 2021/0099829 A1 | 4/2021 | Soto et al. |
| 2021/0136129 A1 | 5/2021 | Ponnusamy et al. |
| 2021/0144336 A1 | 5/2021 | Van Os et al. |
| 2021/0152503 A1 | 5/2021 | Rodriguez et al. |
| 2021/0158622 A1 | 5/2021 | Leelaphattarakij et al. |
| 2021/0158830 A1 | 5/2021 | Boehlke |
| 2021/0176204 A1 | 6/2021 | Geppert et al. |
| 2021/0182169 A1 | 6/2021 | Mardente et al. |
| 2021/0195084 A1 | 6/2021 | Olajos et al. |
| 2021/0217106 A1 | 7/2021 | Hauser et al. |
| 2021/0265032 A1 | 8/2021 | Burgess et al. |
| 2021/0266274 A1 | 8/2021 | Liu et al. |
| 2021/0306288 A1 | 9/2021 | Boyd et al. |
| 2021/0321197 A1 | 10/2021 | Annamraju |
| 2021/0323406 A1 | 10/2021 | So et al. |
| 2021/0333864 A1 | 10/2021 | Harvey et al. |
| 2021/0349680 A1 | 11/2021 | Kim et al. |
| 2021/0352172 A1 | 11/2021 | Kim et al. |
| 2021/0360199 A1* | 11/2021 | Oz .................. G06N 3/08 |
| 2021/0373672 A1 | 12/2021 | Schwarz et al. |
| 2021/0409359 A1 | 12/2021 | Eirinberg et al. |
| 2022/0004356 A1 | 1/2022 | Kim et al. |
| 2022/0006946 A1 | 1/2022 | Missig et al. |
| 2022/0021680 A1 | 1/2022 | Roedel et al. |
| 2022/0046186 A1 | 2/2022 | Fayad et al. |
| 2022/0046222 A1 | 2/2022 | Meier |
| 2022/0050578 A1 | 2/2022 | Waldman et al. |
| 2022/0053142 A1 | 2/2022 | Manzari et al. |
| 2022/0100362 A1 | 3/2022 | Kim |
| 2022/0103784 A1 | 3/2022 | Pollefeys |
| 2022/0122089 A1 | 4/2022 | Bonilla Kuhlmann et al. |
| 2022/0244836 A1 | 8/2022 | O'leary et al. |
| 2022/0247587 A1 | 8/2022 | Rolin et al. |
| 2022/0247918 A1 | 8/2022 | O'leary et al. |
| 2022/0247919 A1 | 8/2022 | O'leary et al. |
| 2022/0253136 A1 | 8/2022 | Holder et al. |
| 2022/0254074 A1 | 8/2022 | Berliner et al. |
| 2022/0269882 A1 | 8/2022 | Proschowsky et al. |
| 2022/0278992 A1 | 9/2022 | Baker et al. |
| 2022/0303150 A1 | 9/2022 | Jensen et al. |
| 2022/0343569 A1 | 10/2022 | Karri et al. |
| 2022/0365643 A1 | 11/2022 | Triverio et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0374136 A1 | 11/2022 | Chang et al. |
| 2023/0004264 A1 | 1/2023 | Anzures et al. |
| 2023/0041125 A1 | 2/2023 | Kim et al. |
| 2023/0094453 A1 | 3/2023 | O'leary et al. |
| 2023/0098395 A1 | 3/2023 | O'leary et al. |
| 2023/0109787 A1 | 4/2023 | O'leary et al. |
| 2023/0143275 A1 | 5/2023 | Opara et al. |
| 2023/0188674 A1 | 6/2023 | Van Os et al. |
| 2023/0213764 A1 | 7/2023 | Arngren et al. |
| 2023/0246857 A1 | 8/2023 | Boucheron et al. |
| 2023/0262317 A1 | 8/2023 | O'leary et al. |
| 2023/0319413 A1 | 10/2023 | Manzari et al. |
| 2023/0370507 A1 | 11/2023 | Chang et al. |
| 2024/0036804 A1 | 2/2024 | Chang et al. |
| 2024/0064270 A1 | 2/2024 | Van Os et al. |
| 2024/0064395 A1 | 2/2024 | O'Leary et al. |
| 2024/0103677 A1 | 3/2024 | McKenzie et al. |
| 2024/0104819 A1 | 3/2024 | Chand et al. |
| 2024/0118793 A1 | 4/2024 | Triverio et al. |
| 2024/0259669 A1 | 8/2024 | Missig et al. |

FOREIGN PATENT DOCUMENTS

| | | |
|---|---|---|
| CN | 1689327 A | 10/2005 |
| CN | 1890996 A | 1/2007 |
| CN | 101075173 A | 11/2007 |
| CN | 101431564 A | 5/2009 |
| CN | 101682622 A | 3/2010 |
| CN | 101853132 A | 10/2010 |
| CN | 101854247 A | 10/2010 |
| CN | 101917529 A | 12/2010 |
| CN | 102215217 A | 10/2011 |
| CN | 102572369 A | 7/2012 |
| CN | 102651731 A | 8/2012 |
| CN | 103039064 A | 4/2013 |
| CN | 103222247 A | 7/2013 |
| CN | 103237191 A | 8/2013 |
| CN | 103384235 A | 11/2013 |
| CN | 103442774 A | 12/2013 |
| CN | 103458215 A | 12/2013 |
| CN | 103649985 A | 3/2014 |
| CN | 103718152 A | 4/2014 |
| CN | 103748610 A | 4/2014 |
| CN | 104010158 A | 8/2014 |
| CN | 104081335 A | 10/2014 |
| CN | 104270597 A | 1/2015 |
| CN | 104427288 A | 3/2015 |
| CN | 104469143 A | 3/2015 |
| CN | 104602133 A | 5/2015 |
| CN | 104869046 A | 8/2015 |
| CN | 104980578 A | 10/2015 |
| CN | 105094957 A | 11/2015 |

(56) References Cited

FOREIGN PATENT DOCUMENTS

| | | |
|---|---|---|
| CN | 105141498 A | 12/2015 |
| CN | 105204846 A | 12/2015 |
| CN | 105264473 A | 1/2016 |
| CN | 105389173 A | 3/2016 |
| CN | 105391778 A | 3/2016 |
| CN | 105554429 A | 5/2016 |
| CN | 105900376 A | 8/2016 |
| CN | 106210855 A | 12/2016 |
| CN | 106303648 A | 1/2017 |
| CN | 106471793 A | 3/2017 |
| CN | 106713946 A | 5/2017 |
| CN | 107066523 A | 8/2017 |
| CN | 107122049 A | 9/2017 |
| CN | 107491257 A | 12/2017 |
| CN | 107533417 A | 1/2018 |
| CN | 107534656 A | 1/2018 |
| CN | 107704177 A | 2/2018 |
| CN | 107728876 A | 2/2018 |
| CN | 104025538 B | 4/2018 |
| CN | 107992248 A | 5/2018 |
| CN | 109196825 A | 1/2019 |
| CN | 111108740 A | 5/2020 |
| CN | 112088530 A | 12/2020 |
| EP | 2056568 A1 | 5/2009 |
| EP | 2237536 A1 | 10/2010 |
| EP | 2600584 A1 | 6/2013 |
| EP | 2446619 B1 | 10/2015 |
| EP | 3038427 A1 | 6/2016 |
| EP | 2761582 B1 | 3/2017 |
| EP | 2258103 B1 | 5/2018 |
| EP | 3163866 B1 | 5/2020 |
| IN | 1038MUM2005 A | 6/2007 |
| JP | 2001-67099 A | 3/2001 |
| JP | 2005-94696 A | 4/2005 |
| JP | 2007-150921 A | 6/2007 |
| JP | 2008-99330 A | 4/2008 |
| JP | 2009-502048 A | 1/2009 |
| JP | 2013-524683 A | 6/2013 |
| JP | 2014-71835 A | 4/2014 |
| JP | 2014-87126 A | 5/2014 |
| JP | 2014-170982 A | 9/2014 |
| JP | 2015-11507 A | 1/2015 |
| JP | 2015-170234 A | 9/2015 |
| JP | 2016-1446 A | 1/2016 |
| JP | 2016-38615 A | 3/2016 |
| JP | 2016-157292 A | 9/2016 |
| JP | 2016-167806 A | 9/2016 |
| JP | 2016-174282 A | 9/2016 |
| JP | 2017-228843 A | 12/2017 |
| JP | 2018-7158 A | 1/2018 |
| JP | 2018-56719 A | 4/2018 |
| JP | 2018-200624 A | 12/2018 |
| JP | 2012-244340 A | 5/2024 |
| JP | 2016-53929 A | 5/2024 |
| JP | 2020-510929 A | 5/2024 |
| JP | 2009-265692 A | 6/2024 |
| JP | 2007-300452 A | 7/2024 |
| JP | 2017-532645 A | 7/2024 |
| JP | 2018-136828 A | 7/2024 |
| JP | 2019-114282 A | 7/2024 |
| KR | 10-2017-0128498 A | 11/2017 |
| KR | 10-2018-0085931 A | 7/2018 |
| KR | 10-2019-0033082 A | 3/2019 |
| KR | 10-1989433 B1 | 6/2019 |
| KR | 10-2020-0039030 A | 4/2020 |
| KR | 10-2006-0064326 A | 6/2024 |
| KR | 10-2009-0017901 A | 6/2024 |
| WO | 011/8665 A1 | 3/2001 |
| WO | 2004/032507 A1 | 4/2004 |
| WO | 2005/060501 A2 | 7/2005 |
| WO | 2007/008321 A2 | 1/2007 |
| WO | 2009/005914 A1 | 1/2009 |
| WO | 2010/137513 A1 | 12/2010 |
| WO | 2011/126505 A1 | 10/2011 |
| WO | 2011/146605 A1 | 11/2011 |
| WO | 2011/146839 A1 | 11/2011 |
| WO | 2011/161145 A1 | 12/2011 |
| WO | 2012/037170 A1 | 3/2012 |
| WO | 2012/170118 A1 | 12/2012 |
| WO | 2013/114821 A1 | 8/2013 |
| WO | 2014/052871 A1 | 4/2014 |
| WO | 2014/058937 A1 | 4/2014 |
| WO | 2014/077987 A1 | 5/2014 |
| WO | 2014/168616 A1 | 10/2014 |
| WO | 2016/168154 A1 | 10/2016 |
| WO | 2017/218143 A1 | 12/2017 |
| WO | 2017/218153 A1 | 12/2017 |
| WO | 2018/057272 A1 | 3/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/067131 A1 | 4/2019 |
| WO | 2021/112983 A1 | 6/2021 |

OTHER PUBLICATIONS

Final Office Action received for U.S. Appl. No. 17/483,564, dated May 25, 2023, 26 pages.
Notice of Acceptance received for Australian Patent Application No. 2022201532, dated May 22, 2023, 3 pages.
Office Action received for Chinese Patent Application No. 202110328597.2, dated May 15, 2023.
Office Action received for Indian Patent Application No. 202015013360, dated Mar. 17, 2023, 7 pages.
Abdulezer et al., "Skype for Dummies", Available Online at: https://ixn.es/Skype%20For%20Dummies.pdf, 2007, 361 pages.
Applicant-Initiated Interview Summary received for U.S. Appl. No. 17/483,564, dated Mar. 14, 2022, 2 pages.
Applicant-Initiated Interview Summary received for U.S. Appl. No. 17/483,679, dated Apr. 29, 2022, 2 pages.
Applicant-Initiated Interview Summary received for U.S. Appl. No. 17/484,899, dated Apr. 27, 2022, 5 pages.
Corrected Notice of Allowance received for U.S. Appl. No. 17/027,373, dated Jul. 12, 2022, 2 pages.
Corrected Notice of Allowance received for U.S. Appl. No. 17/121,610, dated Jun. 7, 2022, 4 pages.
Corrected Notice of Allowance received for U.S. Appl. No. 17/121,610, dated Mar. 31, 2022, 3 pages.
Corrected Notice of Allowance received for U.S. Appl. No. 17/121,610, dated May 20, 2022, 4 pages.
Corrected Notice of Allowance received for U.S. Appl. No. 17/157,166, dated Apr. 13, 2022, 4 pages.
Corrected Notice of Allowance received for U.S. Appl. No. 17/157,166, dated Apr. 25, 2022, 4 pages.
Corrected Notice of Allowance received for U.S. Appl. No. 17/157,166, dated Jun. 29, 2022, 4 pages.
Corrected Notice of Allowance received for U.S. Appl. No. 17/483,582, dated Feb. 15, 2022, 2 pages.
Examiner-Initiated Interview Summary received for U.S. Appl. No. 17/027,373, dated Mar. 31, 2022, 4 pages.
Final Office Action received for U.S. Appl. No. 17/476,404, dated May 5, 2022, 30 pages.
Final Office Action received for U.S. Appl. No. 17/483,564, dated Apr. 18, 2022, 23 pages.
Final Office Action received for U.S. Appl. No. 17/483,679, dated May 24, 2022, 21 pages.
Final Office Action received for U.S. Appl. No. 17/484,899, dated May 12, 2022, 29 pages.
HuddleCamHD SimplTrack2 Auto Tracking Camera Installation & Operation Manual, Available Online at: https://huddlecamhd.com/wp-content/uploads/2021/01/SimplTrack2-User-Manual-v1_2-6-20.pdf, Jun. 2020, 41 pages.
Non-Final Office Action received for U.S. Appl. No. 17/483,549, dated Jan. 11, 2022, 5 pages.
Non-Final Office Action received for U.S. Appl. No. 17/483,564, dated Jan. 6, 2022, 23 pages.
Non-Final Office Action received for U.S. Appl. No. 17/483,679, dated Feb. 1, 2022, 19 pages.

(56) References Cited

OTHER PUBLICATIONS

Non-Final Office Action received for U.S. Appl. No. 17/484,899, dated Jan. 24, 2022, 24 pages.
Notice of Acceptance received for Australian Patent Application No. 2021203903, dated May 25, 2022, 3 pages.
Notice of Allowance received for Korean Patent Application No. 10-2020-0123805, dated Jun. 19, 2022, 5 pages (2 pages of English Translation and 3 pages of Official Copy).
Notice of Allowance received for U.S. Appl. No. 17/027,373, dated Jun. 3, 2022, 8 pages.
Notice of Allowance received for U.S. Appl. No. 17/121,610, dated Jul. 7, 2022, 5 pages.
Notice of Allowance received for U.S. Appl. No. 17/121,610, dated Jul. 13, 2022, 4 pages.
Notice of Allowance received for U.S. Appl. No. 17/157,166, dated Mar. 30, 2022, 6 pages.
Notice of Allowance received for U.S. Appl. No. 17/483,549, dated Apr. 15, 2022, 10 pages.
Notice of Allowance received for U.S. Appl. No. 17/483,582, dated Apr. 19, 2022, 5 pages.
Notice of Allowance received for U.S. Appl. No. 17/483,582, dated Jan. 20, 2022, 10 pages.
Office Action received for Chinese Patent Application No. 202010126661.4, dated Jun. 2, 2022, 11 pages (7 pages of English Translation and 4 pages of Official Copy).
Office Action received for Chinese Patent Application No. 202110327012.5, dated Apr. 29, 2022, 17 pages (10 pages of English Translation and 7 pages of Official Copy).
Office Action received for Chinese Patent Application No. 202110328597.2, dated Apr. 15, 2022, 18 pages (9 pages of English Translation and 9 pages of Official Copy).
Office Action received for Chinese Patent Application No. 202110328601.5, dated Apr. 27, 2022, 25 pages (14 pages of English Translation and 11 pages of Official Copy).
Office Action received for Chinese Patent Application No. 202110328602.X, dated Mar. 24, 2022, 6 pages (3 pages of English Translation and 3 pages of Official Copy).
Office Action received for Japanese Patent Application No. 2020-159840, dated Mar. 28, 2022, 6 pages (3 pages of English Translation and 3 pages of Official Copy).
Office Action received for Korean Patent Application No. 10-2021-7017731, dated May 30, 2022, 5 pages (2 pages of English Translation and 3 pages of Official Copy).
10-2018-0085931, KR, A, Cited by the Indian Patent Office in an Office Action for related Patent Application No. 202215025361 dated Mar. 29, 2023.
Intention to Grant received for European Patent Application No. 20166552.8, dated Jun. 29, 2023, 8 pages.
Notice of Allowance received for Australian Patent Application No. 2022228207, dated Jul. 3, 2023, 3 pages.
Notice of Allowance received for U.S. Appl. No. 17/483,564, dated Jul. 17, 2023, 46 pages.
"6. Voice chat with friends through QQ", Online available at: https://v.qq.com/x/page/a0166p7xrt0.html, Sep. 22, 2015, 1 page (Official Copy Only). {See Communication under 37 CFR § 1.98(a) (3)}.
Applicant-Initiated Interview Summary received for U.S. Appl. No. 17/483,564, dated Apr. 21, 2023, 5 pages.
Brief Communication Regarding Oral Proceedings received for European Patent Application No. 20205496.1, dated Apr. 19, 2023, 1 page.
Corrected Notice of Allowance received for U.S. Appl. No. 17/482,977, dated Apr. 24, 2023, 3 pages.
Jiutian Technology, "Windows 8 Chinese version from entry to proficiency", Jan. 1, 2014, 5 pages (Official Copy Only). {See Communication under 37 CFR § 1.98(a) (3)}.
Non-Final Office Action received for U.S. Appl. No. 17/479,897, dated Apr. 25, 2023, 14 pages.
Non-Final Office Action received for U.S. Appl. No. 17/903,946, dated Apr. 14, 2023, 17 pages.

Office Action received for Chinese Patent Application No. 202110327012.5, dated Mar. 16, 2023, 12 pages (7 pages of English Translation and 5 pages of Official Copy).
Office Action received for Chinese Patent Application No. 202110328601.5, dated Mar. 24, 2023, 25 pages (15 pages of English Translation and 10 pages of Official Copy).
Result of Consultation received for European Patent Application No. 20205496.1, dated Apr. 18, 2023, 3 pages.
Song Jianhua, "Guidelines for Network", Feb. 29, 2008, 11 pages (Official Copy Only). {See Communication under 37 CFR § 1.98(a) (3)}.
Androidcentral, "How do I respond to group messages from notification bar?", Available online at: https://forums.androidcentral.com/ask-question/952030-how-do-i-respond-group-messages-notification-bar.html, Mar. 25, 2019, 3 pages.
Applicant Initiated Interview Summary received for U.S. Appl. No. 16/790,619, dated Jul. 28, 2020, 3 pages.
Applicant-Initiated Interview Summary received for U.S. Appl. No. 16/528,941, dated Jun. 19, 2020, 3 pages.
Applicant-Initiated Interview Summary received for U.S. Appl. No. 16/528,941, dated Nov. 10, 2020, 2 pages.
Applicant-Initiated Interview Summary received for U.S. Appl. No. 16/799,481, dated Jul. 24, 2020, 3 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Applicant-Initiated Interview Summary received for U.S. Appl. No. 17/121,610, dated Oct. 29, 2021, 2 pages.
Applicant-Initiated Interview Summary received for U.S. Appl. No. 17/223,794, dated Sep. 7, 2021, 3 pages.
Applicant-Initiated Interview Summary received for U.S. Appl. No. 17/476,404, dated Mar. 18, 2022, 2 pages.
Certificate of Examination received for Australian Patent Application No. 2019100499, dated Aug. 15, 2019, 2 pages.
Certificate of Examination received for Australian Patent Application No. 2019101062, dated Jun. 2, 2020, 2 pages.
Certificate of Examination received for Australian Patent Application No. 2020101324, dated Sep. 7, 2020, 2 pages.
Corrected Notice of Allowance received for U.S. Appl. No. 16/109,552, dated Jun. 13, 2019, 2 pages.
Corrected Notice of Allowance received for U.S. Appl. No. 16/144,572, dated Mar. 21, 2019, 3 pages.
Corrected Notice of Allowance received for U.S. Appl. No. 16/147,432, dated January 18, 2019, 3 pages.
Corrected Notice of Allowance received for U.S. Appl. No. 16/147,432, dated Jul. 16, 2019, 3 pages.
Corrected Notice of Allowance received for U.S. Appl. No. 16/511,578, dated Feb. 13, 2020, 3 pages.
Corrected Notice of Allowance received for U.S. Appl. No. 16/790,619, dated Oct. 13, 2020, 3 pages.
Corrected Notice of Allowance received for U.S. Appl. No. 16/799,481, dated Oct. 27, 2020, 3 pages.
Corrected Notice of Allowance received for U.S. Appl. No. 17/157,166, dated Dec. 9, 2021, 4 pages.
Corrected Notice of Allowance received for U.S. Appl. No. 17/157,166, dated Dec. 15, 2021, 4 pages.
Corrected Notice of Allowance received for U.S. Appl. No. 17/157,166, dated Jan. 5, 2022, 4 pages.
Corrected Search Report and Opinion received for Danish Patent Application No. PA201870364, dated Sep. 5, 2018, 13 pages.
Decision to Grant received for Danish Patent Application No. PA201870362, dated May 15, 2020, 2 pages.
Decision to Grant received for European Patent Application No. 19729395.4, dated Dec. 9, 2021, 2 pages.
Ex-Parte Quayle Action received for U. S. U.S. Appl. No. 17/121,610, mailed on Dec. 9, 2021, 7 pages.
Examiner Initiated-Interview Summary received for U.S. Appl. No. 16/528,941, dated Dec. 1, 2020, 2 pages.
Extended European Search Report received for European Patent Application No. 20166552.8, dated Jun. 12, 2020, 9 pages.
Extended European Search Report received for European Patent Application No. 20205496.1, dated Mar. 11, 2021, 11 pages.

(56) References Cited

OTHER PUBLICATIONS

Final Office Action received for U.S. Appl. No. 16/528,941, dated Jul. 13, 2020, 15 pages.
Final Office Action received for U.S. Appl. No. 17/026,818, dated Jan. 29, 2021, 21 pages.
Intention to Grant received for Danish Patent Application No. PA201870362, dated Feb. 14, 2020, 2 pages.
Intention to Grant received for Danish Patent Application No. PA202070617, dated Nov. 15, 2021, 2 pages.
Intention to Grant received for European Patent Application No. 19729395.4, dated Jul. 23, 2021, 10 pages.
International Preliminary Report on Patentability received for PCT Patent Application No. PCT/US2018/048151, dated Apr. 9, 2020, 14 pages.
International Preliminary Report on Patentability received for PCT Patent Application No. PCT/US2019/031202, dated Nov. 19, 2020, 13 pages.
International Search Report and Written Opinion received for PCT Patent Application No. PCT/US2018/048151, dated Jan. 10, 2019, 23 pages.
International Search Report and Written Opinion received for PCT Patent Application No. PCT/US2019/031202, dated Oct. 4, 2019, 19 pages.
International Search Report and Written Opinion received for PCT Patent Application No. PCT/US2021/031760, dated Sep. 16, 2021, 18 pages.
Invitation to Pay Additional Fees received for PCT Patent Application No. PCT/US2018/048151, dated Nov. 6, 2018, 18 pages.
Invitation to Pay Additional Fees received for PCT Patent Application No. PCT/US2019/031202, dated Aug. 8, 2019, 12 pages.
Minutes of the Oral Proceedings received for European Patent Application No. 19729395.4, mailed on Jul. 21, 2021, 6 pages.
Non-Final Office Action received for U.S. Appl. No. 16/035,422, dated Nov. 30, 2018, 13 pages.
Non-Final Office Action received for U.S. Appl. No. 17/157,166, dated Jul. 9, 2021, 12 pages.
Non-Final Office Action received for U.S. Appl. No. 17/476,404, dated Feb. 8, 2022, 26 pages.
Non-Final Office Action received for U.S. Appl. No. 16/109,552, dated Oct. 17, 2018, 16 pages.
Non-Final Office Action received for U.S. Appl. No. 16/144,572, dated Nov. 30, 2018, 8 pages.
Non-Final Office Action received for U.S. Appl. No. 16/383,403, dated Aug. 23, 2019, 10 pages.
Non-Final Office Action received for U.S. Appl. No. 16/528,941, dated Dec. 7, 2020, 15 pages.
Non-Final Office Action received for U.S. Appl. No. 16/528,941, dated Jan. 30, 2020, 14 pages.
Non-Final Office Action received for U.S. Appl. No. 16/790,619, dated May 4, 2020, 13 pages.
Non-Final Office Action received for U.S. Appl. No. 16/799,481, dated May 1, 2020, 13 pages.
Non-Final Office Action received for U.S. Appl. No. 17/026,818, dated Nov. 25, 2020, 20 pages.
Office Action received for U.S. Appl. No. 17/027,373, dated Feb. 2, 2022, 17 pages.
Non-Final Office Action received for U.S. Appl. No. 17/121,610, dated May 13, 2021, 17 pages.
Office Action received for U.S. Appl. No. 17/223,794, dated Jun. 16, 2021, 32 pages.
Notice of Acceptance received for Australian Patent Application No. 2019266225, dated Dec. 23, 2020, 3 pages.
Notice of Acceptance received for Australian Patent Application No. 2020239711, dated Dec. 16, 2021, 3 pages.
Notice of Acceptance received for Australian Patent Application No. 2021200789, dated Feb. 26, 2021, 3 pages.
Notice of Allowance received for Chinese Patent Application No. 201880056514.5, dated Jan. 11, 2021, 2 pages (1 page of English Translation and 1 page of Official Copy).
Notice of Allowance received for Chinese Patent Application No. 201910400180.5, dated Nov. 5, 2020, 2 pages (1 page of English Translation and 1 page of Official Copy).
Notice of Allowance received for Chinese Patent Application No. 202011243876.0, dated Sep. 8, 2021, 4 pages (1 page of English Translation and 3 pages of Official Copy).
Notice of Allowance received for Japanese Patent Application No. 2018-183504, dated Sep. 27, 2019, 4 pages (1 page of English Translation and 3 pages of Official Copy).
Notice of Allowance received for Japanese Patent Application No. 2019-194597, dated Nov. 19, 2021, 4 pages (1 page of English Translation and 3 pages of Official Copy).
Notice of Allowance received for Korean Patent Application No. 10-2020-7032110, dated Mar. 8, 2021, 4 pages (1 page of English Translation and 3 pages of Official Copy).
Notice of Allowance received for U.S. Appl. No. 16/035,422, dated Apr. 10, 2019, 6 pages.
Notice of Allowance received for U.S. Appl. No. 16/528,941, dated Aug. 10, 2021, 5 pages.
Notice of Allowance received for U.S. Appl. No. 16/528,941, dated May 19, 2021, 5 pages.
Notice of Allowance received for U.S. Appl. No. 17/157,166, dated Nov. 16, 2021, 6 pages.
Notice of Allowance received for U.S. Appl. No. 16/109,552, dated Mar. 13, 2019, 25 pages.
Notice of Allowance received for U.S. Appl. No. 16/109,552, dated May 13, 2019, 2 pages.
Notice of Allowance received for U.S. Appl. No. 16/144,572, dated Feb. 28, 2019, 7 pages.
Notice of Allowance received for U.S. Appl. No. 16/147,432, dated Dec. 18, 2018, 13 pages.
Notice of Allowance received for U.S. Appl. No. 16/147,432, dated May 20, 2019, 6 pages.
Notice of Allowance received for U.S. Appl. No. 16/383,403, dated Jan. 10, 2020, 11 pages.
Notice of Allowance received for U.S. Appl. No. 16/511,578, dated Nov. 18, 2019, 12 pages.
Notice of Allowance received for U.S. Appl. No. 16/790,619, dated Sep. 8, 2020, 6 pages.
Notice of Allowance received for U.S. Appl. No. 16/799,481, dated Sep. 8, 2020, 6 pages.
Notice of Allowance received for U.S. Appl. No. 17/026,818, dated May 13, 2021, 10 pages.
Notice of Allowance received for U.S. Appl. No. 17/121,610, dated Mar. 11, 2022, 5 pages.
Office Action received for Australian Patent Application No. 2019100499, dated Jun. 28, 2019, 4 pages.
Office Action received for Australian Patent Application No. 2019101062, dated Apr. 22, 2020, 2 pages.
Office Action received for Australian Patent Application No. 2019101062, dated Dec. 5, 2019, 3 pages.
Office Action received for Australian Patent Application No. 2019266225, dated Nov. 23, 2020, 4 pages.
Office Action received for Australian Patent Application No. 2020239711, dated Sep. 13, 2021, 5 pages.
Office Action received for Australian Patent Application No. 2021203903, dated Feb. 24, 2022, 3 pages.
Office Action received for Chinese Patent Application No. 201880056514.5, dated Sep. 2, 2020, 7 pages (1 page of English Translation and 6 pages of Official Copy).
Office Action received for Chinese Patent Application No. 201910400179.2, dated Dec. 27, 2021, 32 pages (13 pages of English Translation and 19 pages of Official Copy).
Office Action received for Chinese Patent Application No. 201910400180.5, dated Jun. 1, 2020, 11 pages (5 pages of English Translation and 6 pages of Official Copy).
Office Action received for Chinese Patent Application No. 201910704856.X, dated Apr. 6, 2021, 13 pages (7 pages of English Translation and 6 pages of Official Copy).
Office Action received for Chinese Patent Application No. 201910704856.X, dated Dec. 9, 2020, 23 pages (13 pages of English Translation and 10 pages of Official Copy).

(56) References Cited

OTHER PUBLICATIONS

Office Action received for Chinese Patent Application No. 201910704856.X, dated May 27, 2020, 26 pages (14 pages of English Translation and 12 pages of Official Copy).
Office Action received for Chinese Patent Application No. 202010126661.4, dated Feb. 3, 2021, 16 pages (9 pages of English Translation and 7 pages of Official Copy).
Office Action received for Chinese Patent Application No. 202010126661.4, dated Mar. 4, 2022, 13 pages (8 pages of English Translation and 5 pages of Official Copy).
Office Action received for Chinese Patent Application No. 202011243876.0, dated Apr. 6, 2021, 11 pages (5 pages of English Translation and 6 pages of Official Copy).
Office Action received for Danish Patent Application No. PA201870362, dated Aug. 22, 2019, 4 pages.
Office Action received for Danish Patent Application No. PA201870362, dated Dec. 18, 2018, 2 pages.
Office Action received for Danish Patent Application No. PA201870363, dated Mar. 26, 2019, 3 pages.
Office Action received for Danish Patent Application No. PA201870364, dated Jan. 28, 2019, 8 pages.
Office Action received for Danish Patent Application No. PA201870364, dated Jun. 11, 2019, 11 pages.
Office Action received for Danish Patent Application No. PA202070617, dated Sep. 24, 2021, 4 pages.
Office Action received for European Patent Application No. 18779093.6, dated Dec. 11, 2020, 4 pages.
Office Action received for European Patent Application No. 18779093.6, dated Mar. 17, 2022, 4 pages.
Office Action received for European Patent Application No. 19729395.4, dated Jul. 15, 2020, 4 pages.
Office Action received for European Patent Application No. 19729395.4, dated Sep. 29, 2020, 10 pages.
Office Action received for European Patent Application No. 20166552.8, dated Mar. 24, 2021, 8 pages.
Office Action received for European Patent Application No. 20205496.1, dated Nov. 10, 2021, 5 pages.
Office Action received for Indian Patent Application No. 201814036860, dated Jul. 29, 2021, 8 pages.
Office Action received for Indian Patent Application No. 202014041529, dated Dec. 6, 2021, 6 pages.
Office Action received for Japanese Patent Application No. 2019-194597, dated Jan. 18, 2021, 10 pages (5 pages of English Translation and 5 pages of Official Copy).
Office Action received for Japanese Patent Application No. 2020-159840, dated Dec. 10, 2021, 13 pages (7 pages of English Translation and 6 pages of Official Copy).
Office Action received for Korean Patent Application No. 10-2020-7032110, dated Dec. 15, 2020, 6 pages (2 pages of English Translation and 4 pages of official Copy).
Result of Consultation received for European Patent Application No. 19729395.4, dated Jun. 22, 2021, 3 pages.
Result of Consultation received for European Patent Application No. 19729395.4, dated Jun. 23, 2021, 3 pages.
Rossignol Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA201870362, dated Sep. 7, 2018, 9 pages.
Search Report and Opinion received for Danish Patent Application No. PA201870363, dated Sep. 11, 2018, 12 pages.
Search Report and Opinion received for Danish Patent Application No. PA201870364, dated Sep. 4, 2018, 12 pages.
Search Report and Opinion received for Danish Patent Application No. PA202070617, dated Dec. 23, 2020, 8 pages.
Senicar et al., "User-Centred Design and Development of an Intelligent Light Switch for Sensor Systems", Technical Gazette, vol. 26, No. 2, Available online at: https://hrcak.srce.hr/file/320403, 2019, pp. 339-345.
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Corrected Notice of Allowance received for U.S. Appl. No. 17/950,900, dated Jun. 30, 2023, 2 pages.
Office Action received for European Patent Application No. 18779093.6, dated Jun. 28, 2023, 4 pages.
101075173, CN, A, Cited by Chinese Patent Office in an Office Action for related Patent Application No. 202110328601.5 dated Apr. 27, 2022.
101917529, CN, A, Cited by Chinese Patent Office in an Office Action for related Patent Application No. 202110328597.2 dated Apr. 15, 2022.
104469143, CN, A, Cited by Chinese Patent Office in an Office Action for related Patent Application No. 202110328597.2 dated Apr. 15, 2022.
106210855, CN, A, Cited by Chinese Patent Office in an Office Action for related Patent Application No. 202110328597.2 dated Apr. 15, 2022.
Applicant-Initiated Interview Summary received for U.S. Appl. No. 17/950,900, dated Jan. 26, 2023, 5 pages.
Corrected Notice of Allowance received for U.S. Appl. No. 17/950,900, dated Apr. 14, 2023, 2 pages.
Corrected Notice of Allowance received for U.S. Appl. No. 17/950,922, dated Apr. 14, 2023, 2 pages.
Final Office Action received for U.S. Appl. No. 17/950,900, dated Jan. 23, 2023, 14 pages.
International Search Report and Written Opinion received for PCT Patent Application No. PCT/US2022/044592, dated Mar. 14, 2023, 22 pages.
Invitation to Pay Additional Fees received for PCT Patent Application No. PCT/US2022/044592, dated Jan. 16, 2023, 21 pages.
Non-Final Office Action received for U.S. Appl. No. 17/476,404, dated Mar. 30, 2023, 29 pages.
Non-Final Office Action received for U.S. Appl. No. 17/950,900, dated Dec. 1, 2022, 14 pages.
Notice of Allowance received for U.S. Appl. No. 17/950,900, dated Mar. 7, 2023, 10 pages.
Notice of Allowance received for U.S. Appl. No. 17/950,922, dated Apr. 5, 2023, 10 pages.
Office Action received for Indian Patent Application No. 202215025360, dated Mar. 29, 2023, 6 pages.
Office Action received for Indian Patent Application No. 202215025361, dated Mar. 29, 2023, 6 pages.
Office Action received for Indian Patent Application No. 202215025363, dated Mar. 29, 2023, 6 pages.
Office Action received for Indian Patent Application No. 202215025364, dated Mar. 29, 2023, 6 pages.
Applicant-Initiated Interview Summary received for U.S. Appl. No. 17/483,542, dated May 22, 2023, 3 pages.
Applicant-Initiated Interview Summary received for U.S. Appl. No. 17/483,679, dated May 19, 2023, 3 pages.
Decision to Refuse received for European Patent Application No. 20205496.1, dated May 12, 2023, 16 pages.
Minutes of the Oral Proceedings received for European Patent Application No. 20205496.1, mailed on May 9, 2023, 7 pages.
Non-Final Office Action received for U.S. Appl. No. 17/872,736, dated May 11, 2023, 17 pages.
Notice of Allowance received for Japanese Patent Application No. 2021-206121, dated May 15, 2023, 4 pages (1 page of English Translation and 3 pages of Official Copy).
Office Action received for Australian Patent Application No. 2022228207, dated Apr. 28, 2023, 3 pages.
105391778, CN, A, Cited by the Chinese Patent Office in an Office Action for related Patent Application No. 202110328601.5 dated Jul. 5, 2023.
Shangmeng Li, "The Design and Implementation of Mobile Terminal System of Multimedia Conference Based on Symbian Operating System", China Academic Journal Electronic Publishing House, online available at: http://www.cnki.net, 66 pages, Cited by the Chinese Patent Office in an Office Action for related Patent Application No. 202110328601.5 dated Jul. 5, 2023.

(56) References Cited

OTHER PUBLICATIONS

Applicant-Initiated Interview Summary received for U.S. Appl. No. 17/479,897, dated Jun. 12, 2023, 2 pages.
Applicant-Initiated Interview Summary received for U.S. Appl. No. 17/483,564, dated Jun. 21, 2023, 4 pages.
Examiner Interview Summary received for U.S. Appl. No. 17/903,946, dated Jun. 28, 2023, 2 pages.
Final Office Action received for U.S. Appl. No. 17/483,679, dated Jun. 13, 2023, 33 pages.
Non-Final Office Action received for U.S. Appl. No. 17/484,899, dated Jun. 14, 2023, 41 pages.
Notice of Allowance received for U.S. Appl. No. 17/950,900, dated Jun. 16, 2023, 6 pages.
Office Action received for Chinese Patent Application No. 202111652452.4, dated May 19, 2023, 15 pages (8 pages of English Translation and 7 pages of Official Copy).
Applicant-Initiated Interview Summary received for U.S. Appl. No. 17/872,736, dated Jul. 25, 2023, 2 pages.
Garrison DR., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.
Notice of Allowance received for Chinese Patent Application No. 202110328601.5, dated Jul. 5, 2023, 5 pages (1 page of English Translation and 4 pages of Official Copy).
Notice of Allowance received for U.S. Appl. No. 17/479,897, dated Jul. 26, 2023, 7 pages.
Shangmeng Li, "The Design and Implementation of Mobile Terminal System of Multimedia Conference Based on Symbian Operating System", China Academic Journal Electronic Publishing House, online available at: http://www.cnki.net, 2011, 66 pages (Official Copy only) (See Communication Under 37 CFR § 1.98(a) (3)).
Advisory Action received for U.S. Appl. No. 17/483,679, dated Sep. 20, 2022, 8 pages.
Applicant-Initiated Interview Summary received for U.S. Appl. No. 17/476,404, dated Dec. 20, 2022, 2 pages.
Applicant-Initiated Interview Summary received for U.S. Appl. No. 17/476,404, dated Jul. 27, 2022, 6 pages.
Applicant-Initiated Interview Summary received for U.S. Appl. No. 17/479,897, dated Oct. 31, 2022, 3 pages.
Applicant-Initiated Interview Summary received for U.S. Appl. No. 17/482,977, dated Dec. 5, 2022, 2 pages.
Applicant-Initiated Interview Summary received for U.S. Appl. No. 17/482,987, dated Apr. 11, 2022, 4 pages.
Applicant-Initiated Interview Summary received for U.S. Appl. No. 17/483,542, dated Nov. 23, 2022, 4 pages.
Applicant-Initiated Interview Summary received for U.S. Appl. No. 17/483,564, dated Jul. 21, 2022, 5 pages.
Applicant-Initiated Interview Summary received for U.S. Appl. No. 17/483,679, dated Aug. 23, 2022, 3 pages.
Applicant-Initiated Interview Summary received for U.S. Appl. No. 17/484,899, dated Sept. 1, 2022, 5 pages.
Applicant-Initiated Interview Summary received for U.S. Appl. No. 17/484,907, dated Jan. 10, 2022, 2 pages.
Corrected Notice of Allowance received for U.S. Appl. No. 17/027,373, dated Oct. 26, 2022, 2 pages.
Corrected Notice of Allowance received for U.S. Appl. No. 17/483,549, dated Aug. 24, 2022, 3 pages.
Corrected Notice of Allowance received for U.S. Appl. No. 17/484,907, dated Aug. 26, 2022, 2 pages.
Corrected Notice of Allowance received for U.S. Appl. No. 17/484,907, dated Jun. 15, 2022, 2 pages.
Corrected Notice of Allowance received for U.S. Appl. No. 17/484,907, dated Mar. 18, 2022, 2 pages.
Final Office Action received for U.S. Appl. No. 17/479,897, dated Jan. 10, 2023, 15 pages.
International Preliminary Report on Patentability received for PCT Patent Application No. PCT/US2021/031760, dated Nov. 24, 2022, 11 pages.
International Search Report and Written Opinion received for PCT Patent Application No. PCT/US2022/014271, dated Jul. 4, 2022, 23 pages.
International Search Report and Written Opinion received for PCT Patent Application No. PCT/US2022/029261, dated Oct. 20, 2022, 18 pages.
International Search Report and Written Opinion received for PCT Patent Application No. PCT/US2022/029273, dated Oct. 27, 2022, 19 pages.
International Search Report and Written Opinion received for PCT Patent Application No. PCT/US2022/029580, dated Nov. 7, 2022, 20 pages.
Invitation to Pay Additional Fees and Partial International Search Report received for PCT Patent Application No. PCT/US2022/014271, dated May 12, 2022, 20 pages.
Invitation to Pay Additional Fees and Partial International Search Report received for PCT Patent Application No. PCT/US2022/029261, dated Aug. 29, 2022, 16 pages.
Invitation to Pay Additional Fees and Partial International Search Report received for PCT Patent Application No. PCT/US2022/029580, dated Sep. 5, 2022, 13 pages.
Invitation to Pay Additional Fees received for PCT Patent Application No. PCT/US2022/029273, dated Sep. 2, 2022, 13 pages.
Invitation to Pay Search Fees received for European Patent Application No. 21728781.2, dated Dec. 2, 2022, 3 pages.
Non-Final Office Action received for U.S. Appl. No. 17/476,404, dated Sep. 14, 2022, 31 pages.
Non-Final Office Action received for U.S. Appl. No. 17/479,897, dated Aug. 30, 2022, 10 pages.
Non-Final Office Action received for U.S. Appl. No. 17/482,977, dated Oct. 13, 2022, 20 pages.
Non-Final Office Action received for U.S. Appl. No. 17/482,987, dated Jan. 18, 2022, 25 pages.
Office Action received for U.S. Appl. No. 17/483,542, dated Jan. 31, 2023, 14 pages.
Office Action received for U.S. Appl. No. 17/483,542, dated Sep. 22, 2022, 18 pages.
Office Action received for U.S. Appl. No. 17/483,564, dated Nov. 28, 2022, 24 pages.
Office Action received for U.S. Appl. No. 17/483,679, dated Dec. 9, 2022, 31 pages.
Office Action received for U.S. Appl. No. 17/484,907, dated Nov. 19, 2021, 24 pages.
Notice of Allowance received for Chinese Patent Application No. 201910400179.2, dated Oct. 9, 2022, 4 pages (1 page of English Translation and 3 pages of Official Copy).
Notice of Allowance received for Japanese Patent Application No. 2020-159840, dated Jul. 8, 2022, 4 pages (1 page of English Translation and 3 pages of Official Copy).
Notice of Allowance received for Japanese Patent Application No. 2022-125792, dated Jan. 27, 2023, 4 pages (1 page of English Translation and 3 pages of Official Copy).
Notice of Allowance received for Korean Patent Application No. 10-2021-7017731, dated Feb. 28, 2023, 5 pages (2 pages of English Translation and 3 pages of Official Copy).
Notice of Allowance received for Korean Patent Application No. 10-2022-0091730, dated Oct. 4, 2022, 5 pages (2 pages of English Translation and 3 pages of Official Copy).
Notice of Allowance received for U.S. Appl. No. 17/027,373, dated Aug. 2, 2022, 2 pages.
Notice of Allowance received for U.S. Appl. No. 17/027,373, dated Oct. 3, 2022, 5 pages.
Notice of Allowance received for U.S. Appl. No. 17/482,977, dated Jan. 24, 2023, 10 pages.
Notice of Allowance received for U.S. Appl. No. 17/482,987, dated Jun. 23, 2022, 9 pages.
Notice of Allowance received for U.S. Appl. No. 17/482,987, dated May 11, 2022, 10 pages.
Notice of Allowance received for U.S. Appl. No. 17/484,907, dated Jul. 25, 2022, 10 pages.
Notice of Allowance received for U.S. Appl. No. 17/484,907, dated Mar. 2, 2022, 13 pages.

(56) References Cited

OTHER PUBLICATIONS

Notice of Allowance received for U.S. Appl. No. 17/484,907, dated May 20, 2022, 13 pages.
Office Action received for Australian Patent Application No. 2022201532, dated Dec. 19, 2022, 5 pages.
Office Action received for Chinese Patent Application No. 202110327012.5, dated Nov. 28, 2022, 16 pages (10 pages of English Translation and 6 pages of Official Copy).
Office Action received for Chinese Patent Application No. 202110328597.2, dated Oct. 10, 2022, 13 pages (7 pages of English Translation and 6 pages of Official Copy).
Office Action received for Chinese Patent Application No. 202110328601.5, dated Nov. 2, 2022, 29 pages (19 pages of English Translation and 10 pages of Official Copy).
Office Action received for Chinese Patent Application No. 202110328602.X, dated Dec. 1, 2022, 28 pages (17 pages of English Translation 11 pages of Official Copy).
Office Action received for Chinese Patent Application No. 202111652452.4, dated Aug. 29, 2022, 23 pages (12 pages of English Translation and 11 pages of Official Copy).
Office Action received for Chinese Patent Application No. 202111652452.4, dated Feb. 11, 2023, 28 pages (13 pages of English Translation and 15 pages of Official Copy).
Office Action received for European Patent Application No. 21728781.2, dated Mar. 1, 2023, 13 pages.
Office Action received for Japanese Patent Application No. 2021-206121, dated Feb. 20, 2023, 7 pages (3 pages of English Translation and 4 pages of Official Copy).
Summons to Attend Oral Proceedings received for European Patent Application No. 20205496.1, dated Sep. 8, 2022, 9 pages.
Dolan Tim, "How to Make a Laptop Webcam into a Document Camera—IPEVO Mirror-Cam Review", Retrieved from the internet: URL:https://www.youtube.com/watch?v=-K8jyZ1hbbg, Aug. 29, 2020, 1 page.
Larson Tom, "How to Turn your Webcam into a Document Camera", Retrieved from the Internet: URL: https://www.youtube.com/watchv=UlaW22FxRZM, Nov. 7, 2020, 1 page.
QQ, "Method of QQ voice chat", Online Available at: https://www.taodocs.com/p-47909082.html, May 25, 2016, 3 pages (Official Copy only) See Communication Under 37 CFR § 1.98(a) (3).
103237191, CN, A, Cited by the Chinese Patent Office in an Office Action for related Patent Application No. 202110328602.X dated Dec. 1, 2022.
104869046, CN, A, Cited by the Chinese Patent Office in an Office Action for related Patent Application No. 201910400179.2 dated Oct. 9, 2022.
106303648, CN, A, Cited by the Chinese Patent Office in an Office Action for related Patent Application No. 202110328601.5 dated Nov. 2, 2022.
2008-99330, JP, A. Cited by Japanese Patent Office in an Office Action for related Patent Application No. 2022-125792 dated Jan. 27, 2023.
2014-170982, JP, A, Cited by Japanese Patent Office in an Office Action for related Patent Application No. 2022-125792 dated Jan. 27, 2023.
QQ, "Method of QQ voice chat", Online Available at: https://www.taodocs.com/p-47909082.html, May 25, 2016, 3 pages, Cited by the Chinese Patent Office in an Office Action for related Patent Application No. 2021103286015, dated Nov. 2, 2022.
Corrected Notice of Allowance received for U.S. Appl. No. 17/732,204, dated Dec. 4, 2023, 5 pages.
International Preliminary Report on Patentability received for PCT Patent Application No. PCT/US2022/029261, dated Nov. 30, 2023, 12 pages.
International Preliminary Report on Patentability received for PCT Patent Application No. PCT/US2022/029273, dated Nov. 30, 2023, 14 pages.
International Preliminary Report on Patentability received for PCT Patent Application No. PCT/US2022/029580, dated Nov. 30, 2023, 14 pages.
International Search Report and Written Opinion received for PCT Patent Application No. PCT/US2023/020569, dated Nov. 13, 2023, 23 pages.
Applicant-Initiated Interview Summary received for U.S. Appl. No. 17/476,404, dated Oct. 31, 2023, 4 pages.
Final Office Action received for U.S. Appl. No. 17/484,899, dated Nov. 6, 2023, 39 pages.
Office Action received for Australian Patent Application No. 2023248185, dated Oct. 20, 2023, 3 pages.
Office Action received for European Patent Application No. 20166552.8, dated Nov. 3, 2023, 3 pages.
Corrected Notice of Allowance received for U.S. Appl. No. 17/732,204, dated Jan. 18, 2024, 5 pages.
Office Action received for Australian Patent Application No. 2023204396, dated Jan. 8, 2024, 5 pages.
Applicant-Initiated Interview Summary received for U.S. Appl. No. 17/483,679, dated Aug. 18, 2023, 2 pages.
Corrected Notice of Allowance received for U.S. Appl. No. 17/479,897, dated Aug. 17, 2023, 2 pages.
Corrected Notice of Allowance received for U.S. Appl. No. 17/483,542, dated Aug. 25, 2023, 3 pages.
Ex-Parte Quayle Action received for U.S. Appl. No. 17/903,946, mailed on Aug. 4, 2023, 4 pages.
International Preliminary Report on Patentability received for PCT Patent Application No. PCT/US2022/014271, dated Aug. 10, 2023, 17 pages.
Notice of Allowance received for U.S. Appl. No. 17/483,542, dated Aug. 11, 2023, 9 pages.
Notice of Allowance received for U.S. Appl. No. 17/872,736, dated Aug. 21, 2023, 6 pages.
Applicant-Initiated Interview Summary received for U.S. Appl. No. 18/067,350, dated Sep. 11, 2023, 4 pages.
Corrected Notice of Allowance received for U.S. Appl. No. 17/732,204, dated Nov. 16, 2023, 6 pages.
Extended European Search Report received for European Patent Application No. 23172038.4, dated Oct. 11, 2023, 10 pages.
Invitation to Pay Additional Fees and Partial International Search Report received for PCT Patent Application No. PCT/US2023/020569, dated Sep. 21, 2023, 14 pages.
Non-Final Office Action received for U.S. Appl. No. 18/067,350, dated Aug. 3, 2023, 41 pages.
Office Action received for Australian Patent Application No. 2023248185, dated Nov. 22, 2023, 2 pages.
Office Action received for Korean Patent Application No. 10-2023-0001668, dated Nov. 3, 2023, 5 pages (2 pages of English Translation and 3 pages of Official Copy).
Corrected Notice of Allowance received for U.S. Appl. No. 17/872,736, dated Oct. 13, 2023, 3 pages.
Corrected Notice of Allowance received for U.S. Appl. No. 17/950,922, dated Oct. 2, 2023, 3 pages.
International Search Report and Written Opinion received for PCT Patent Application No. PCT/US2023/017280, dated Jun. 26, 2023, 20 pages.
Notice of Allowance received for Korean Patent Application No. 10-2023-7024157, dated Sep. 19, 2023, 7 pages (2 pages of English Translation and 5 pages of Official Copy).
Notice of Allowance received for U.S. Appl. No. 17/479,897, dated Oct. 3, 2023, 5 pages.
Notice of Allowance received for U.S. Appl. No. 17/732,204, dated Oct. 12, 2023, 8 pages.
Notice of Allowance received for U.S. Appl. No. 17/740,104, dated Oct. 4, 2023, 5 pages.
Corrected Notice of Allowance received for U.S. Appl. No. 17/740,104, dated Jan. 2, 2024, 2 pages.
Intention to Grant received for European Patent Application No. 21728781.2, dated Jul. 28, 2023, 9 pages.
Non-Final Office Action received for U.S. Appl. No. 17/732,204, dated Aug. 4, 2023, 18 pages.
Non-Final Office Action received for U.S. Appl. No. 17/740,104, dated Aug. 2, 2023, 15 pages.
Office Action received for Chinese Patent Application No. 202110328597.2, dated Jul. 18, 2023, 16 pages (1 page of English Translation and 15 pages of Official Copy).

(56) References Cited

OTHER PUBLICATIONS

Office Action received for Chinese Patent Application No. 202110328602.X, dated Jun. 29, 2023, 27 pages (18 pages of English Translation and 9 pages of Official Copy).
Applicant-Initiated Interview Summary received for U.S. Appl. No. 17/483,679, dated Dec. 18, 2023, 2 pages.
Final Office Action received for U.S. Appl. No. 18/067,350, dated Dec. 13, 2023, 44 pages.
Intention to Grant received for European Patent Application No. 21728781.2, dated Dec. 12, 2023, 9 pages.
Notice of Allowance received for U.S. Appl. No. 17/483,542, dated Dec. 20, 2023, 6 pages.
Non-Final Office Action received for U.S. Appl. No. 17/483,679, dated Sep. 13, 2023, 32 pages.
Notice of Allowance received for U.S. Appl. No. 17/950,922, dated Sep. 20, 2023, 6 pages.
Notice of Hearing received for Indian Patent Application No. 201814036860, dated Sep. 8, 2023, 2 pages.
Applicant-Initiated Interview Summary received for U.S. Appl. No. 17/484,899, dated Sep. 12, 2023, 6 pages.
Final Office Action received for U.S. Appl. No. 17/476,404, dated Sep. 12, 2023, 30 pages.
Notice of Allowance received for U.S. Appl. No. 17/872,736, dated Aug. 30, 2023, 4 pages.
Corrected Notice of Allowance received for U.S. Appl. No. 17/483,542, mailed on Feb. 5, 2024, 3 pages.
Extended European Search Report received for European Patent Application No. 23203414.0, mailed on Jan. 26, 2024, 10 pages.
Final Office Action received for U.S. Appl. No. 17/483,679, mailed on Feb. 6, 2024, 45 pages.
Notice of Acceptance received for Australian Patent Application No. 2023248185, mailed on Jan. 23, 2024, 3 pages.
Non-Final Office Action received for U.S. Appl. No. 18/138,348, mailed on Apr. 30, 2024, 16 pages.
Notice of Acceptance received for Australian Patent Application No. 2023204396, mailed on Apr. 15, 2024, 3 pages.
Applicant-Initiated Interview Summary received for U.S. Appl. No. 17/484,899, mailed on Feb. 14, 2024, 8 pages.
Applicant-Initiated Interview Summary received for U.S. Appl. No. 18/067,350, mailed on Mar. 13, 2024, 4 pages.
Corrected Notice of Allowance received for U.S. Appl. No. 17/903,946, mailed on Apr. 22, 2024, 2 pages.
Decision to Grant received for European Patent Application No. 21728781.2, mailed on Feb. 8, 2024, 3 pages.
International Preliminary Report on Patentability received for PCT Patent Application No. PCT/US2022/044592, mailed on Apr. 4, 2024, 21 pages.
International Search Report and Written Opinion received for PCT Patent Application No. PCT/US2023/032792, mailed on Jan. 19, 2024, 15 pages.
International Search Report and Written Opinion received for PCT Patent Application No. PCT/US2023/032911, mailed on Jan. 4, 2024, 18 pages.
Non-Final Office Action received for U.S. Appl. No. 17/484,899, mailed on Mar. 21, 2024, 42 pages.
Non-Final Office Action received for U.S. Appl. No. 17/950,868, mailed on Apr. 24, 2024, 16 pages.
Non-Final Office Action received for U.S. Appl. No. 17/970,417, mailed on Apr. 10, 2024, 16 pages.
Notice of Allowance received for Korean Patent Application No. 10-2023-7039382, mailed on Feb. 13, 2024, 6 pages (2 pages of English Translation and 4 pages of Official Copy).
Notice of Allowance received for Korean Patent Application No. 10-2023-7044044, mailed on Mar. 14, 2024, 7 pages (2 pages of English Translation and 5 pages of Official Copy).
Notice of Allowance received for Korean Patent Application No. 10-2024-7000870, mailed on Feb. 13, 2024, 5 pages (2 pages of English Translation and 3 pages of Official Copy).
Notice of Allowance received for U.S. Appl. No. 17/903,946, mailed on Apr. 10, 2024, 7 pages.

Office Action received for Chinese Patent Application No. 201910704856.X, mailed on Mar. 8, 2024, 13 pages (7 pages of English Translation and 6 pages of Official Copy).
Office Action received for Japanese Patent Application No. 2023-028786, mailed on Mar. 22, 2024, 10 pages (5 pages of English Translation and 5 pages of Official Copy).
Office Action received for Korean Patent Application No. 10-2023-7018775, mailed on Feb. 28, 2024, 8 pages (3 pages of English Translation and 5 pages of Official Copy).
Office Action received for Korean Patent Application No. 10-2023-7040599, mailed on Mar. 12, 2024, 6 pages (2 pages of English Translation and 4 pages of Official Copy).
Notice of Allowance received for Chinese Patent Application No. 202311042451.7, mailed on May 15, 2024, 4 pages (1 page of English Translation and 3 pages of Official Copy).
Extended European Search Report received for European Patent Application No. 24160234.1, mailed on May 28, 2024, 6 pages.
Non-Final Office Action received for U.S. Appl. No. 18/067,350, mailed on May 28, 2024, 43 pages.
Non-Final Office Action received for U.S. Appl. No. 18/389,655, mailed on Aug. 23, 2024, 23 pages.
Notice of Allowance received for U.S. Appl. No. 17/484,899, mailed on Aug. 26, 2024, 21 pages.
That Guy who Loves METV and SSBB Mods, "Kinect Party Gameplay", Available online at: https://youtu.be/bkbOlzfyLzc?si=QAAKh_V4aqYDiegL, Oct. 20, 2021, 2 pages.
Xbox, "Kinect Tips, Part 3: Gesture Controls", Available online at: https://youtu.be/VXhhE-I96qQ?si=gLmHbp9jOm-wOfNW, May 7, 2014, 3 pages.
Cosmic Mook, "Line laboratory, new function Exhaustive Coverage! Line 120% Application Guide, Inc.", Jan. 24, 2018, 7 pages, Cited by the Japanese Patent Office in an Office Action for related Patent Application No. 2023-097196 on Jun. 7, 2024.
Myoko Mori, "Line Perfect Guidebook [Revised Version]", Sotec Co. Ltd., Dec. 31, 2013, 5 pages, Cited by the Japanese Patent Office in an Office Action for related Patent Application No. 2023-097196 on Jun. 7, 2024.
Octoba, "Enjoy free calls with Line! Part 2", retrieved from: https://web.archive.org/web/20170923013859 /https://octoba.net/archives/line-call2.html, Sep. 23, 2017, 13 pages, Cited by the Japanese Patent Office in an Office Action for related Patent Application No. 2023-097196 on Jun. 7, 2024.
Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Applicant-Initiated Interview Summary received for U.S. Appl. No. 17/484,899, mailed on Jun. 24, 2024, 4 pages.
Applicant-Initiated Interview Summary received for U.S. Appl. No. 17/950,868, mailed on Jul. 19, 2024, 2 pages.
Applicant-Initiated Interview Summary received for U.S. Appl. No. 17/970,417, mailed on Jun. 26, 2024, 2 pages.
Applicant-Initiated Interview Summary received for U.S. Appl. No. 18/067,350, mailed on Jul. 29, 2024, 3 pages.
Avery et al., "Kinect", Wikipedia, Feb. 26, 2015, 14 pages.
Cosmic Mook, "Line laboratory, new function Exhaustive Coverage! LINE 120% Application Guide, Inc.", Jan. 24, 2018, 7 pages (Official Copy Only) See Communication Under Rule 37 CFR § 1.98(a) (3).
Examiner Initiated Interview Summary received for U.S. Appl. No. 17/950,868, mailed on Jul. 5, 2024, 2 pages.
Extended European Search Report received for European Patent Application No. 24159026.4, mailed on Jul. 10, 2024, 9 pages.
International Search Report and Written Opinion received for PCT Patent Application No. PCT/US2024/017017, mailed on Aug. 2, 2024, 27 pages.
Invitation to Pay Additional Fees received for PCT Patent Application No. PCT/US2024/017017, mailed on May 15, 2024, 3 pages.
Myoko Mori, "Line Perfect Guidebook [Revised Version]", Sotec Co. Ltd., Dec. 31, 2013, 5 pages (Official Copy Only) See Communication Under Rule 37 CFR § 1.98(a) (3).
Non-Final Office Action received for U.S. Appl. No. 18/380,116, mailed on Jul. 18, 2024, 16 pages.

(56) References Cited

OTHER PUBLICATIONS

Notice of Acceptance received for Australian Patent Application No. 2024202768, mailed on Jun. 4, 2024, 3 pages.
Notice of Allowance received for Japanese Patent Application No. 2023-097196, mailed on Jul. 29, 2024, 4 pages (1 page of English Translation and 3 pages of Official Copy).
Notice of Allowance received for Japanese Patent Application No. 2023-571161, mailed on Jul. 30, 2024, 3 pages (1 page of English Translation and 2 pages of Official Copy).
Notice of Allowance received for Korean Patent Application No. 10-2023-0001668, mailed on May 22, 2024, 6 pages (2 pages of English Translation 4 Official.
Notice of Allowance received for Korean Patent Application No. 10-2023-7040599, mailed on Jun. 26, 2024, 7 pages (2 pages of English Translation and 5 pages of Official Copy).
Octoba, "Enjoy free calls with Line! Part 2", Retrieved from: https://web.archive.org/web/20170923013859/https://octoba.net/archives/line-call2.html, Sep. 23, 2017, 13 pages (Official Copy Only) See Communication Under Rule 37 CFR ♂ 1.98(a) (3).
Office Action received for Chinese Patent Application No. 201910704856.X, mailed on Jun. 11, 2024, 33 pages (1 page of English Translation and 32 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202311185909.4, mailed on Jun. 12, 2024, 18 pages (10 pages of English Translation and 8 pages of Official Copy).
Office Action received for European Patent Application No. 22705232.1, mailed on May 27, 2024, 7 pages.
Office Action received for European Patent Application No. 22792995.7, mailed on Jun. 24, 2024, 6 pages.
Office Action received for Japanese Patent Application No. 2023-097196, mailed on Jun. 7, 2024, 7 pages (3 pages of English Translation and 4 pages of Official Copy).
Office Action received for Japanese Patent Application No. 2023-571161, mailed on May 28, 2024, 4 pages (2 pages of English Translation and 2 pages of Official Copy).
Office Action received for Japanese Patent Application No. 2023-571312, mailed on Jul. 16, 2024, 4 pages (2 pages of English Translation and 2 pages of Official Copy).
Office Action received for Japanese Patent Application No. 2024-003876, mailed on Jul. 2, 2024, 3 pages (1 page of English Translation and 2 pages of Official Copy).
Office Action received for Korean Patent Application No. 10-2024-7019962, mailed on Jul. 16, 2024, 6 pages (2 pages of English Translation and 4 pages of Official Copy).
Final Office Action received for U.S. Appl. No. 17/950,868, mailed on Aug. 29, 2024, 13 pages.
Notice of Allowance received for U.S. Appl. No. 17/903,946, mailed on Aug. 27, 2024, 5 pages.

\* cited by examiner

1200

1202
Obtain information about gaze of a first participant in a video conference while the first participant, a second participant, and a third participant are participating in the video conference, wherein:

1204
In a first video conference user interface for the first participant, a characteristic location of the second participant in the first video conference user interface for the first participant is located in a first direction from a characteristic location of the first participant

1206
In a second video conference user interface for the second participant, a characteristic location of the second participant is located in a second direction from a characteristic location of the first participant in the second video conference user interface for the second participant, wherein the second direction is different from the first direction

1208
In a third video conference user interface for the third participant, a characteristic location of the second participant in the third video conference user interface for the third participant is located in a third direction from a characteristic location of the first participant in the third video conference user interface for the third participant, wherein the third direction is different from the first direction

1210
In response to obtaining the information about the gaze of the first participant, provide information that indicates which characteristic location of another participant the first participant is looking at to one or more devices displaying representations of the video conference to enable video conference user interfaces at the one or more devices to indicate at which characteristic location of another participant the first participant is looking, including in accordance with a determination that a first set of criteria is satisfied, wherein the first set of criteria includes a criterion that is satisfied when the first participant is looking in the first direction in the video conference:

1212
Modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant

1214
Modifying the representation of the gaze direction of the first participant in the third video conference user interface to indicate, in the third video conference user interface for the third participant, that the first participant is looking in the third direction at the characteristic location of the second participant in the third video conference user interface

*FIG. 12*

USER INTERFACES FOR MULTI-PARTICIPANT LIVE COMMUNICATION

CROSS-REFERENCE TO RELATED APPLICATIONS

This application claims benefit of U.S. Provisional Application No. 63/157,503, filed Mar. 5, 2021, entitled "USER INTERFACES FOR MULTI-PARTICIPANT LIVE COMMUNICATION," the entire contents of which are hereby incorporated by reference.

FIELD

The present disclosure relates generally to computer user interfaces, and more specifically to techniques for live communication involving multiple participants.

BACKGROUND

Users are increasingly using electronic devices to communicate with others for personal and business reasons. Most electronic devices are capable of providing live communication between multiple participants. As an example, some electronic devices provide interactive user interfaces to display and control live communication sessions between multiple participants.

BRIEF SUMMARY

Some techniques for live communication involving multiple participants using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for live communication involving multiple participants. Such methods and interfaces optionally complement or replace existing techniques for live communication involving multiple participants. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system. The method comprises: obtaining information about gaze of a first participant in a video conference while the first participant, a second participant, and a third participant are participating in the video conference, where: in a first video conference user interface for the first participant, a characteristic location of the second participant in the first video conference user interface for the first participant is located in a first direction from a characteristic location of the first participant; in a second video conference user interface for the second participant, a characteristic location of the second participant is located in a second direction from a characteristic location of the first participant in the second video conference user interface for the second participant, where the second direction is different from the first direction; and in a third video conference user interface for the third participant, a characteristic location of the second participant in the third video conference user interface for the third participant is located in a third direction from a characteristic location of the first participant in the third video conference user interface for the third participant, where the third direction is different from the first direction; in response to obtaining the information about the gaze of the first participant, providing information that indicates which characteristic location of another participant the first participant is looking at to one or more devices displaying of the video conference to enable video conference user interfaces at the one or more devices to indicate at which characteristic location of another participant the first participant is looking, including in accordance with a determination that a first set of criteria is satisfied, where the first set of criteria includes a criterion that is satisfied when the first participant is looking in the first direction in the video conference: modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant.

In accordance with some embodiments, a non-transitory computer-readable storage medium is described. The non-transitory computer-readable storage medium stores one or more programs configured to be executed by one or more processors of a computer system, the one or more programs including instructions for: obtaining information about gaze of a first participant in a video conference while the first participant, a second participant, and a third participant are participating in the video conference, where: in a first video conference user interface for the first participant, a characteristic location of the second participant in the first video conference user interface for the first participant is located in a first direction from a characteristic location of the first participant; in a second video conference user interface for the second participant, a characteristic location of the second participant is located in a second direction from a characteristic location of the first participant in the second video conference user interface for the second participant, where the second direction is different from the first direction; and in a third video conference user interface for the third participant, a characteristic location of the second participant in the third video conference user interface for the third participant is located in a third direction from a characteristic location of the first participant in the third video conference user interface for the third participant, where the third direction is different from the first direction; in response to obtaining the information about the gaze of the first participant, providing information that indicates which characteristic location of another participant the first participant is looking at to one or more devices displaying of the video conference to enable video conference user interfaces at the one or more devices to indicate at which characteristic location of another participant the first participant is looking, including in accordance with a determination that a first set of criteria is satisfied, where the first set of criteria includes a criterion that is satisfied when the first participant is looking in the first direction in the video conference: modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant.

In accordance with some embodiments, a transitory computer-readable storage medium is described. The transitory computer-readable storage medium stores one or more programs configured to be executed by one or more processors of a computer system, the one or more programs including instructions for: obtaining information about gaze of a first participant in a video conference while the first participant, a second participant, and a third participant are participating in the video conference, where: in a first video conference user interface for the first participant, a characteristic location of the second participant in the first video conference user interface for the first participant is located in a first direction from a characteristic location of the first participant; in a second video conference user interface for the second participant, a characteristic location of the second participant is located in a second direction from a characteristic location of the first participant in the second video conference user interface for the second participant, where the second direction is different from the first direction; and in a third video conference user interface for the third participant, a characteristic location of the second participant in the third video conference user interface for the third participant is located in a third direction from a characteristic location of the first participant in the third video conference user interface for the third participant, where the third direction is different from the first direction; in response to obtaining the information about the gaze of the first participant, providing information that indicates which characteristic location of another participant the first participant is looking at to one or more devices displaying of the video conference to enable video conference user interfaces at the one or more devices to indicate at which characteristic location of another participant the first participant is looking, including in accordance with a determination that a first set of criteria is satisfied, where the first set of criteria includes a criterion that is satisfied when the first participant is looking in the first direction in the video conference: modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant.

In accordance with some embodiments, a computer system is described. The computer system includes: one or more processors; and memory storing one or more programs configured to be executed by the one or more processors, the one or more programs including instructions for: obtaining information about gaze of a first participant in a video conference while the first participant, a second participant, and a third participant are participating in the video conference, where: in a first video conference user interface for the first participant, a characteristic location of the second participant in the first video conference user interface for the first participant is located in a first direction from a characteristic location of the first participant; in a second video conference user interface for the second participant, a characteristic location of the second participant is located in a second direction from a characteristic location of the first participant in the second video conference user interface for the second participant, where the second direction is different from the first direction; and in a third video conference user interface for the third participant, a characteristic location of the second participant in the third video conference user interface for the third participant is located in a third direction from a characteristic location of the first participant in the third video conference user interface for the third participant, where the third direction is different from the first direction; in response to obtaining the information about the gaze of the first participant, providing information that indicates which characteristic location of another participant the first participant is looking at to one or more devices displaying of the video conference to enable video conference user interfaces at the one or more devices to indicate at which characteristic location of another participant the first participant is looking, including in accordance with a determination that a first set of criteria is satisfied, where the first set of criteria includes a criterion that is satisfied when the first participant is looking in the first direction in the video conference: modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant.

In accordance with some embodiments, a computer system is described. The computer system includes: means for obtaining information about gaze of a first participant in a video conference while the first participant, a second participant, and a third participant are participating in the video conference, where: in a first video conference user interface for the first participant, a characteristic location of the second participant in the first video conference user interface for the first participant is located in a first direction from a characteristic location of the first participant; in a second video conference user interface for the second participant, a characteristic location of the second participant is located in a second direction from a characteristic location of the first participant in the second video conference user interface for the second participant, where the second direction is different from the first direction; and in a third video conference user interface for the third participant, a characteristic location of the second participant in the third video conference user interface for the third participant is located in a third direction from a characteristic location of the first participant in the third video conference user interface for the third participant, where the third direction is different from the first direction; means, responsive to obtaining the information about the gaze of the first participant, for providing information that indicates which characteristic location of another participant the first participant is looking at to one or more devices displaying of the video conference to enable video conference user interfaces at the one or more devices to indicate at which characteristic location of another participant the first participant is looking, including in accordance with a determination that a first set of criteria is satisfied, where the first set of criteria includes a criterion that is satisfied when the first participant is looking in the first direction in the video conference: modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for live communication involving multiple participants, thereby increasing the effectiveness, efficiency, and user satisfaction with such devices. Such methods and interfaces may complement or replace other methods for live communication involving multiple participants.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 12 is a flow diagram illustrating a method for managing live communication between multiple participants using a computer system in accordance with some embodiments.

DESCRIPTION OF EMBODIMENTS

Figure 1A:
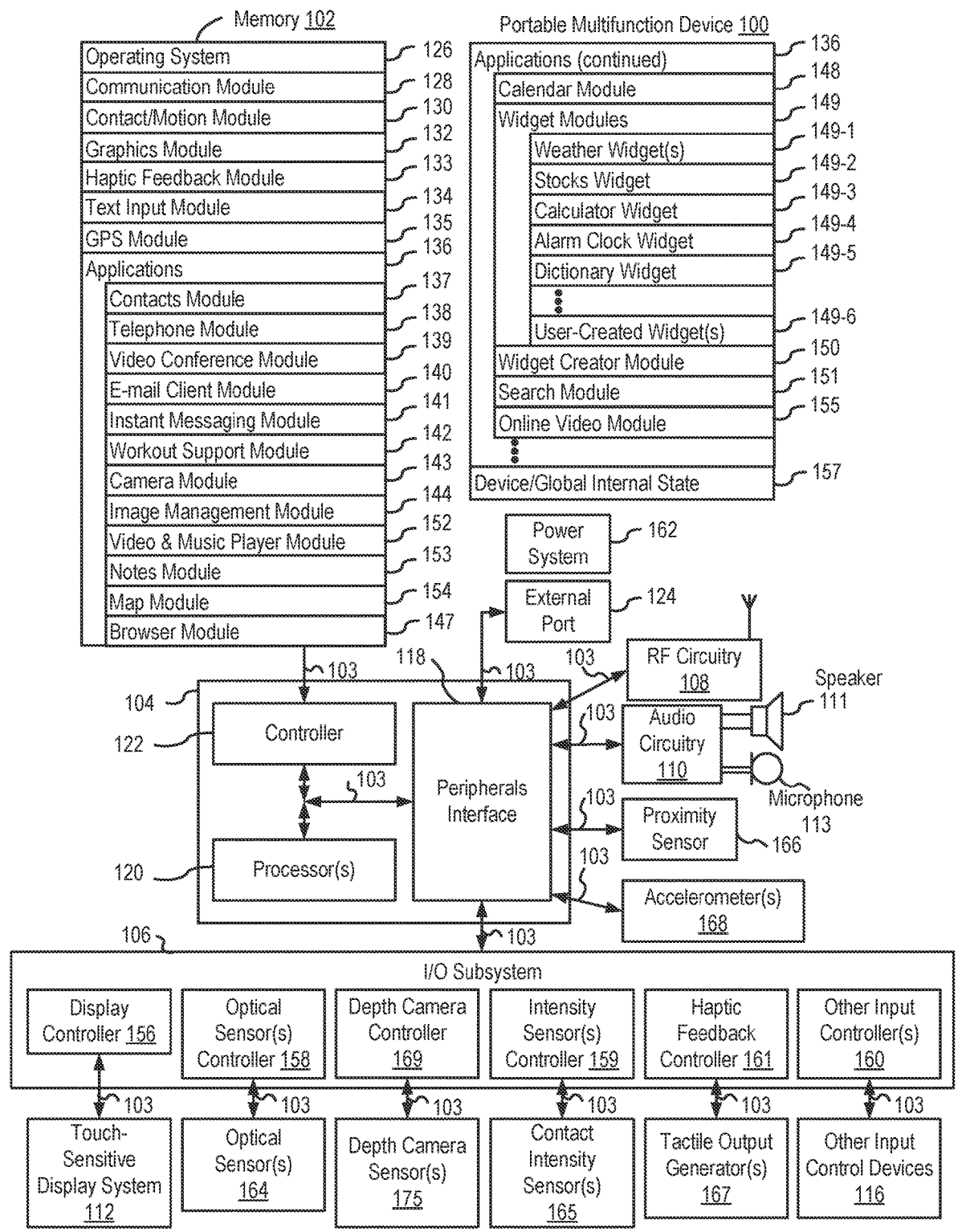
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for live communication involving multiple participants. For example, there is a need for electronic devices to allow participants in live communication sessions to identify when a particular user is looking at them. Such techniques can reduce the cognitive burden on a user who participate in live communication sessions, thereby enhancing productivity. Further, such techniques can reduce processor and battery power otherwise wasted on redundant user inputs.

Below, FIGS. 1A-1B, 2, 3, 4A-4B, and 5A-5C provide a description of exemplary devices for performing the techniques for managing event notifications. FIGS. 6A-6K, 7, 8A-8B, 9A-9C, and 10A-10C illustrate exemplary user interfaces for managing event notifications. FIG. 11 illustrates an exemplary diagram for managing live communication between multiple participants. FIG. 12 is a flow diagram illustrating a method for managing live communication between multiple participants. The user interfaces in FIGS. 6A-6K, 7, 8A-8B, 9A-9C, and 10A-10C and the diagram in FIG. 11 are used to illustrate the processes described below, including the processes in FIG. 12.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
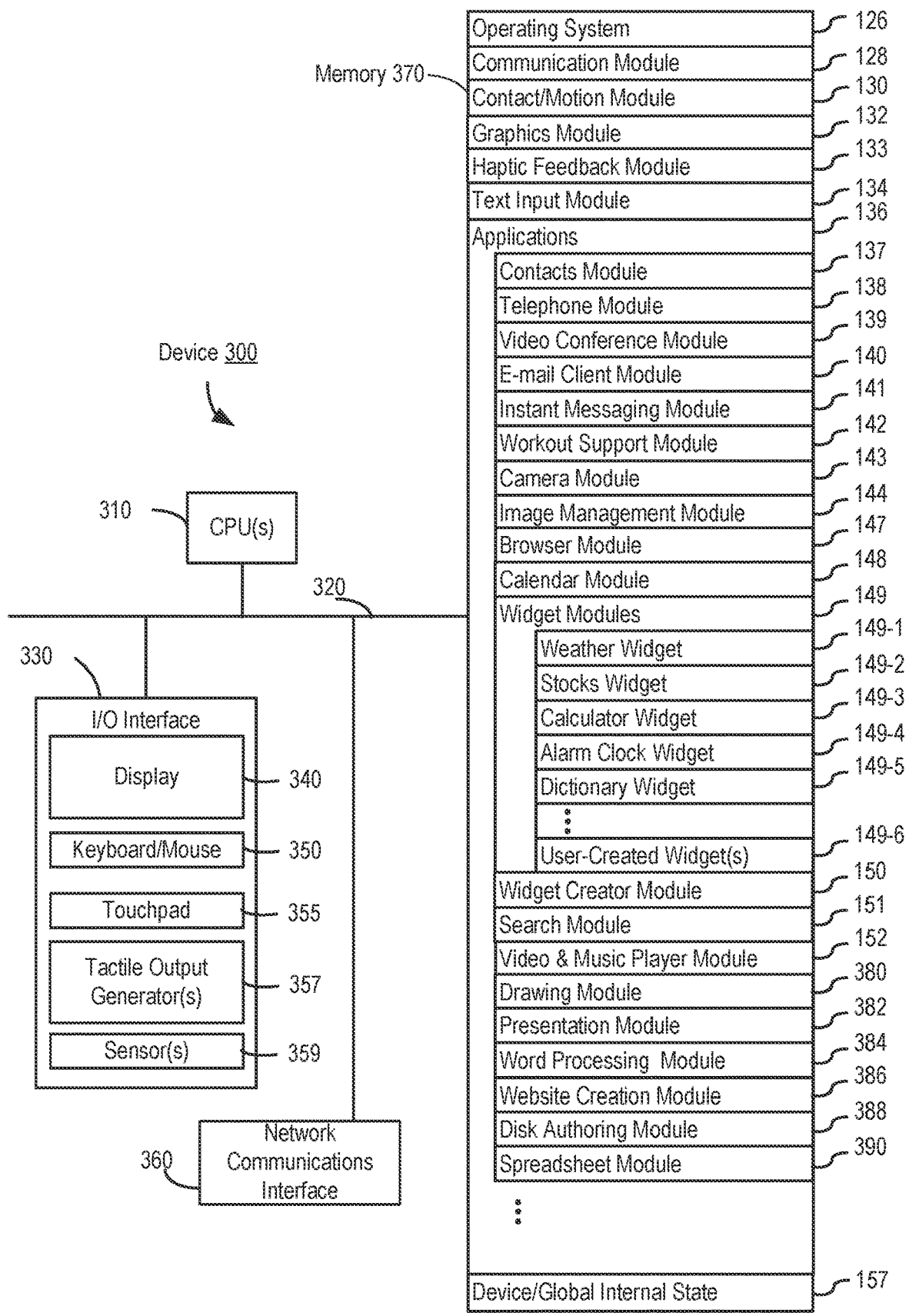
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
 Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;

Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
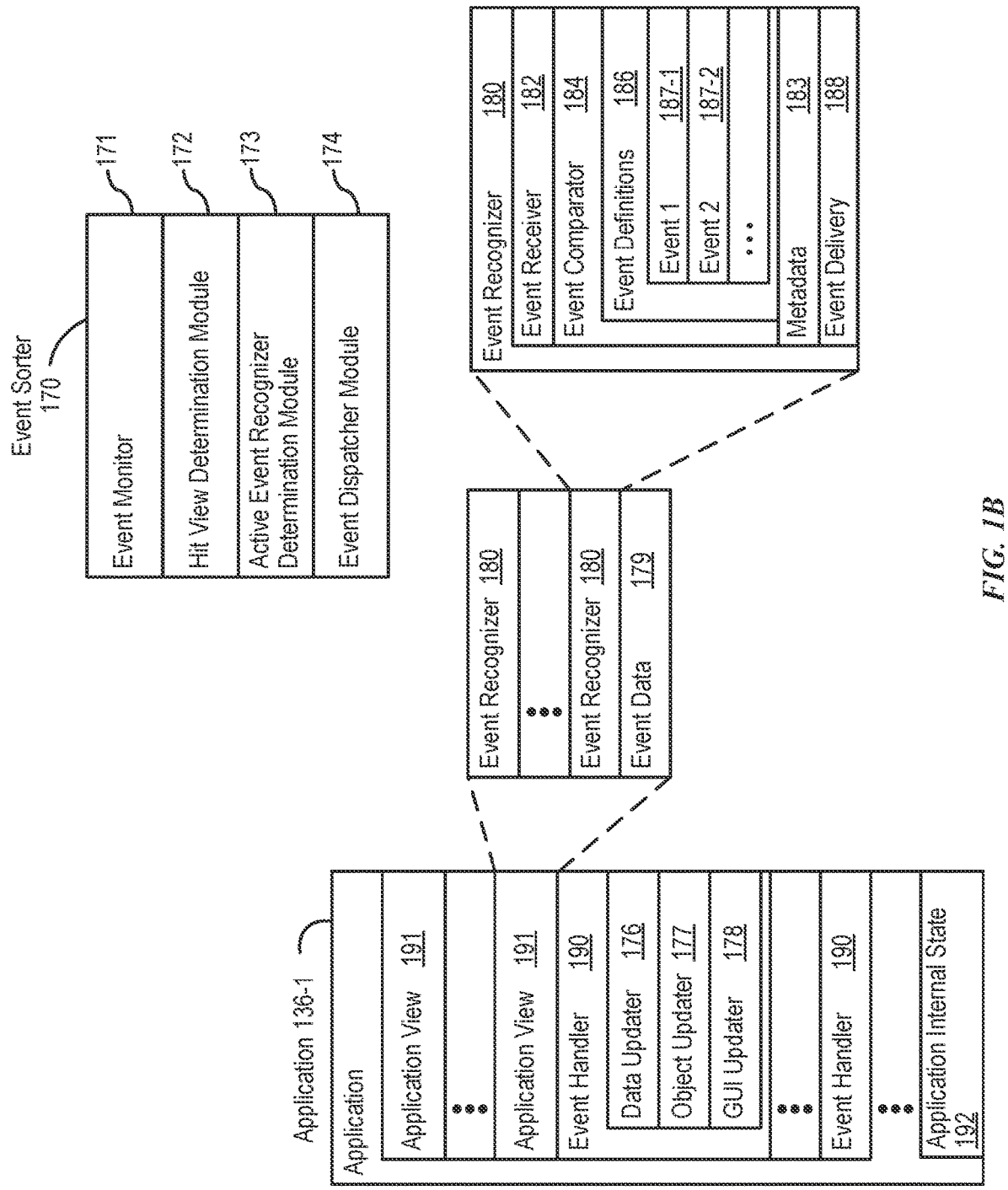
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113

(through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
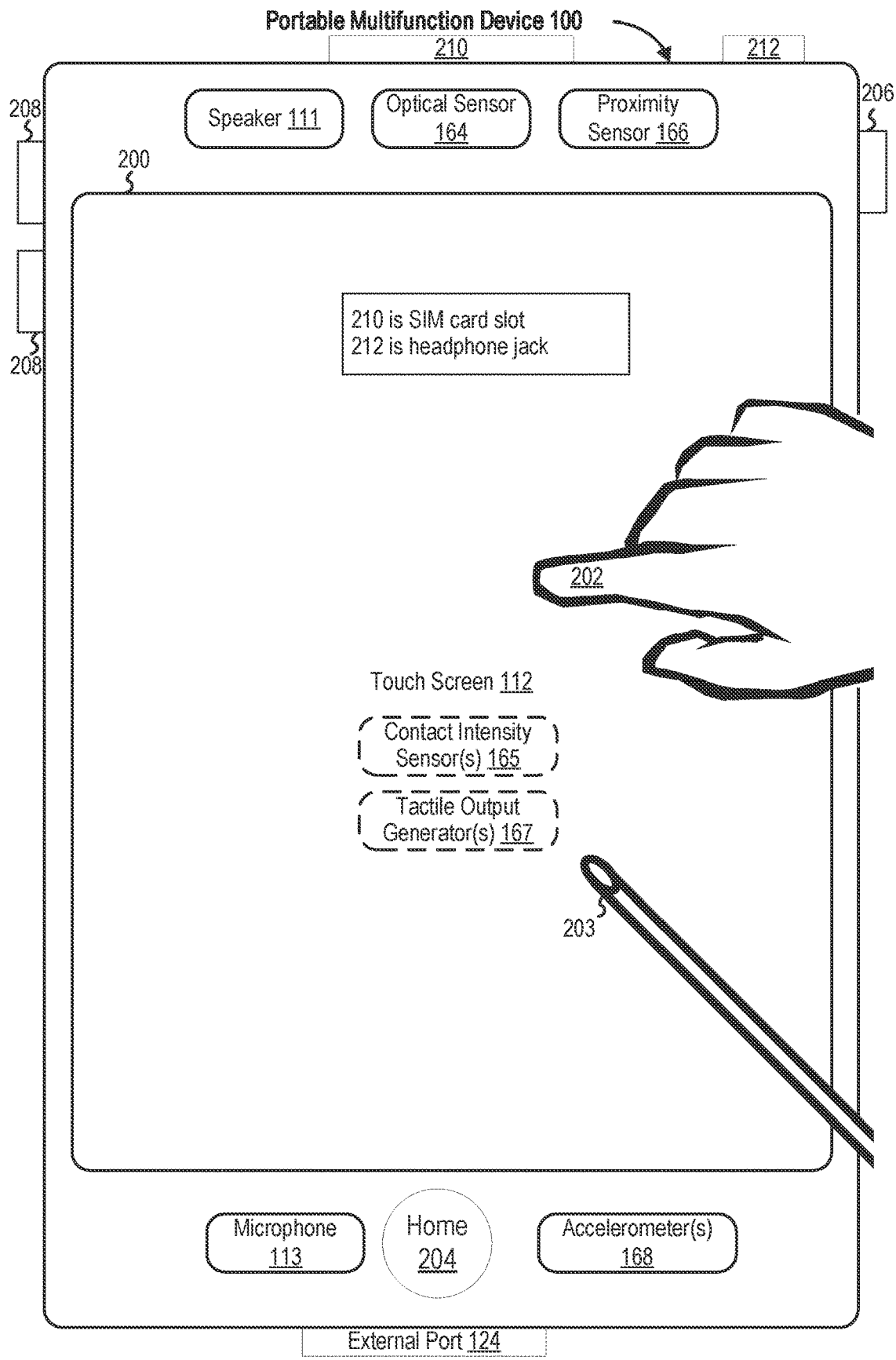
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
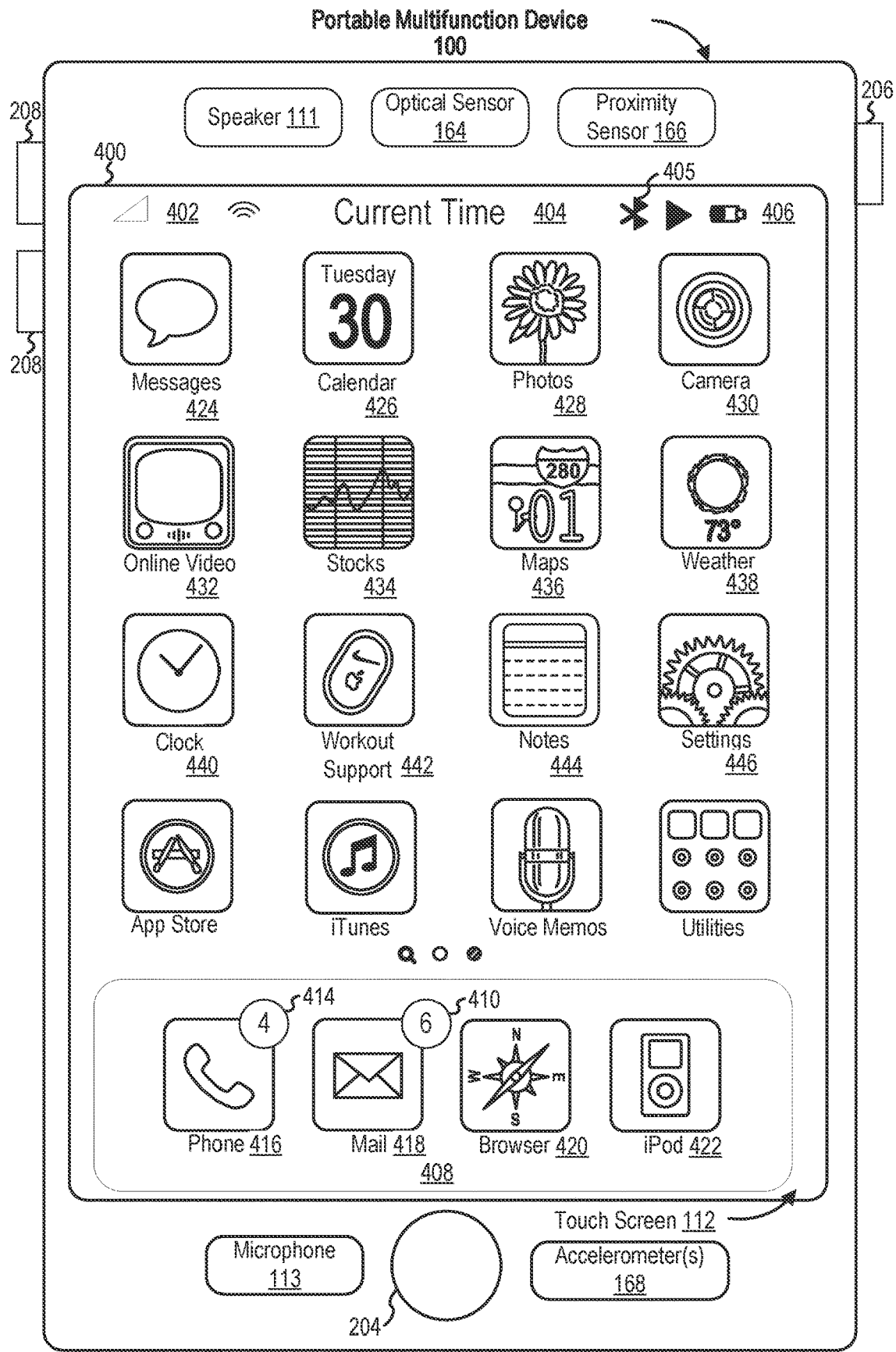
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
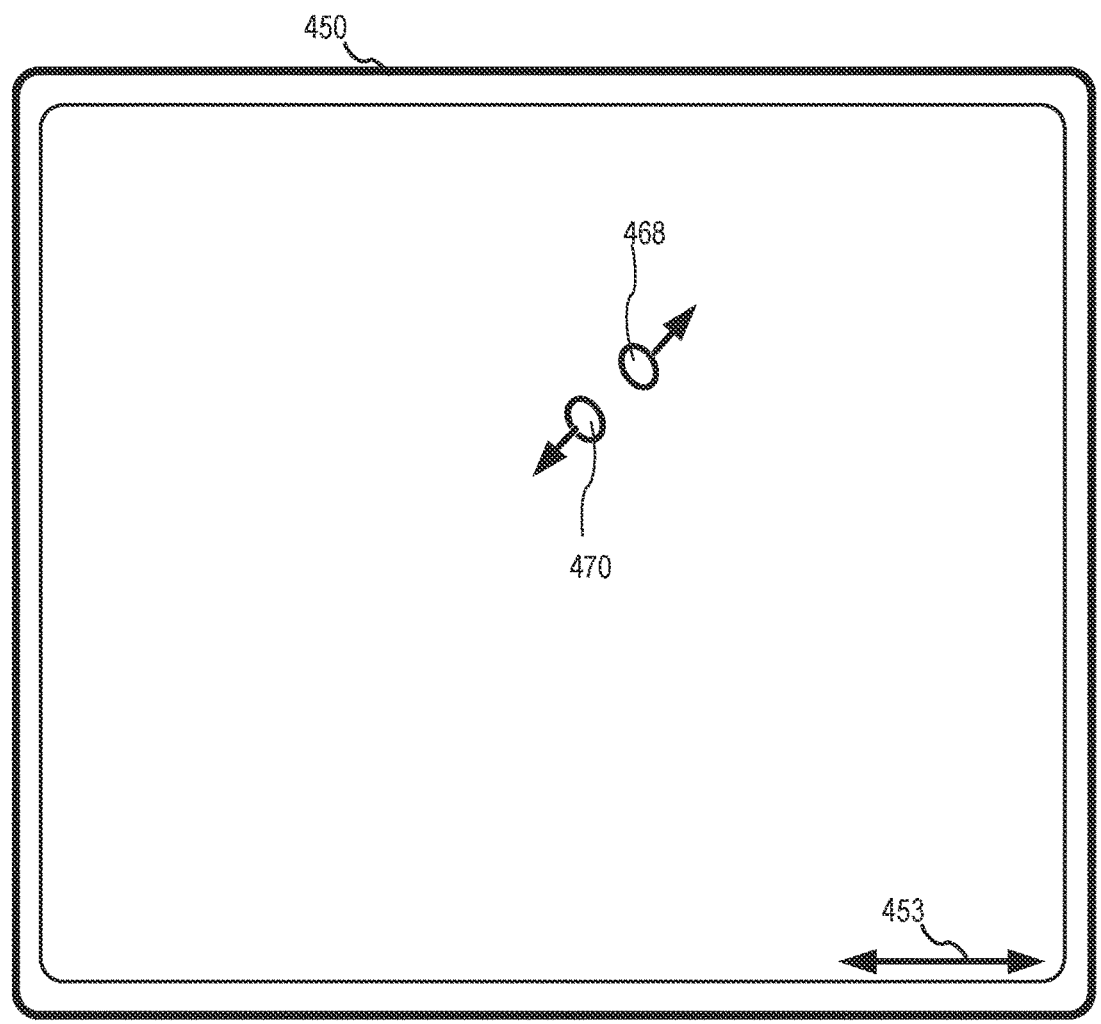
FIG. 4B illustrates an exemplary user interface for a multifunction device with a touch-sensitive surface that is separate from the display in accordance with some embodiments.
Figure 4B:
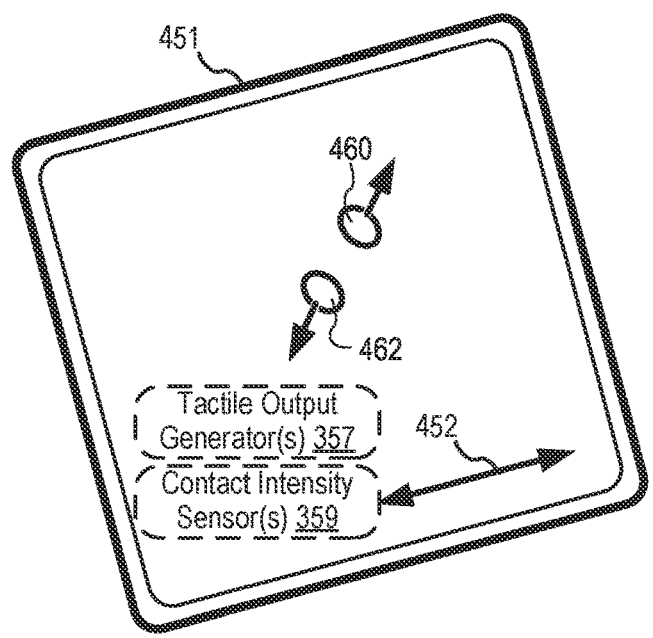

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
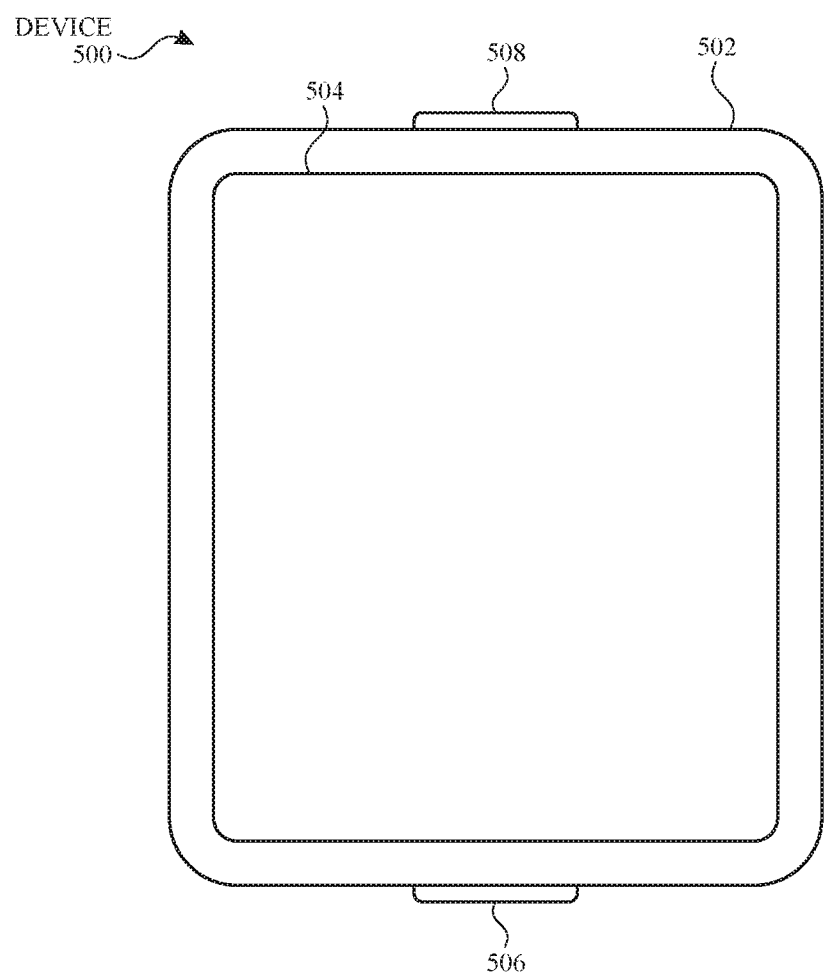
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
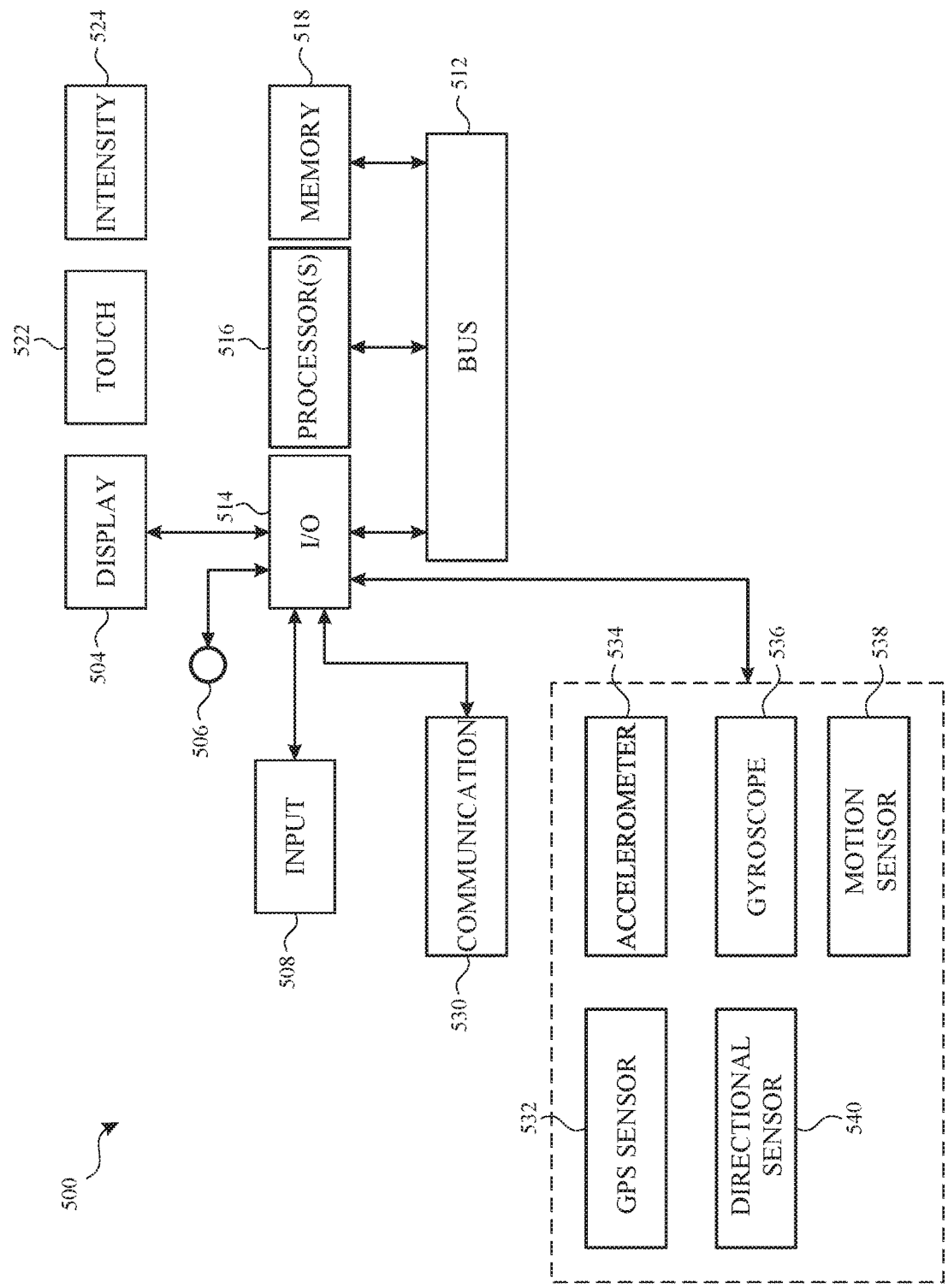
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 1200 (FIG. 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5C). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

Figure 5C:
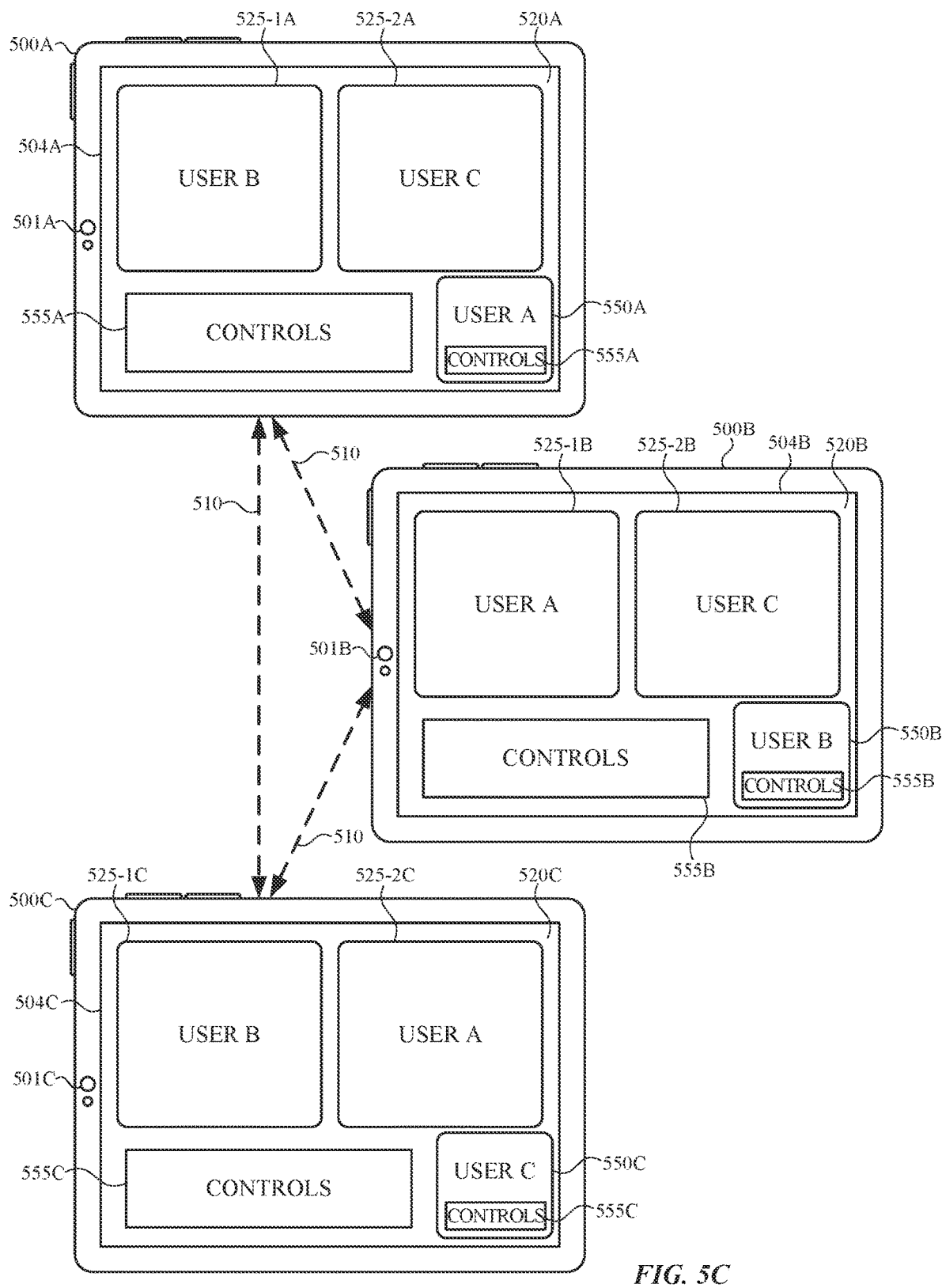
FIG. 5C illustrates an exemplary diagram of a communication session between electronic devices in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6A-6K, 7, 8A-8B, 9A-9C, and 10A-10C. In some embodiments, the communication session depicted in FIGS. 6A-6K, 7, 8A-8B, 9A-9C, and 10A-10C includes two or more electronic devices, even if the other electronic devices participating in the communication session are not depicted in the figures.

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6K illustrate exemplary techniques and user interfaces for managing live communication between multiple participants using a computer system in accordance with some embodiments. The user interfaces in these figures are used to illustrate the processes described below, including the processes in FIG. 12.

In FIGS. 6A-6K, participant 602*a* ("USER A"), participant 602*b* ("USER B"), and participant 602*c* ("USER C") are participating in a live or real-time video conference. As illustrated in FIGS. 6A-6K, participant 602*a* is using computer system 600*a*, participant 602*b* is using computer system 600*b*, and participant 602*c* is using computer system 600*c*. The examples provided in FIGS. 6A-6K show exemplary embodiments concerning modifying (or not modifying) a representation (e.g., image) of a gaze of a respective participant that is captured by one or more cameras of the computer system belonging to the respective participant. It should be understood that the embodiments provided in FIGS. 6A-6K are merely exemplary. In some embodiments, one or more other participants using one or more other computer systems are communicating in the live video conference. In some embodiments, the representations of gaze correction that are illustrated in FIGS. 6A-6K are not the exact representations of gaze correction that a respective computer system would display.

Figure 6A:
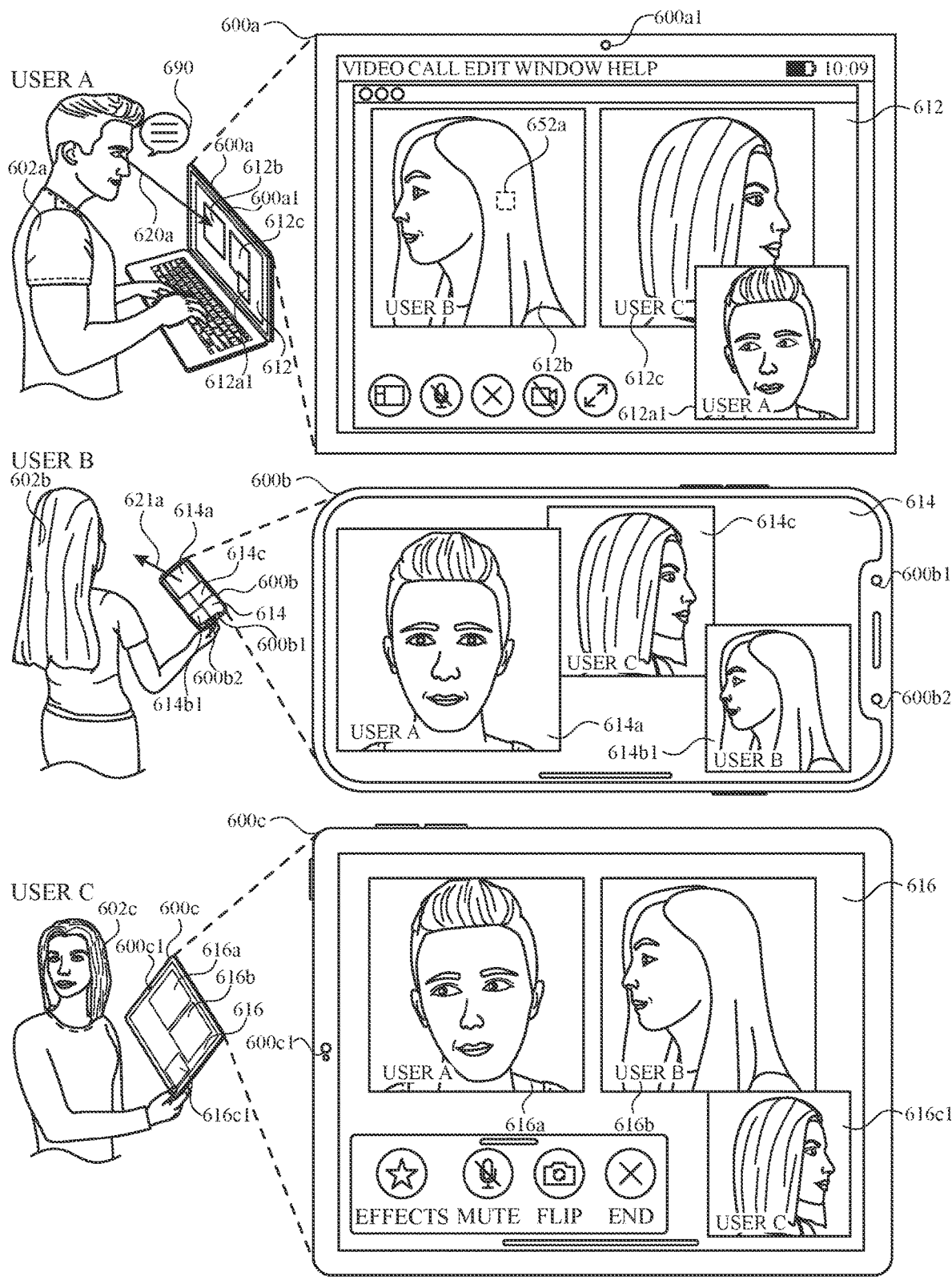
FIGS. 6A-6K illustrate exemplary user interfaces for managing live communication between multiple participants using a computer system in accordance with some embodiments.

FIG. 6A illustrates computer system 600*a*, computer system 600*b*, and computer system 600*c* ("the computer systems"). Computer system 600*a* is a laptop, computer system 600*b* is a phone, and computer system 600*c* is a tablet. In some embodiments, one or more of the computer systems is a different computer system than the computer system depicted in FIG. 6A. In some embodiments, one or more of the computer systems is a laptop, phone, tablet, smartwatch, head-mounted display unit, etc. In some embodiments, one or more of the computer systems are and/or include one or more features of devices 100, 300, and 500.

As illustrated in FIG. 6A, computer system 600a includes camera 600a1, which is currently capturing images (e.g., video) participant 602a ("USER A") that is in the field-of-view of camera 600a1. Computer system 600b includes cameras 600b1 and 600b2, where one or more of cameras 600b1-600b2 is currently capturing images of participant 602b ("USER B") that is in the field-of-view of at least one of cameras 600b1-600b2. Computer system 600c includes camera 600c1, which is currently capturing images of participant 602c ("USER C") that is in the field-of-view of camera 600c1. In some embodiments, cameras 600a1, 600b1, 600b2, and 600c1 ("the cameras"), at a minimum, include an image sensor that is capable of capturing data representing a portion of the light spectrum (e.g., visible light, infrared light, or ultraviolet light). In some embodiments, one or more of the cameras include multiple image sensors and/or other types of sensors. In addition to capturing data representing sensed light, in some embodiments, one or more of the cameras are capable of capturing other types of data, such as depth data. For example, in some embodiments, one or more of the cameras also capture depth data using techniques based on speckle, time-of-flight, parallax, or focus. Image data that the computer systems capture using one or more of the cameras includes data corresponding to a portion of the light spectrum for a scene within the field-of-view of one or more of the cameras. Additionally, in some embodiments, the captured image data also includes depth data for the light data. In some other embodiments, the captured image data contains data sufficient to determine or generate depth data for the portion of the light spectrum.

In some embodiments, one or more of the computer systems include a depth camera (e.g., as part of each of the one or more cameras), such as an infrared camera, a thermographic camera, or a combination thereof. In some embodiments, one or more of the computer systems further include a light-emitting device (e.g., light projector), such an IR floodlight, a structured light projector, or a combination thereof. In some embodiments, the light-emitting device is, optionally, used to illuminate the subject during capture of the image by a visible light camera and a depth camera (e.g., an IR camera), and the information from the depth camera and the visible light camera are used to determine a depth map of different portions of a subject captured by the visible light camera. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three-dimensional" scene, and the "255" value represents pixels that are located closest to a viewpoint (e.g., camera) in the "three-dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the one or more computer systems to determine contours of the object of interest in a z direction.

As stated above, in FIG. 6A, participant 602a, participant 602b, and participant 602c are participating in a live video conference with each other. Participant 602a ("USER A") is using computer system 600a that is displaying a video conference user interface 612. Video conference user interface 612 includes selfie-view representation 612a1, participant representation 612b, and participant representation 612c. Selfie-view representation 612a1 is a representation of a view captured by camera 600a1 (which, in FIG. 6A, includes a representation of participant 602a that is in the field-of-view of and is captured by camera 600a1). Participant representation 612b is a representation of the view captured by one or more of cameras 600b1-600b2 of computer system 600b, and participant representation 612c is a representation of the view captured by camera 600c1 of computer system 600c. In some embodiments, information (e.g., data) representing the field-of-view of one or more of cameras 600b1-600b2 and/or camera 600c1 is transmitted to computer system 600a (e.g., via a server and/or one or more of computer systems 600b and 600c), and participant representation 612b and participant representation 612c are representations of the information that is transmitted to computer system 600a. In some embodiments, one or more of the computer systems and/or a server modifies information representing the field-of-view of one or more of cameras 600b1-600b2 and/or camera 600c1. In some embodiments, participant representation 612b and/or participant representation 612c is a representation of the modified version of the information representing the field-of-view view of one or more of cameras 600b1-600b2 and/or camera 600c1.

As illustrated in FIG. 6A, participant 602b ("USER B") is using computer system 600b that is displaying a video conference user interface 614. Video conference user interface 614 includes selfie-view representation 614b1, participant representation 614a, and participant representation 614c. Selfie-view representation 614b1 is a representation of a view captured by one or more of cameras 600b1-600b2 (which, in FIG. 6B, includes a representation of participant 602b that is in the field-of-view of and is captured by one or more of cameras 600b1-600b2). Participant representation 614a is a representation of the view captured by camera 600a1 of computer system 600a, and participant representation 614c is a representation of the view captured by camera 600c1 of computer system 600c. In some embodiments, information (e.g., data) representing the field-of-view of camera 600a1 and/or camera 600c1 is transmitted to computer system 600b (e.g., via a server and/or one or more of computer systems 600a and 600c), and participant representation 614a and participant representation 614c are representations of the information that is transmitted to computer system 600b. In some embodiments, one or more of the computer systems and/or a server modifies information representing the field-of-view of camera 600a1 and/or camera 600c1. In some embodiments, participant representation 614a and/or participant representation 614c is a representation of the modified version of the information representing the field-of-view of camera 600a1 and/or camera 600c1.

As illustrated in FIG. 6A, participant 602c ("USER C") is using computer system 600c that is displaying a video conference user interface 616. Video conference user interface 616 includes selfie-view representation 616c1, participant representation 616a, and participant representation 616b. Selfie-view representation 616c1 is a representation of a view captured by camera 600c (which, in FIG. 6C, includes a representation of participant 602c that is in the field-of-view of and is captured (e.g., currently being) by camera 600c). Participant representation 616a is a representation of the view captured by camera 600a1 of computer system 600a, and participant representation 616b is a representation of the view captured by one or more cameras 600b1-600b2 of computer system 600b. In some embodiments, information (e.g., data) representing the field-of-view of camera 600a1 and/or one or more of cameras 600b1-600b2 is transmitted to computer system 600c (e.g., via a server and/or one or more of computer systems 600a and 600b), and participant representation 616a and participant representation 616b are representations of the information that is transmitted to computer system 600c. In some embodiments, one or more of the computer systems and/or a server modifies information representing the field-of-view of camera 600a1 and/or one or more of cameras 600b1-600b2. In some embodiments, participant representation 616a and/or participant representation 616b is a representation of the modified version of the information representing the field-of-view of camera 600a1 and/or one or more of cameras 600b1-600b2.

At FIG. 6A, computer system 600a captures (e.g., detects) gaze 620a of participant 602a via camera 600a1. Gaze 620a is directed to participant representation 612b. While gaze 620a is directed to participant representation 612b, FIG. 6A shows gaze indication 621a coming out of computer system 600b to illustrate that gaze 620a is virtually directed to participant 602b and/or computer system 600b has received information that gaze 620a has been captured by computer system 600a and is directed to participant 602b. In addition, FIG. 6A includes gaze location indicator 652a on participant representation 612b, which indicates the position of the gaze of participant 602a on computer system 600a. It should be understood that gaze location indicator 652a is illustrated to aid understanding and, in some embodiments, computer system 600a does not display gaze location indicator 652a.

At FIG. 6A, based on a determination that gaze 620a of participant 602a is directed to (e.g., in the direction of) participant representation 612b (e.g., participant 602a is "looking at" participant 602b in user interface 612), computer system 600b displays participant representation 614a of FIG. 6A. Participant representation 614a includes a modified version of the representation of gaze shown in selfie-view representation 612a1 (e.g., the field-of-view of camera 600a1 that is captured and includes the gaze of participant 602a). Thus, participant representation 614a of FIG. 6A depicts a different gaze for participant 602a than the gaze of participant 602a that is captured by camera 600a1. For example, the representation of participant 602a in participant representation 614a appears to be looking straight ahead (e.g., eyes forward, head evenly oriented) while the gaze of participant 602a in representation 612a1 does not appear to be looking straight ahead (e.g., eyes to the left and head tilted to the left, as shown by selfie-view representation 612a1). As illustrated in FIG. 6A, because a determination was made that gaze 620a is not directed to participant representation 612c (e.g., participant 602a is not looking at representation 612c of participant 602c), computer system 600c displays participant representation 616a of FIG. 6A. Participant representation 616a of FIG. 6A is representative of the gaze of participant 602a in the field-of-view of camera 600a1 that is captured (e.g., an unmodified representation of the gaze). Thus, at FIG. 6A, computer system 600c does not modify the gaze of participant 602a in representation 616a because no determination was made that participant 602a is looking at the representation of participant 602c. Similarly, the other participant representations of FIG. 6A (e.g., participant representations 612b, 612c, 614c, 616b) are also representative of the representation of the gaze of each respective participant (e.g., 602b, 602c) that each respective participant's computer system (e.g., 600b, 600c) is currently capturing (e.g., unmodified representations of the gaze).

Figure 6B:
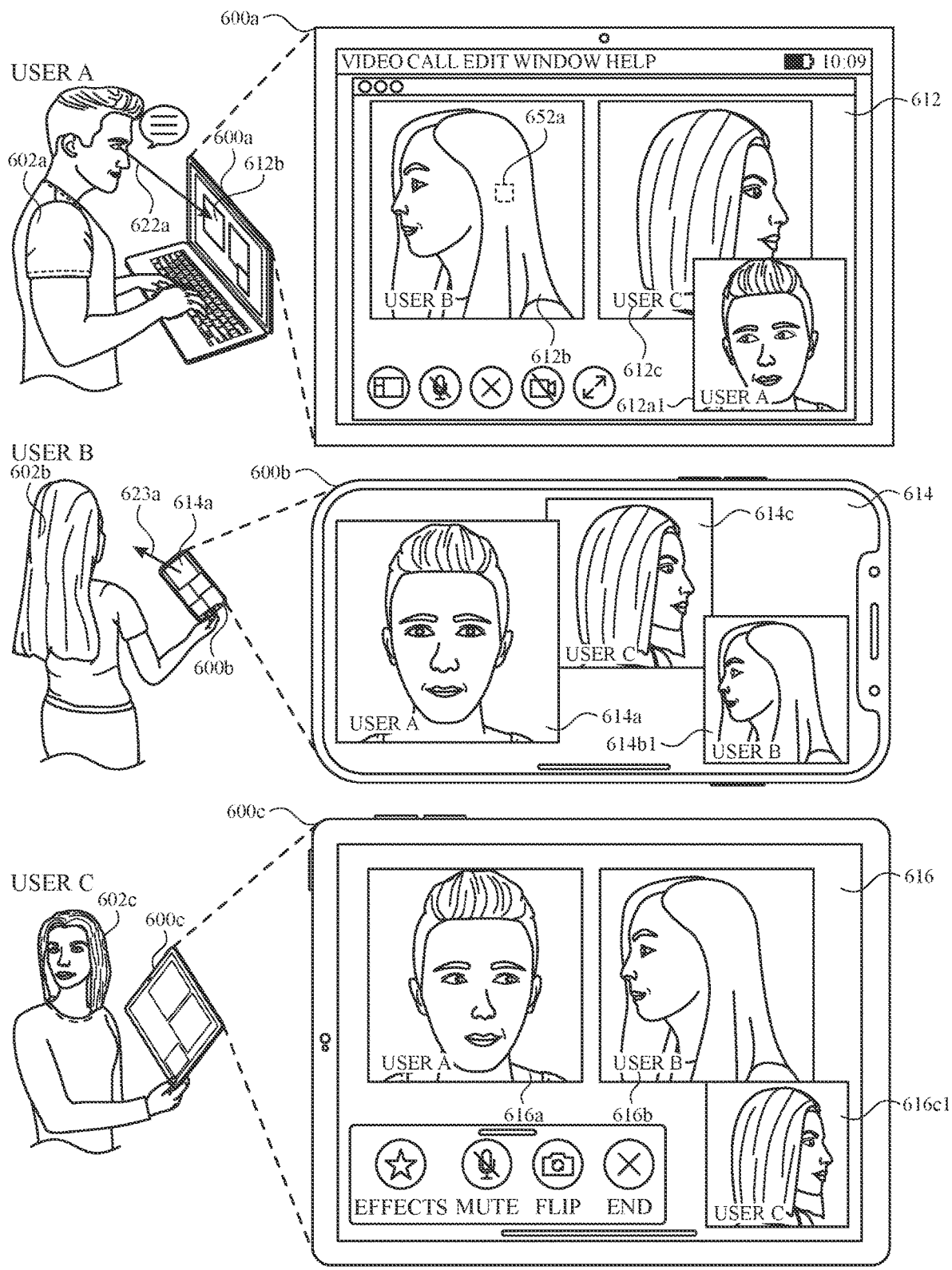

FIG. 6B illustrates an alternative embodiment to the embodiment shown in FIG. 6A. In particular, participant representation 616a is modified in FIG. 6B because the determination is made that gaze 622a of participant 602a is directed to participant representation 612b (as opposed to not being modified in FIG. 6A based on the same determination). At FIG. 6B, computer system 600a captures gaze 622a of participant 602a via camera 600a1. Similar to gaze 620a in FIG. 6A, gaze 622a is directed to participant representation 612b. In addition, gaze indication 623a is shown coming out of computer system 600b to illustrate that gaze 622a is directed to participant 602b and/or computer system 600b has received information that gaze 622a has been captured by computer system 600a and is directed to participant 602b. At FIG. 6B, computer system 600b displays participant representation 614a of FIG. 6B because the determination is made that gaze 622a is directed to participant representation 612b, using similar techniques and for similar reasons as described above in relation to displaying participant representation 614a of FIG. 6A.

As illustrated in FIG. 6B, computer system 600c displays participant representation 616a of FIG. 6B because the determination is made that gaze 622a of participant 602a is directed to participant representation 612b (and, in some embodiments, because the determination was not made that gaze 622a is directed to participant representation 612c). In FIG. 6B, participant representation 616a includes a modified version of the representation of gaze shown in selfie-view representation 612a1. However, the representation of the gaze shown in participant representation 616a displayed by computer system 600c has not been modified in the same way as the representation of the gaze shown in participant representation 614a displayed by computer system 600b. As illustrated in FIG. 6B, participant representation 616a shows participant 602a looking towards participant representation 616b instead of straight ahead (and/or forward) like participant 602a is shown in participant representation 614a. Notably, participant representation 616a shows participant 602a looking towards participant representation 616b to represent that participant 602a is looking at participant 602b (or the representation of participant 602b on device 600a). Moreover, participant representation 614a is shown looking straight ahead to represent that participant 602a is looking at participant 602b (or the representation of participant 602b on device 600a), who is using computer system 600b. Thus, when a determination is made that a respective participant is looking at another participant, one or more of the computer systems can modify one or more of the participant representations for the respective participant looking at the other participant using different techniques (e.g., displaying representations of the participant looking at the other participant that have been modified differently). Further, as described above in relation to FIG. 6B, a representation of a respective participant that is looking at another participant can be modified on a computer system associated with a participant that is not the respective participant or the other participant at which the respective participant is looking. As illustrated in FIG. 6B, the other participant representations of FIG. 6B are displayed using similar techniques as described above in relation to FIG. 6A.

Figure 6C:
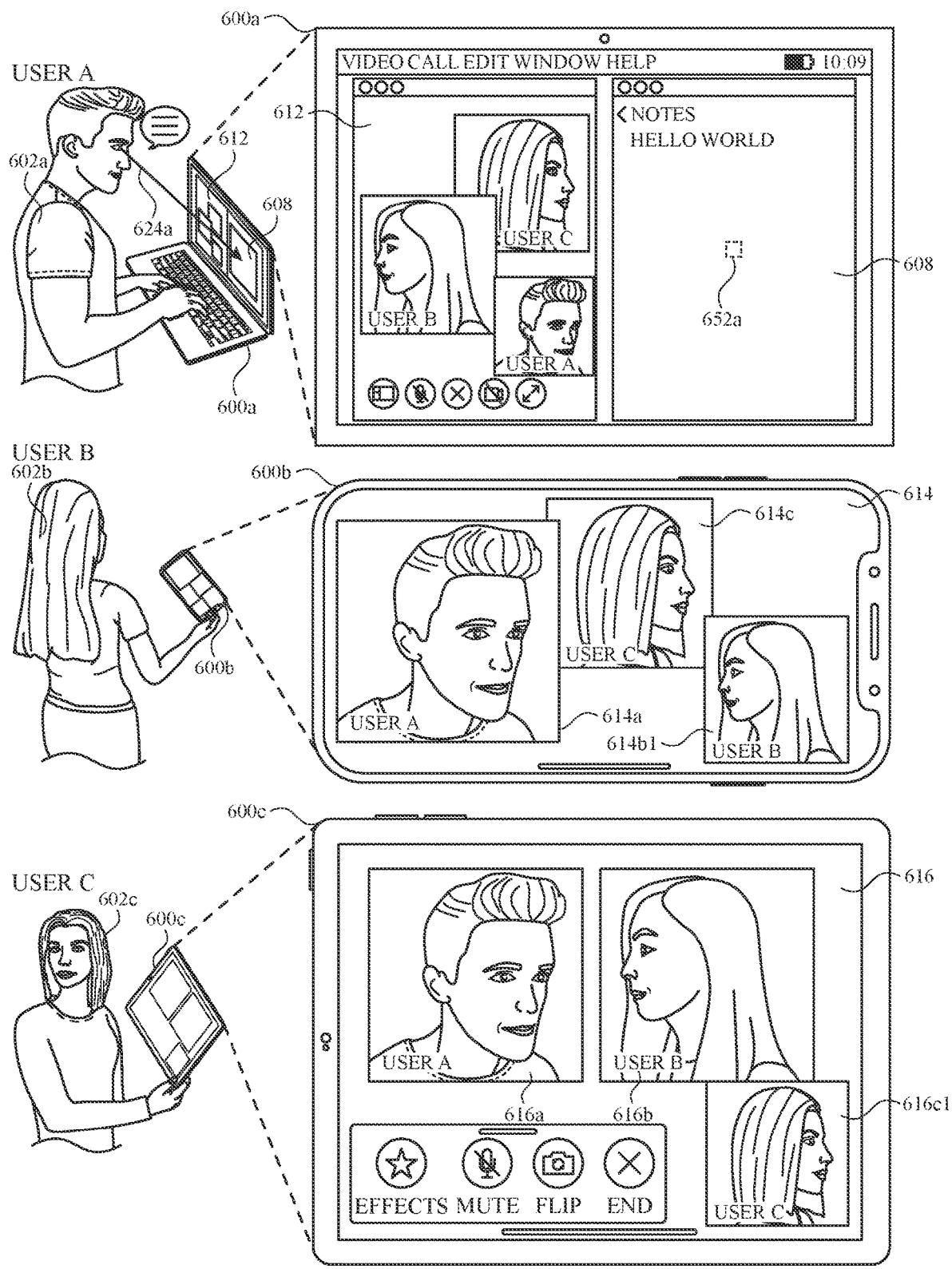

FIG. 6C illustrates an embodiment where representations for a participant are not modified when a determination is made that the participant is looking at a user interface for an application that is different from the video conference application. As illustrated in FIG. 6C, computer system 600a captures gaze 624a of participant 602a. In FIG. 6C, gaze 624a is directed to notes application user interface 608. Notes application user interface 608 is a user interface for a notes application that is different from the video conference application that includes video conference user interface 612. As illustrated in FIG. 6C, because a determination is made that gaze 624a is directed to notes application user interface 608, participant representation 614a and participant representation 616a of FIG. 6C include the representation of the gaze of participant 602a as captured by camera 600a1. For example, participant representation 614a and participant representation 616a are not modified versions of selfie-view representation 612a1 in FIG. 6C.

Alternatively, in some embodiments, participant representation 614a and participant representation 616a include a modified representation of the gaze that is currently being captured by camera 600a1, such that participant 602a appears to be looking straight ahead in participant representation 614a and participant representation 616a. In these embodiments, participant representation 614a and participant representation 616a include a modified representation of the gaze because participant 602b is directed to a user interface for a particular application (e.g., a presenter application, such as an application with a slide deck, a programming application, a whiteboard application, a notes application, etc.). Thus, in some embodiments, a participant representation is modified when a determination is made that a participant is looking at a particular type of application and not modified when a determination is made that the participant is looking at a different application that has a type (e.g., non-presenter application) that is different from the particular type of application. In some embodiments, participant representation 614a and participant representation 616a include a modified representation of the gaze because participant 602b is sharing an application with other participants in the live video conference. In some embodiments, no participant representations (e.g., 612b, 612c, 614c, 616b) for a respective participant are modified (or some participant representations for a respective participant are not modified) when a determination is made that the respective participant is not looking at the display screen of their respective computer systems (e.g., as shown in FIG. 6C while participant 602b is not looking at the display screen of computer system 600b and/or participant 602c is not looking at the display screen of computer system 600c).

Figure 6D:
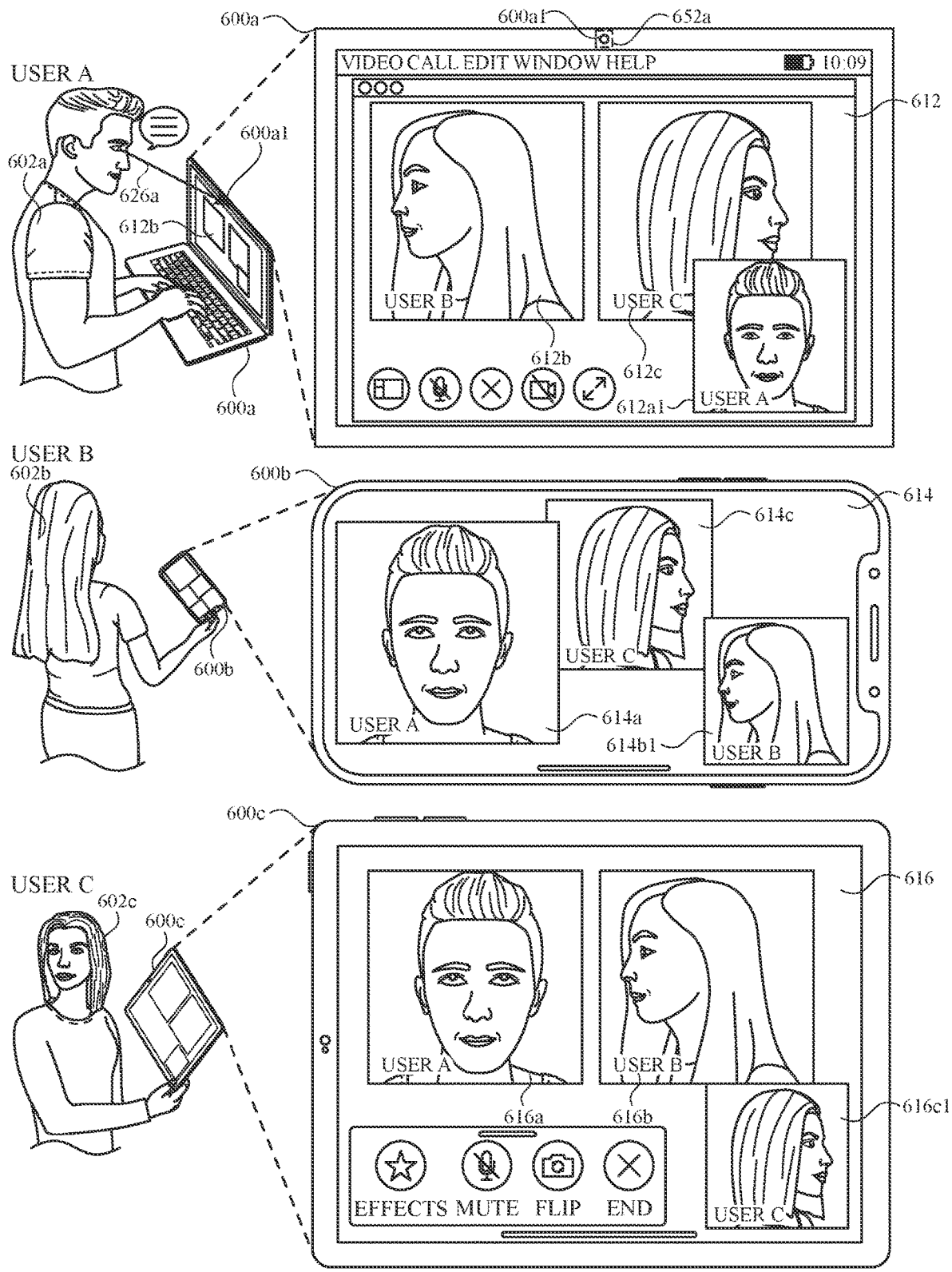

FIG. 6D illustrates an embodiment where representations for a participant include a modified representation of the gaze for the participant when a determination is made that the participant is looking at a camera of the participant's computer system (e.g., or a particular area of the display of the participant computer system). When the participant is looking at the camera, the representation of the gaze of the participant that is displayed on another participant's computer system can show the participant looking straight ahead (e.g., like participant representation 614a in FIG. 6A), which can make it appear that the respective participant is looking at the other participant. Thus, to avoid confusion, the representations of the gaze of the participant can be modified on the other participant's computer system, such that the respective participant does not appear to be looking straight ahead.

As illustrated in FIG. 6D, computer system 600a captures gaze 626a of participant 602a. At FIG. 6D, a determination is made that gaze 626a is directed to camera 600a1 of computer system 600a. As illustrated in FIG. 6D, because the determination is made that gaze 626a is directed to camera 600a1, participant representation 614a and participant representation 616a of FIG. 6D include a modified representation of the gaze that is currently being captured by camera 600a1 (e.g., modified versions of selfie-view representation 612a1). In particular, participant representation 614a and participant representation 616a depict a representation of participant 602a, where the eyes of participant 602a have been shifted up to show that participant 602a is not looking at the representation of participant 602b and/or the representation of participant 602c (e.g., using their respective computer systems). In some embodiments, participant representation 614a and participant representation 616a include a representation of participant 602a, where the head of participant 602a has been titled up (or in another direction) to show that participant 602a is not looking at the representation of participant 602b and/or the representation of participant 602c.

Figure 6E:
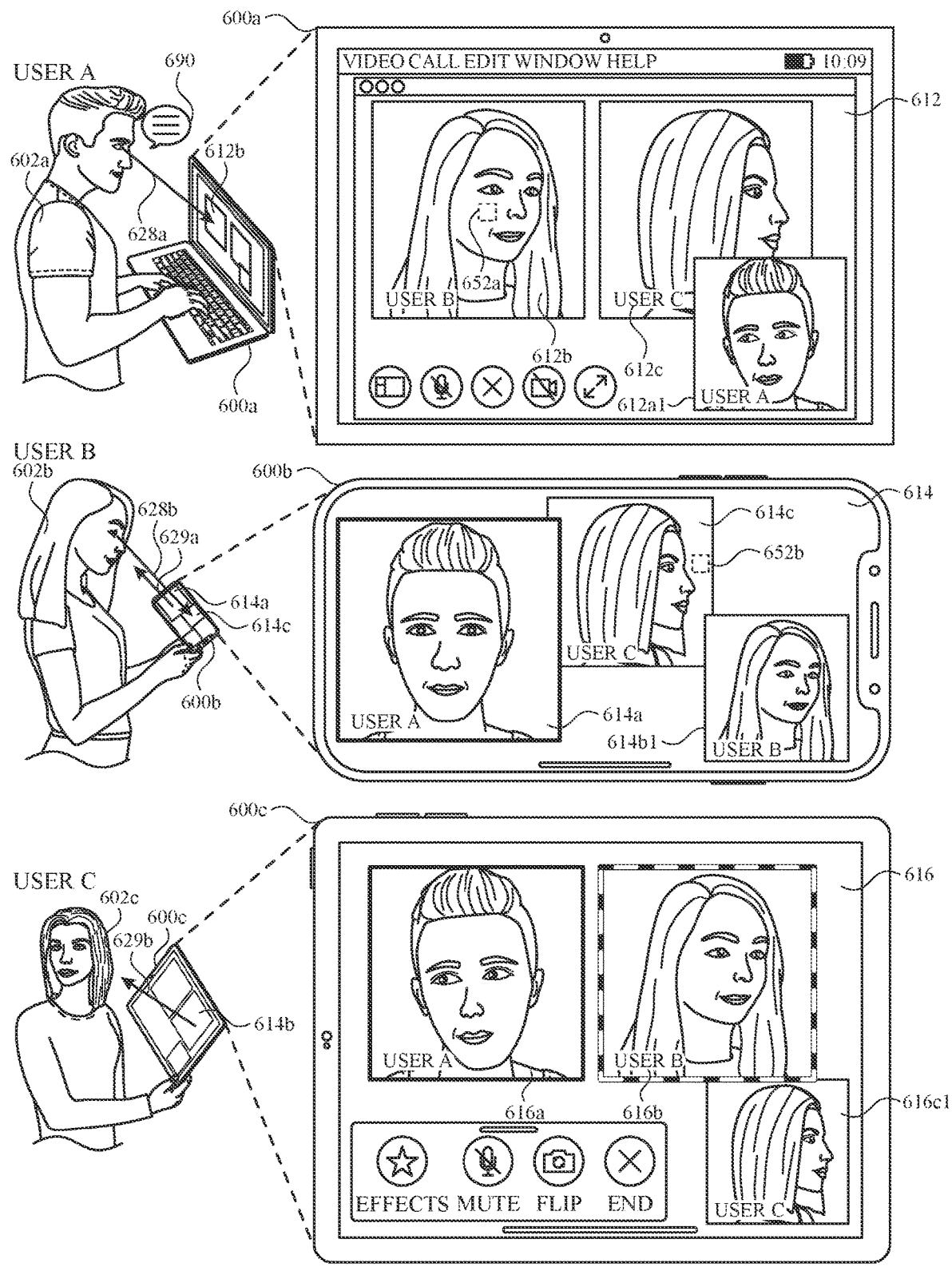

FIG. 6E illustrates an embodiment where a gaze for a participant is modified only when a determination is made that the participant is a presenter and is looking at another participant. In some embodiments, a participant is determined to be a presenter if the participant has more than a threshold amount of activity (e.g., measured by an amount of movement, speech, sound, etc.) over a predetermined period of time (e.g., 60 seconds, 5 minutes, etc.). In some embodiments, the gaze of a participant is modified only when the live video conference is in a particular mode (e.g., a presenter mode) in addition to the other determinations discussed previously in reference to FIG. 6E.

As illustrated in FIG. 6E, computer system 600a captures gaze 628a of participant 602a directed to participant representation 612b, and computer system 600b captures gaze 628b of participant 602b directed to participant representation 614c. At FIG. 6E, determinations are made that gaze 628a is directed to participant representation 612b (e.g., participant 602a is looking at participant 602b as indicated by gaze indication 629a) and that participant 602a is a presenter (e.g., and/or is presenting as indicated by talk bubble 690). As illustrated in FIG. 6E, based on these determinations, participant representation 614a and participant representation 616a are displayed to include a modified representation of the gaze captured by camera 600a1, using similar techniques as those discussed above in relation to participant representation 614a of FIG. 6B and participant representation 616a of FIG. 6B. At FIG. 6E, determinations are also made that gaze 628b of participant 602b is directed to participant representation 614c (e.g., participant 602b is looking at participant 602c as indicated by gaze indication 629b) and that participant 602b is not a presenter (e.g., and/or not presenting as indicated by no talk bubble being adjacent to participant 602b in FIG. 6E). Thus, although a determination is made that gaze 628b of participant 602b is directed to participant representation 614c, participant representation 612c and participant 614c include a representation of the gaze that is captured by camera 600c1 because participant 602b is not a presenter. FIG. 6E also includes gaze location indicator 652b on participant representation 614c, which indicates the position of the gaze of participant 602b on computer system 600b. It should be understood that gaze location indicator 652b is illustrated to aid understanding and, in some embodiments, computer system 600b does not necessary display gaze location indicator 652b As illustrated in FIG. 6E, the representations of participant 602a (e.g., participant representation 614a and participant representation 616a) are emphasized (e.g., have a bolder border than other participant representations) to indicate that participant 602a is a presenter in the live video conference and participant representation 616b is emphasized to indicate that participant 602b is a person at whom the presenter (e.g., participant 602a) is looking. Thus, a participant can decipher who is a presenter and whom the presenter is looking at based on the participant representation(s) that are emphasized on the video conference user interface of the participant's computer system. As shown in FIG. 6E, a representation of a presenter (or the person whom the presenter is looking at) can be emphasized using the same technique on multiple computer systems (e.g., the border of participant representation 614a is emphasized in the same way as the border of participant representation 616a). In addition, as shown in FIG. 6E, the representation for the presenter and the representation for a participant at which the presenter is looking are emphasized differently (e.g., different patterns surrounding the participant representations). In some embodiments, emphasizing a participant representation can include shading, changing the color of, changing the size of, moving, etc. the participant representation relative to another participant representation. In some embodiments, participant representation 612b is also emphasized (e.g., in the same way that participant representation 616b is emphasized).

Figure 6F:
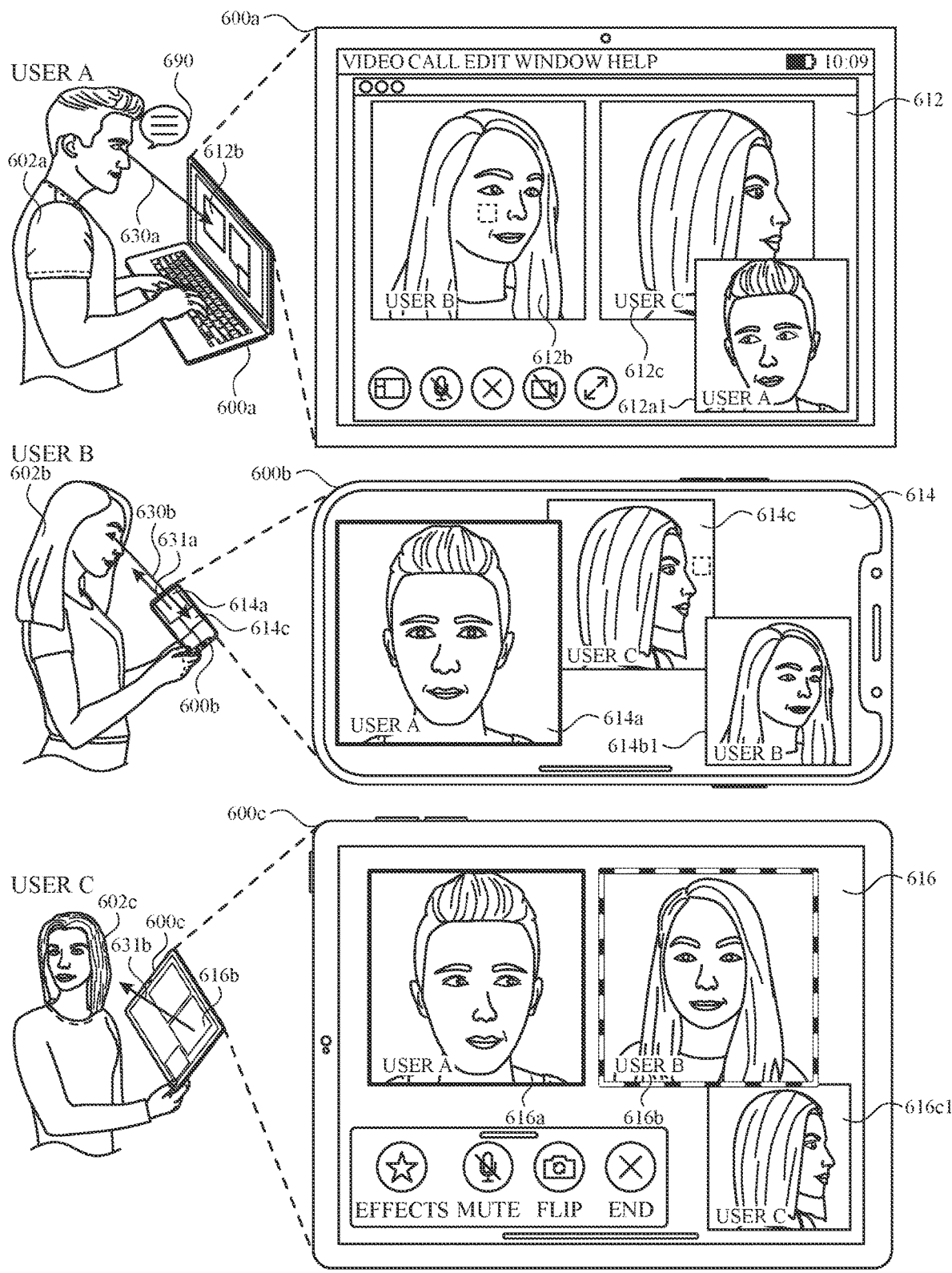

FIG. 6F is an alternative embodiment to the embodiment discussed in relation to FIG. 6E. Among other things, FIG. 6F illustrates an embodiment where the representation of the gaze for a respective participant is modified when a determination is made that the respective participant is looking at another participant, irrespective of whether the respective participant is a presenter. At FIG. 6F (similar to FIG. 6E), participant 602a is a presenter (e.g., as indicated by talk bubble 690), and participant 602b is not a presenter. At FIG. 6F, computer system 600a captures gaze 630a of participant 602a directed to participant representation 612b, and computer system 600b captures gaze 630b of participant 602b directed to participant representation 614c. At FIG. 6F, a determination is made that gaze 630a of participant 602a is directed to participant representation 612b (e.g., participant 602a is looking at participant 602b as indicated by gaze indication 631a), and participant representation 614a and participant representation 616a of FIG. 6F are displayed to include a modified representation of the gaze being captured by camera 600a1 because of this determination (e.g., using similar techniques as those discussed above in relation to participant representation 614a of FIG. 6E and participant representation 616a of FIG. 6E). At FIG. 6F, a determination is made that gaze 630b of participant 602b is directed to participant representation 614c (e.g., participant 602b is looking at participant 602c as indicated by gaze indication 631b). As illustrated in FIG. 6F, because the determination is made that gaze 630b is directed to participant representation 614c, participant representation 616b of FIG. 6F includes a modified representation of the gaze captured by one or more of cameras 600b1-600b2 (e.g., modified version of selfie-view representation 614b1). As illustrated in FIG. 6F, participant representation 616b shows participant 602b looking straight ahead (e.g., at participant 602c who is using computer system 600c).

With respect to participant representation 612b, computer system 600a displays participant representation 612b with an unmodified representation of the gaze of participant 602b (e.g., the gaze that is captured by the one or more cameras 600b1-600b2; the same gaze as shown in selfie-view representation 614b1). Here, participant representation 612b includes a representation of the gaze of participant 602b that is currently being captured of the one or more cameras 600b1-600b2 because the representation of participant 602b shown in participant representation 612b appears to be looking at participant representation 612c corresponding to participant 602c. In other words, a respective participant representation can be displayed with an unmodified representation of the gaze when a determination is made that the gaze in the respective participant representation is oriented towards the participant representation of the participant at which the respective participant is looking. However, in FIG. 6F, participant representation 616a of FIG. 6F includes a modified representation of the gaze captured by camera 600a because the representation of participant 602a shown in participant representation 616a would not appear to be looking at participant representation 616b if participant representation 616a included an unmodified representation of the gaze captured by camera 600a. In some embodiments, participant representation 612b includes a modified representation of the gaze captured by camera 600a, irrespective of whether a participant representation that is displayed with a representation of the gaze captured by camera 600a would appear to be looking at participant representation 612c.

Figure 6G:
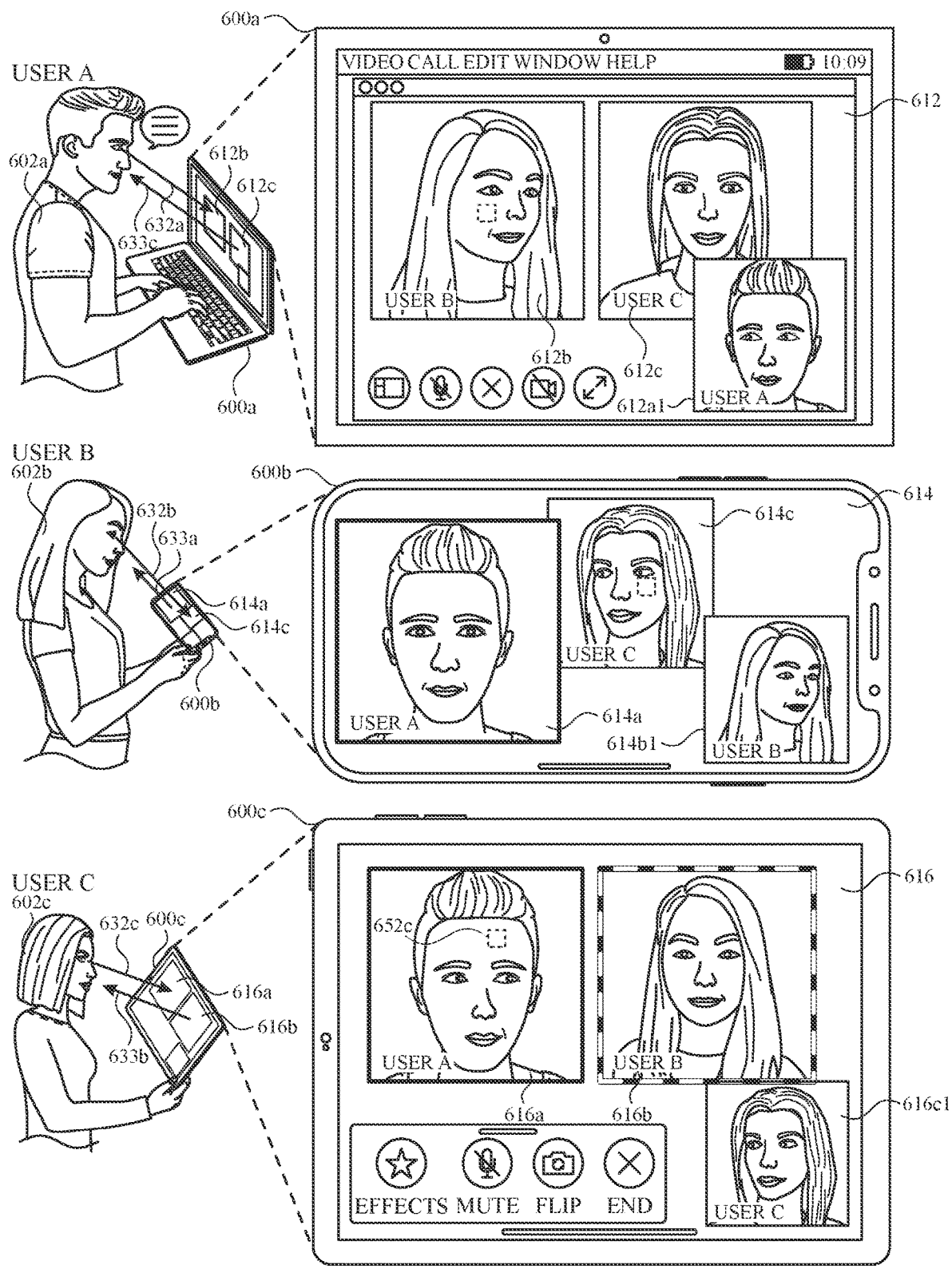

FIG. 6G illustrates an embodiment where the representation of the gaze for a participant is modified when a determination is made that the participant is looking at another participant. FIG. 6G illustrates an embodiment where the representation of the gaze for all three participant are changed based on the participant at which each of the three participants are looking. At FIG. 6G, computer system 600a captures gaze 632a of participant 602a directed to participant representation 612b, computer system 600b captures gaze 632b of participant 602b directed to participant representation 614c, and computer system captures gaze 632c directed to participant representation 616a.

At FIG. 6G, a determination is made that gaze 632a of participant 602a is directed to participant representation 612b (e.g., participant 602a is looking at participant 602b as indicated by gaze indication 633a). As a result, participant representation 614a and participant representation 616a are displayed in FIG. 6G to include a modified representation of the gaze being captured by camera 600a1 because of this determination (e.g., using similar techniques as those discussed above in relation to participant representation 614a of FIG. 6E and participant representation 616a of FIG. 6E).

At FIG. 6G, a determination is made that gaze 632b of participant 602b is directed to participant representation 614c (e.g., participant 602b is looking at participant 602c as indicated by gaze indication 633b). As a result, participant representation 616b in FIG. 6G includes a modified representation of the gaze being captured by one or more of cameras 600b1-600b2 because of this determination (e.g., using similar techniques as those discussed above in relation to participant representation 616b of FIG. 6F). As illustrated in FIG. 6G, participant representation 612b includes a representation of the gaze that is currently being captured by one or more cameras 600b1-600b2 (e.g., selfie-view representation 614b1), using similar techniques as described above in relation to participant representation 612b of FIG. 6F.

At FIG. 6G, a determination is made that gaze 632c of participant 602c is directed to participant representation 616a (e.g., participant 602c is looking at participant 602a as indicated by gaze indication 633c). As a result, participant representation 612c includes a modified representation of the gaze being captured by camera 600c1, where participant 602c represented in participant representation 612c appears to be looking straight ahead (e.g., at participant 602a who is using computer system 600a). As illustrated in FIG. 6G, participant representation 614c includes a representation of the gaze that is currently being captured by camera 600c1 (e.g., selfie-view representation 616c1), using similar techniques (and for similar reasons) as described above in relation to participant representation 612b of FIG. 6F. FIG. 6G also includes gaze location indicator 652c on participant representation 616a, which indicates the position of the gaze of participant 602c. It should be understood that gaze location indicator 652c is illustrated to aid understanding and, in some embodiments, computer system 600c does not necessary display gaze location indicator 652c.

Figure 6H:
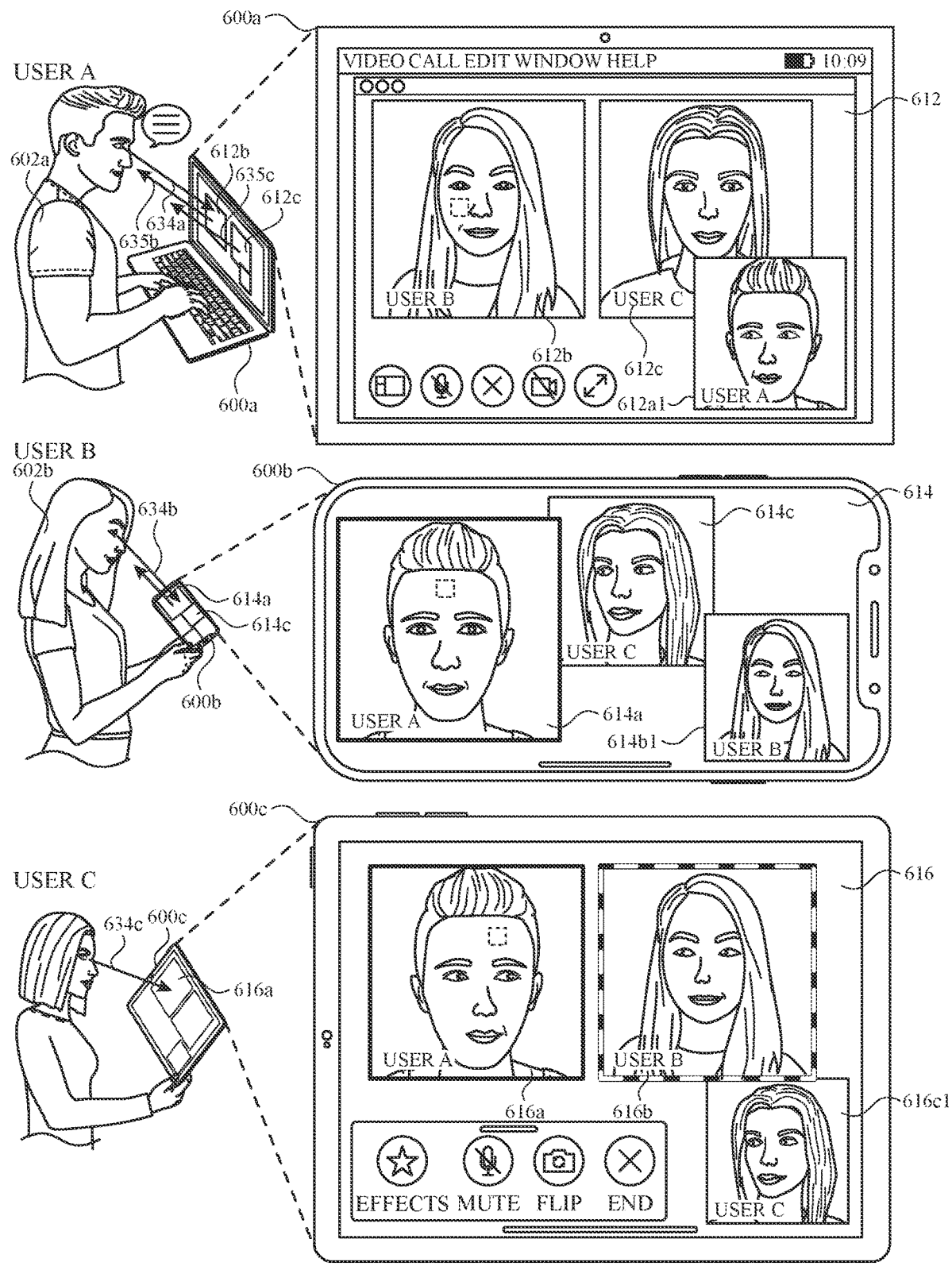

FIG. 6H illustrates an embodiment where the representation of the gaze for a participant is modified when a determination is made that the participant is looking at another participant. FIG. 6H is different from FIG. 6F in that the gaze of participant 602b is directed to participant 602a (e.g., 634b in FIG. 6H) instead of participant 602c (e.g., 632b in FIG. 6F). Thus, in video conference user interface 616, participant 602a included in participant representation 616a appears to be looking at participant 602b included in participant representation 616b to indicate that participant 602a and participant 602b are looking at each other.

At FIG. 6H, computer system 600a captures gaze 634a of participant 602a directed to participant representation 612b, computer system 600b captures gaze 634b of participant 602b directed to participant representation 614a, and computer system 600c captures gaze 634c directed to participant representation 616a. In FIG. 6H, participant representations 612b, 612c, 614a, 614c, and 616a include corrected and non-corrected representations using similar techniques as described above for each of these respective representations in relation to FIG. 6F.

However, in FIG. 6H, a determination is made that gaze 634b of participant 602b is directed to participant representation 614a (e.g., participant 602b is looking at participant 602a as indicated by gaze indication 635b). As a result, participant representation 616b of FIG. 6H includes a modified representation of the gaze being captured by one or more of cameras 600b1-600b2 because of this determination. In FIG. 6H, because a determination is made that gaze 634b is directed to participant representation 614a (e.g., looking at participant 602a), participant representation 616b of FIG. 6H shows participant 602b looking at participant representation 616a of participant 602a (and not straight forward at participant 602c). Moreover, the participants represented in participant representation 616a and participant representation 616b appear to be looking at each other because participant representation 616a has been corrected (e.g., using similar techniques as described above in relation to FIG. 6F).

As illustrated in FIG. 6H and with respect to computer system 600a, participant representation 612b of FIG. 6H includes a modified representation of the gaze that is captured by one or more of cameras 600b1-600b2 (e.g., the gaze of participant 602b) because the determination is made that gaze 634b is directed to participant representation 614a. Thus, in FIG. 6H, participant representation 612b and participant representation 612c show each of their respective participants looking straight ahead because both participants have been determined to be looking at participant 602a (e.g., as indicated by gaze indication 635b and gaze indication 635c). Thus, the gaze for multiple participants can be corrected in the same way when multiple participants are looking at another participant.

Figure 6I:
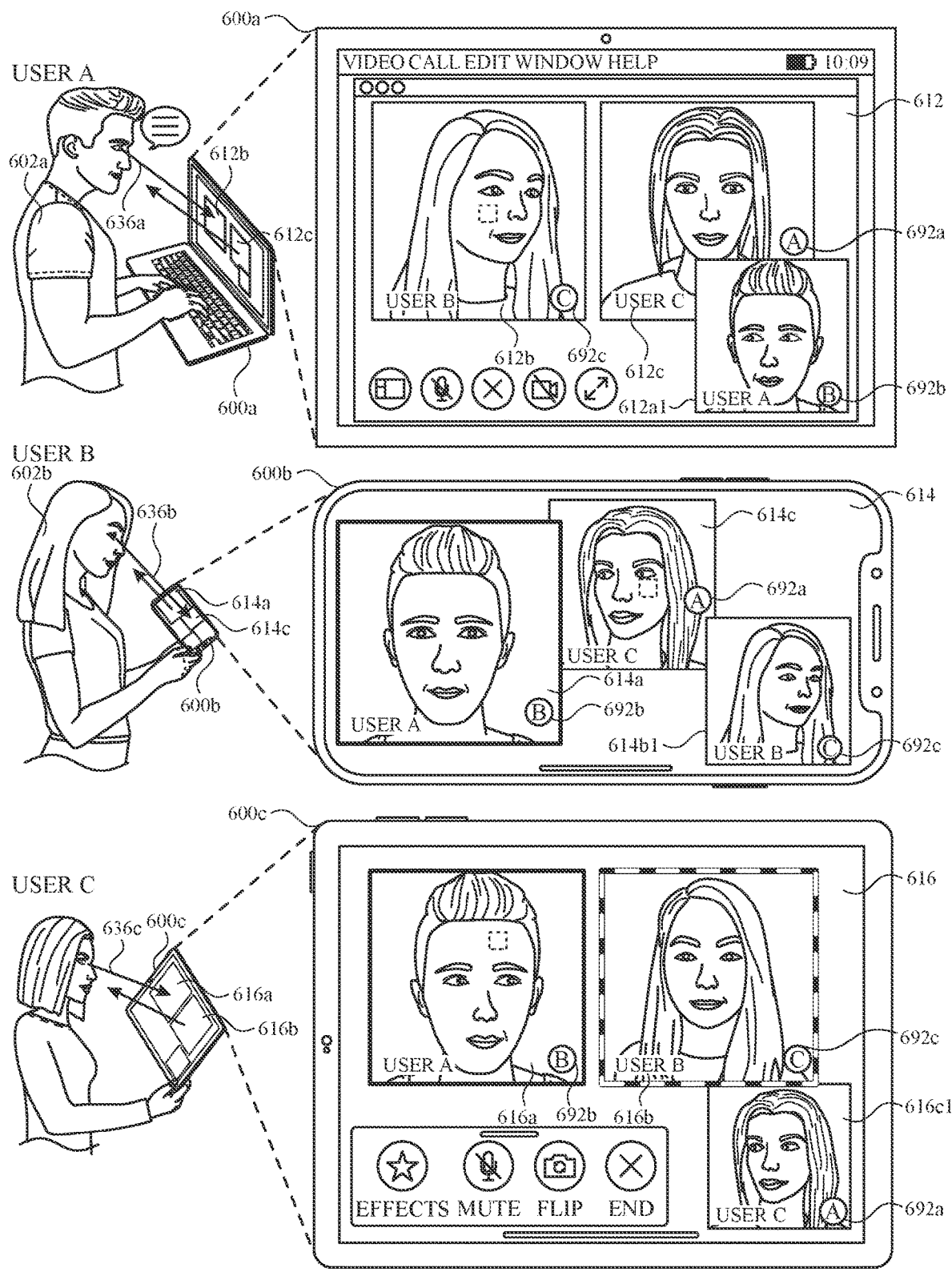

FIG. 6I illustrates an alternate embodiment to FIG. 6G, where participant indications (e.g., 692a-692c) are displayed (e.g., on participant representations) to indicate the participant at whom the respective participant is looking. At FIG. 6I, computer system 600a captures gaze 636a (e.g., same as gaze 632a of FIG. 6G) of participant 602a directed to participant representation 612b, computer system 600b captures gaze 636b (e.g., same as gaze 632b of FIG. 6G) of participant 602b directed to participant representation 614c, and computer system captures gaze 636c (e.g., same as gaze 632c of FIG. 6G) directed to participant representation 616a. As illustrated in FIG. 6I, the participant representations (612b, 612c, 614a, 614c, 616a, 616b) are displayed using similar techniques as described above in relation to FIG. 6G. However, in FIG. 6I, the participant representations include one of participant indication 692a-692c. Here, each of the participant representations include a participant indication of the participant at whom the participant represented by the participant representation is looking. For example, participant representations 612b and 616b of FIG. 6I include participant indication 692c (corresponding to participant 602c) because gaze 636b of participant 602b is directed to participant representation 614c (or participant 602c that is represented in participant representation 614c), participant representations 612c and 614c of FIG. 6I include participant indication 692a (corresponding to participant 602a) because gaze 636c of participant 602c is directed to participant representation 616a (or participant 602a that is represented in participant representation 616a), and participant representations 614a and 616a of FIG. 6I include participant indication 692b (corresponding to participant 602b) because gaze 636a of participant 602a is directed to participant representation 612b (or participant 602b that is represented in participant representation 612b). As shown in FIG. 6I, each respective participant's selfie-view representation includes a participant indication to indicate the participant at whom the participant of the respective device is looking. In some embodiments, participant indications (e.g., 692a-692c) can include an avatar of a respective participant, a name, an initial or initials, a color associated with a respective participant, etc.

In some embodiments, each of the participant representations can include a participant indication to indicate the participant that is looking at the participant represented by the participant representation. For example, in these embodiments, participant representations 612b and 616b would include participant indication 692a because gaze 636a of participant 602a is directed to participant representation 612b (participant 602a is looking at representation 612b of participant 602b), participant representations 612c and 614c would include participant indication 692b because gaze 636b of participant 602b is directed to participant representation 614c (participant 602b is looking at representation 614c of participant 602c), and participant representations 614a and 616a would include participant indication 692c because gaze 636c of participant 602c is directed to participant representation 616a (participant 602c is looking at representation 616a of participant 602a). In some embodiments, each respective participant's selfie-view representation can include a participate indication to indicate the participant that is looking at the participant represented by the participant's selfie-view representation.

Figure 6J:
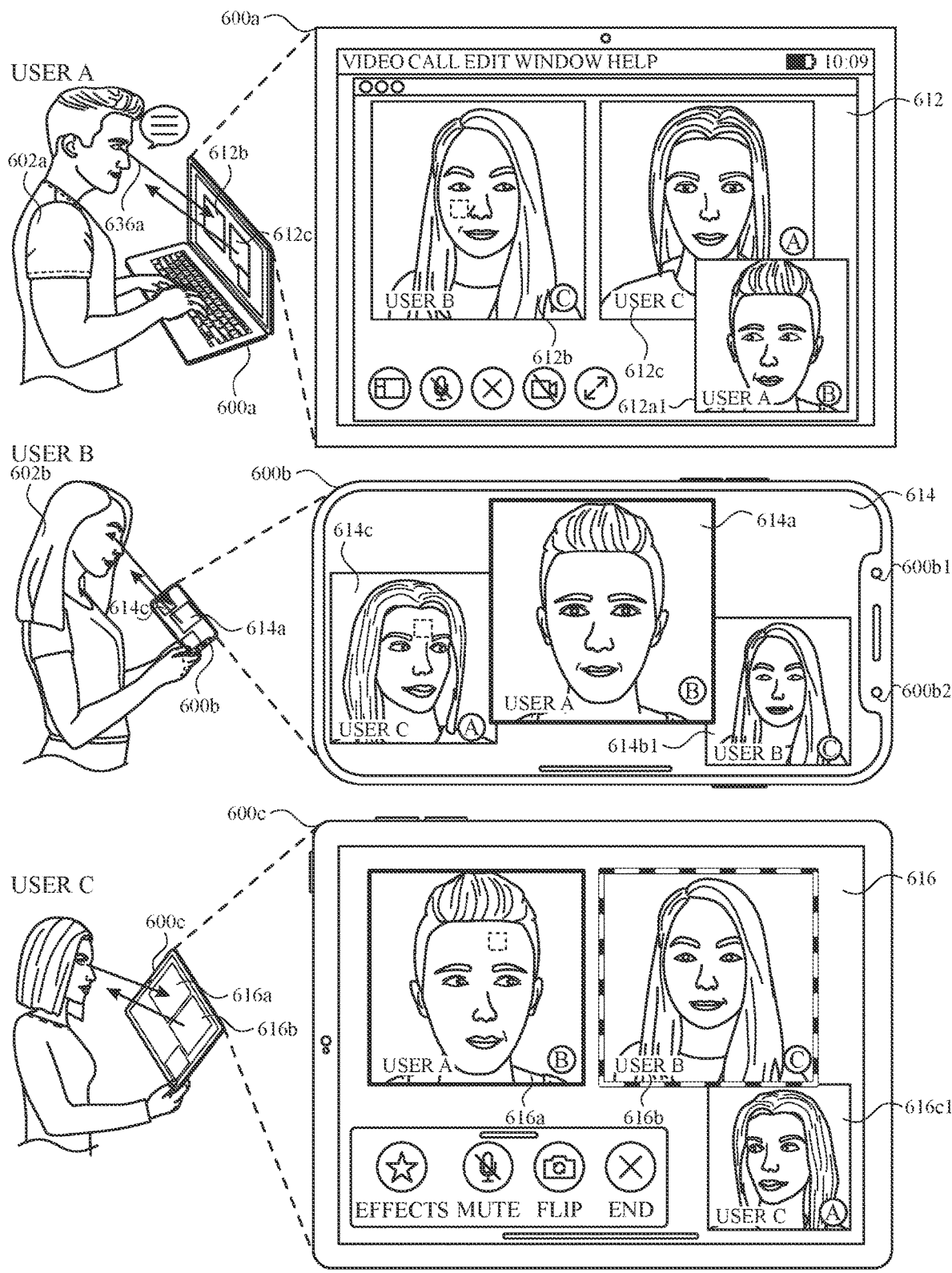

FIG. 6J illustrates an alternate (or additional) embodiment to FIG. 6I. At FIG. 6J, computer system 600a captures gaze 636a of participant 602a and a determination is made that gaze 636a is directed to participant representation 612b. As illustrated in FIG. 6J, because the determination is made that gaze 636a is directed to participant representation 612b, participant representation 614a on computer system 600b is moved closer to camera 600b1 (e.g., participant representation 614a and participant representation 614c swap positions). In some embodiments, a participant representation is moved to (or closer to) another predetermined location because the determination is made that gaze 636a is directed to participant representation 612b.

Figure 6K:
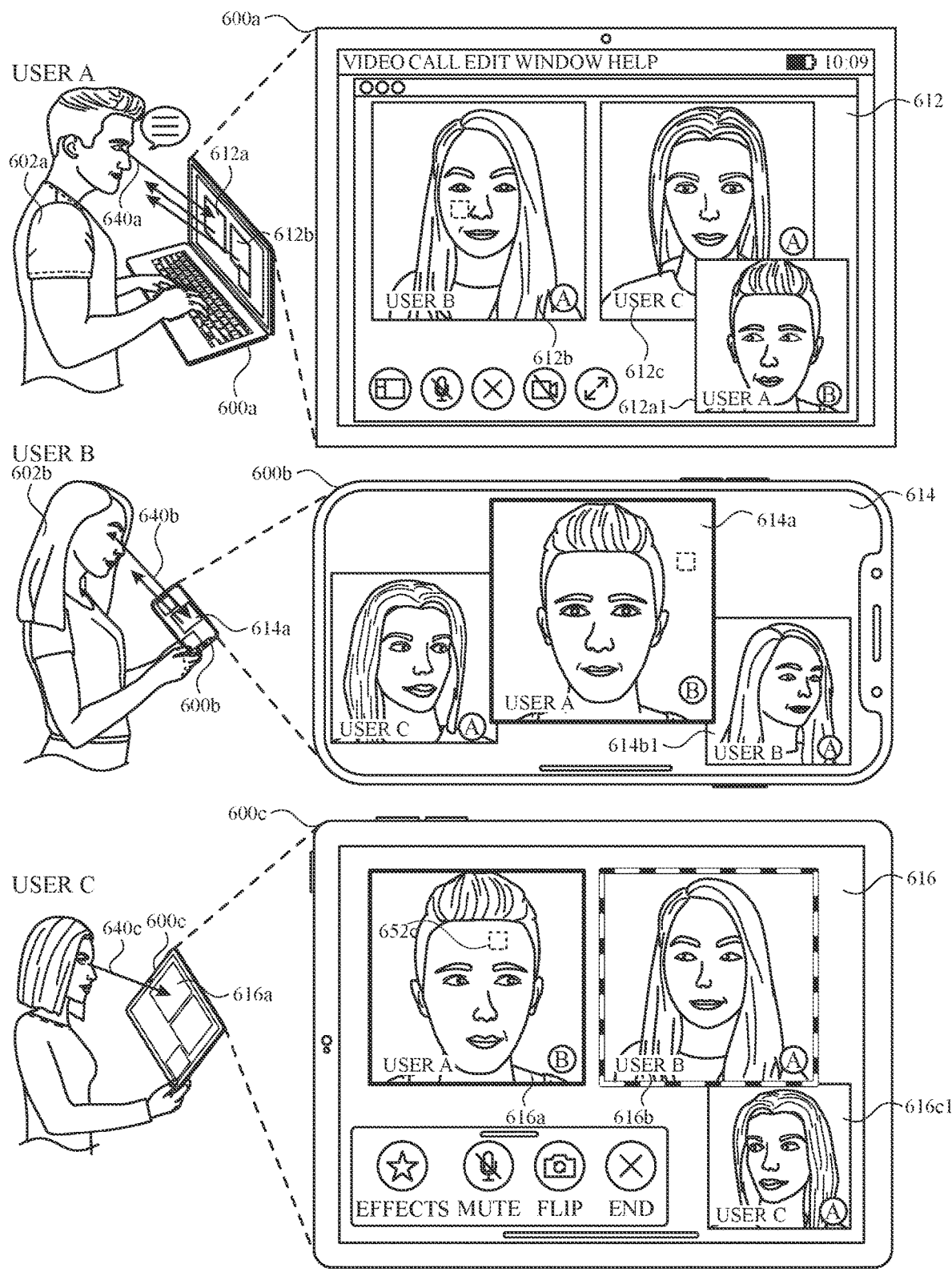

FIG. 6K illustrates an alternate embodiment to FIG. 6H, where participant indications (e.g., 692a-692c) are displayed on participant representations to indicate the participant at whom the participant represented by the participant representation is looking. At FIG. 6K, computer system 600a captures gaze 640a (e.g., same as gaze 634a of FIG. 6H) of participant 602a directed to participant representation 612b, computer system 600b captures gaze 640b (e.g., same as gaze 634b of FIG. 6H) of participant 602b directed to participant representation 614a, and computer system captures gaze 640c (e.g., same as gaze 634c of FIG. 6H) directed to participant representation 616a. As illustrated in FIG. 6K, the participant representations (612b, 612c, 614a, 614c, 616a, 616b) are displayed using similar techniques as described above in relation to FIG. 6H. However, in FIG. 6K, each of the participant representations include one of participant indication 692a-692c (as opposed to the participant representations of FIG. 6H). Here, each of the participant representations include a participant indication of the participant at whom the participant represented by the participant representation is looking. For example, participant representations 612b and 616b of FIG. 6K include participant indication 692a because gaze 636b is directed to participant representation 614a of FIG. 6K (or participant 602a that is represented in participant representation 614a), participant representations 612c and 614c include participant indication 692a because gaze 636c is directed to directed to participant representation 616a (or participant 602a that is represented in participant representation 616a), and participant representations 614a and 616a include participant indication 692b because gaze 636a is directed to participant representation 612b (or participant 602b that is represented in participant representation 612b). In some embodiments, each of the participant representations can include a participant indication to indicate the participant that is looking at the participant represented by the participant representation (e.g., using similar techniques as those described above in relation to FIG. 6I).

Figure 7:
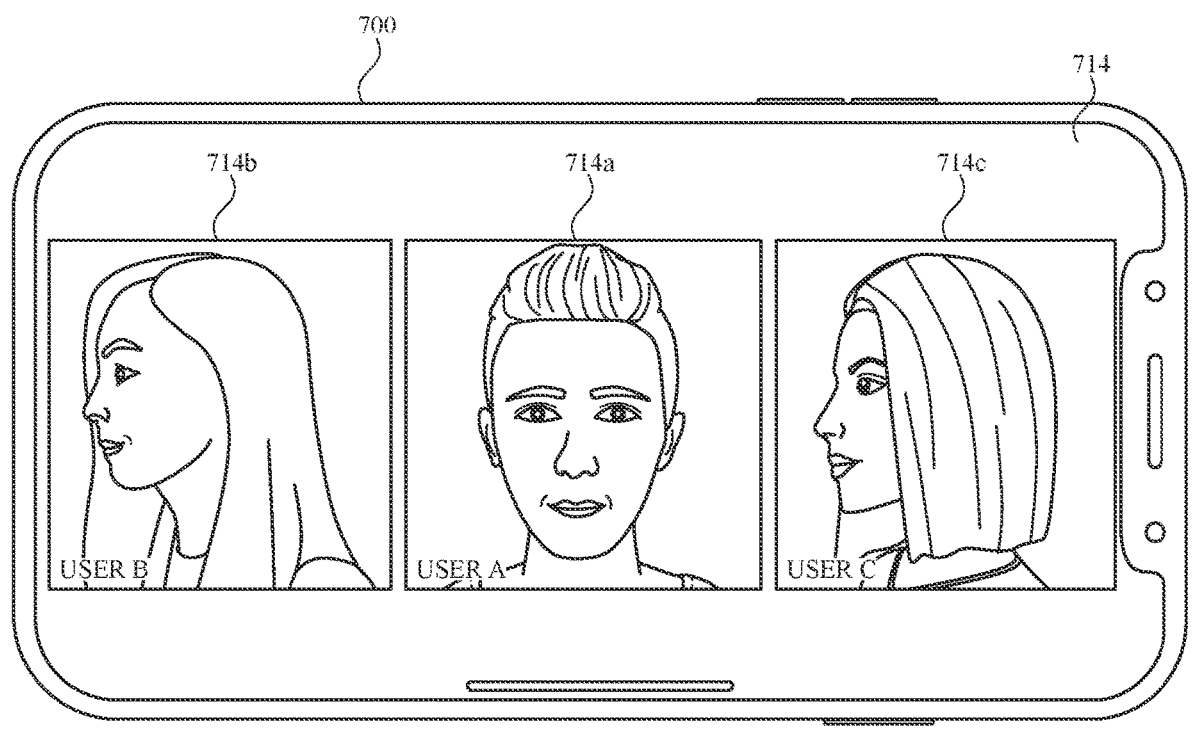
FIG. 7 illustrates an exemplary user interface for managing live communication between multiple participants using a computer system in accordance with some embodiments.

FIG. 7 illustrates exemplary techniques and user interfaces for managing live communication between multiple participants using a computer system in accordance with some embodiments. The user interfaces in this figure are used to illustrate the processes described below, including the processes in FIG. 12.

FIG. 7 illustrates computer system 700. In FIG. 7, computer system 700 is a phone. In some embodiments, computer system 700 is computer system 600b, as described above in relation to FIGS. 6A-6K. In some embodiments, computer system 700 is a laptop, phone, tablet, smartwatch, head-mounted display unit, etc. In some embodiments, computer system 700 includes one or more features of devices 100, 300, and 500.

At FIG. 7, the respective gazes of participant 602a (e.g., represented in participant representation 714a), participant 602b (e.g., represented in participant representation 714b), and participant 602c (e.g., represented in participant representation 714c) are the same as the respective gazes of the respective participants in FIG. 6G (as described above). At FIG. 7, participants 602a-602c are participating in a live video conference with each other (e.g., like in FIG. 6G). Thus, at FIG. 7, participant 602a is looking at a representation of participant 602b, participant 602b is looking at a representation of participant 602c, and participant 602c is looking at a representation of participant 602a. In addition, participant 602b is using computer system 700 (or computer system 700 is the same as computer system 600b in FIG. 6G). Thus, at FIG. 7, computer system 700 displays video conference user interface 714 that includes participant representation 714a, participant representation 714b, and participant representation 714c. Participant representation 714a, participant representation 714b, and participant representation 714c include modified representations of the view that is currently being captured by each of the cameras of the respective computer system (e.g., computer system 600a, 600b (and/or 700), and 600c). Each of the participant representations are modified. The representation for the presenter (e.g., participant representation 714a) is in the center and looking straight to indicate that the presenter is looking at the user of computer system 700 (e.g., participant 602b). The representation(s) for anyone looking at the presenter are displayed to the left of the center representation (e.g., participant representation 714c, because participant 602c is looking at a representation of participant 602a in FIG. 6G) and the representation of the gaze is modified to show the participant looking to the left towards the presenter. The representation(s) are displayed to the right of the center representation (e.g., participant representation 714b, because participant 602c is not looking at a representation of participant 602a in FIG. 6G) and the representation of the gaze is modified to show the participant looking to the left away from the presenter. Thus, FIG. 7 illustrates an alternative video conference user interface where the locations of participant representations can be adjusted and the representation of gaze included in the respective representation can be modified in a way that groups the participants who are presenters (or the person looking at the participant representation for the participant using the computer system that is displaying the video conference user interface), participants looking at the presenters, and the participants looking away from the presenters and gives an indication about the respective gazes for the participants.

Figure 8A:
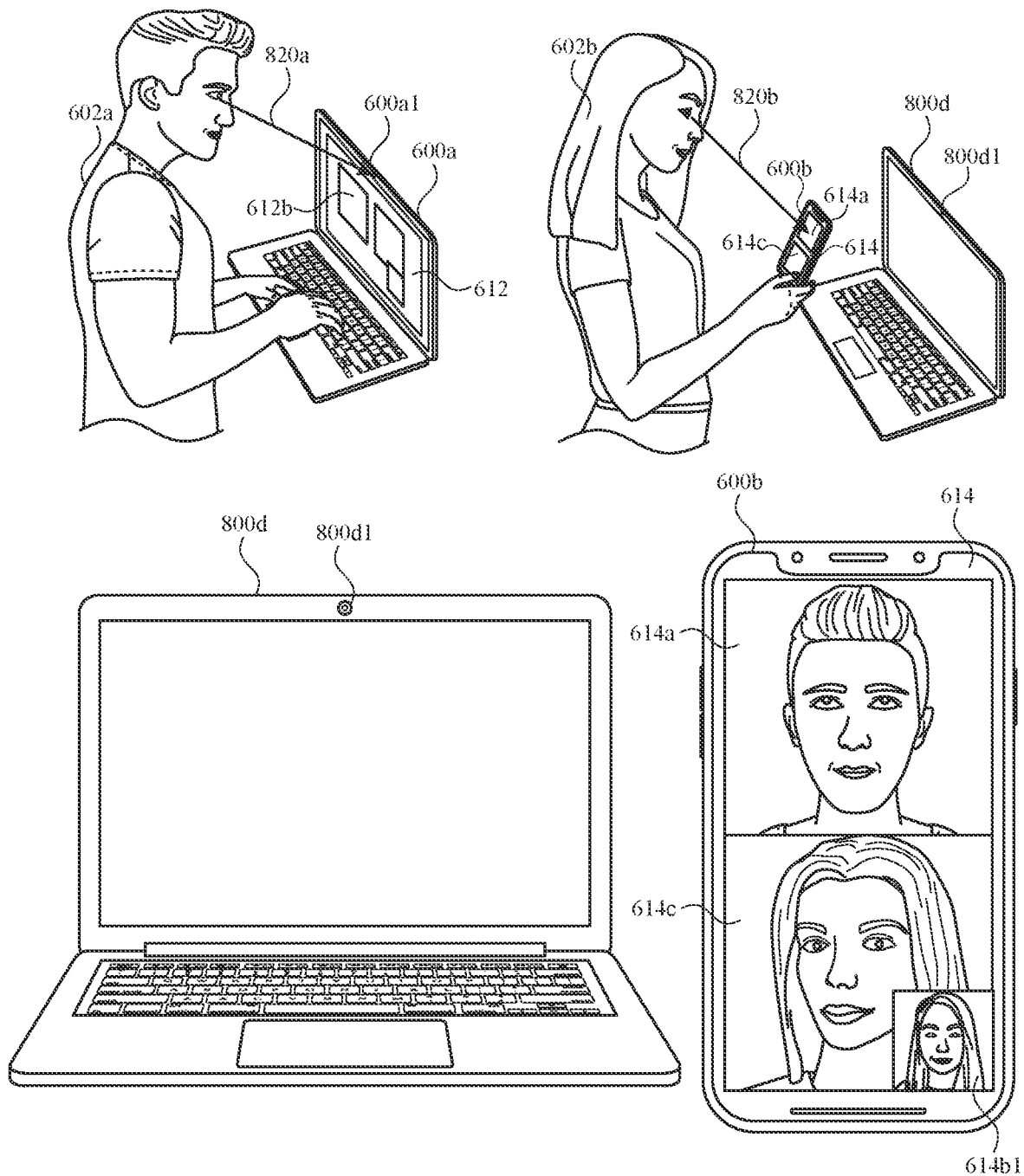
FIGS. 8A-8B illustrate exemplary user interfaces for managing live communication between multiple participants using a computer system in accordance with some embodiments.
Figure 8B:
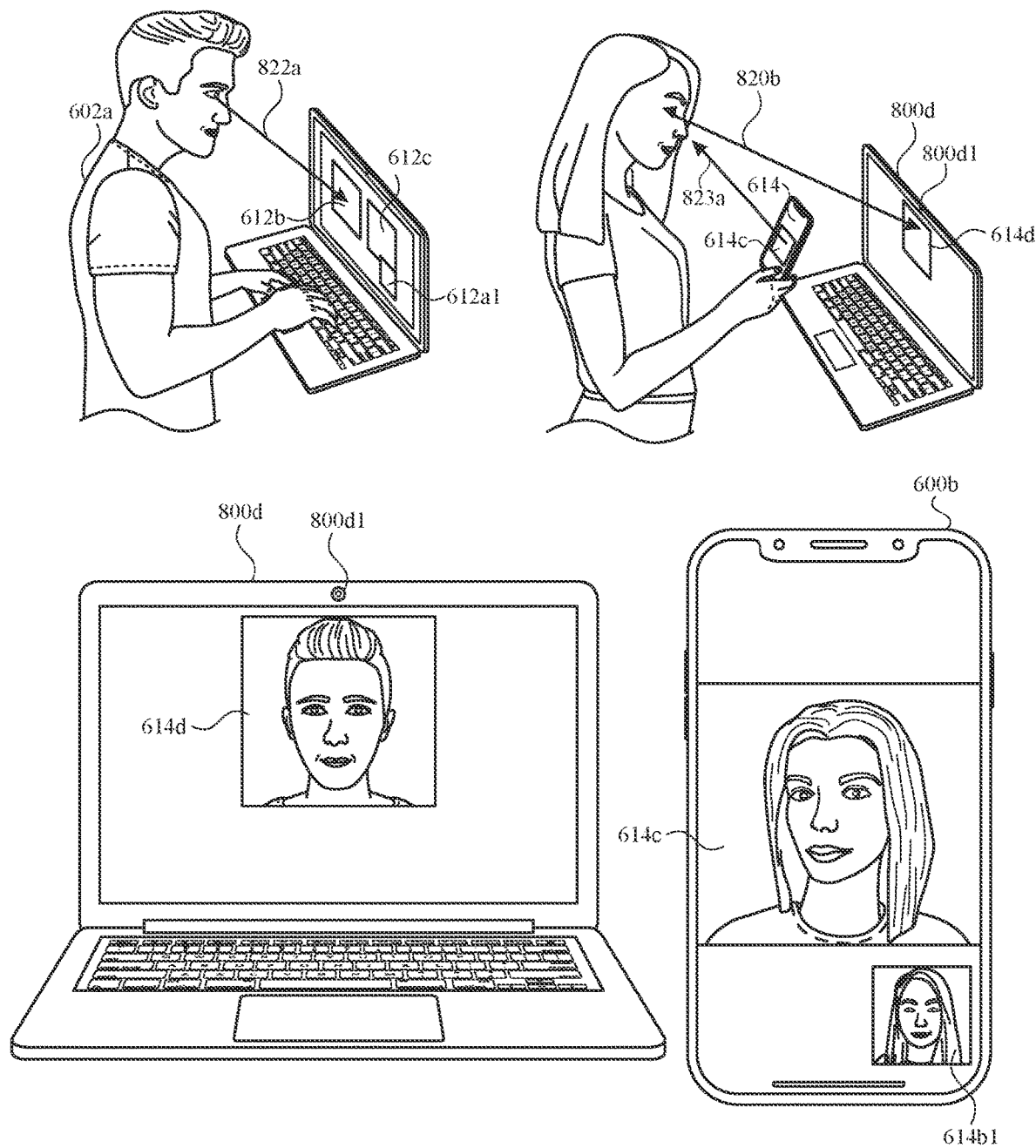

FIGS. 8A-8B illustrate exemplary techniques and user interfaces for managing live communication between multiple participants using a computer system in accordance with some embodiments. Among other things, FIGS. 8A-8B illustrate an embodiment where a respective participant representation is moved from one device to another device when a determination is made that the participant represented by the respective participant representation is looking at a participant that is associated (e.g., using) the other device. The user interfaces in these figures are used to illustrate the processes described below, including the processes in FIG. 12.

FIG. 8A illustrates computer system 600a, computer system 600b, and computer system 800d. Computer system 600a is a laptop that is associated with (e.g., belongs or being used by) participant 602a. Computer system 600b is a phone, and computer system 800d is a laptop. In addition, both computer system 600b and computer system 800d are associated with participant 602b. In some embodiments, any one of the computer systems illustrated in FIG. 8A is a laptop, phone, tablet, smartwatch, head-mounted display unit, etc. In some embodiments, any one of the computer systems illustrated in FIG. 8A include one or more features of devices 100, 300, and 500.

At FIG. 8A, participant 602a, participant 602b, and participant 602c (shown in FIG. 6A) are participating in a live video conference with each other. Participant 602 is using computer system 600a that is displaying a video conference user interface 612 that includes selfie-view representation 612a1, participant representation 612b, and participant representation 612c (e.g., using similar techniques as described above in relation to FIGS. 6A-6K). Moreover, participant 602b is using computer system 600b that is displaying a video conference user interface 614 that includes selfie-view representation 614b1, participant representation 614a, and participant representation 614c (e.g., using similar techniques as described above in relation to FIGS. 6A-6K). At FIG. 8A, computer system 800d is not displaying any participant representations. However, in some embodiments, computer system 800d displays one or more participant representations.

With respect to participant representation 614a, a determination is made that gaze 820a of participant 602a is directed to camera 600a1 of computer system 600a. As illustrated in FIG. 8A, because the determination is made that gaze 820a is directed to camera 600a1, participant representation 614a includes a modified representation of the gaze that is currently being captured by camera 600a1, where the eyes of participant 602a have been shifted up to show that participant 602a is not looking at participant 602b (e.g., using one or more techniques as described above in relation to FIG. 6D).

At FIG. 8B, computer system 600a captures gaze 822a of participant 602a directed to participant representation 612b instead of camera 600a1. As illustrated in FIG. 8B, because a determination is made that gaze 822a of participant 602a is directed to participant 612b, the representation of participant 602a is moved from being displayed on computer system 600b to being displayed on computer system 800d. Thus, in FIG. 8B, participant representation 614a ceases to be displayed on computer system 600b, and participant representation 614d is displayed on computer system 800d, where it was not previously displayed. In FIG. 8B, participant representation 614d includes a modified representation of the gaze of participant 602a that is being captured by camera 600a (e.g., using similar techniques as those described above in relation to 614a in FIG. 6A). In some embodiments (as shown in FIG. 8B), the gaze of participant 602b changes (e.g., 820a of FIG. 8A to 822a of FIG. 8B) because the representation of participant 602a is displayed next to camera 800d1 of computer system 800d. Thus, in some embodiments, moving a respective participant representation from one device associated with a particular participant to another device associated with the particular participant, when a determination is made that a respective participant represented by the respective participant representation is looking at the particular participant, entices the particular participant to return the gaze (or look at) the respective participant (e.g., a representation of the respective participant) and/or look into a camera.

Figure 9A:
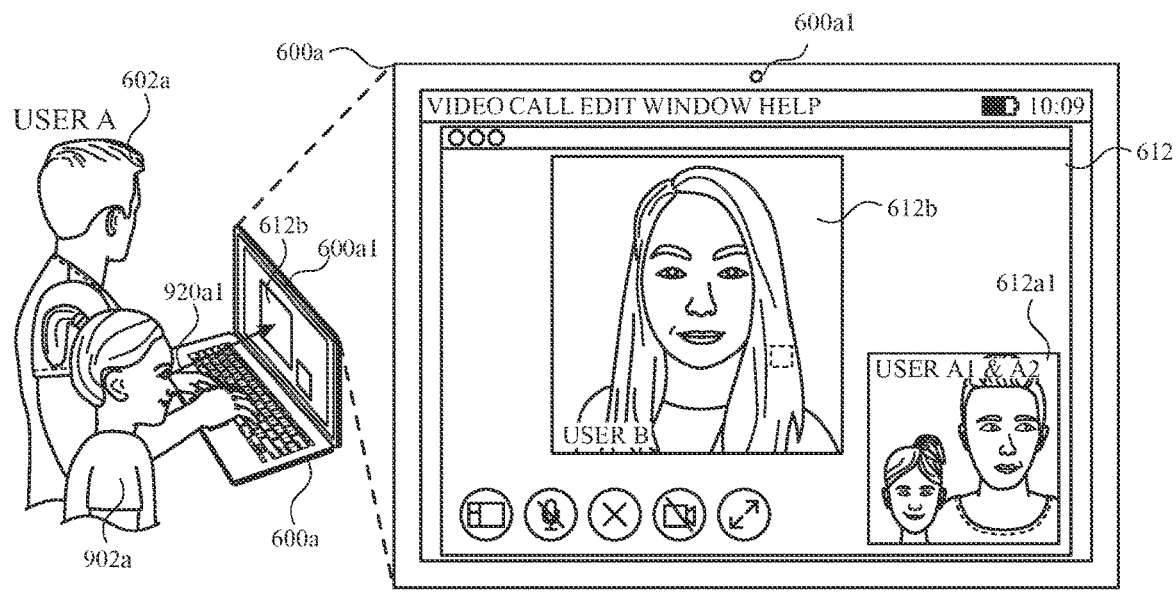
FIGS. 9A-9C illustrate exemplary user interfaces for managing live communication between multiple participants using a computer system in accordance with some embodiments.
Figure 9A:
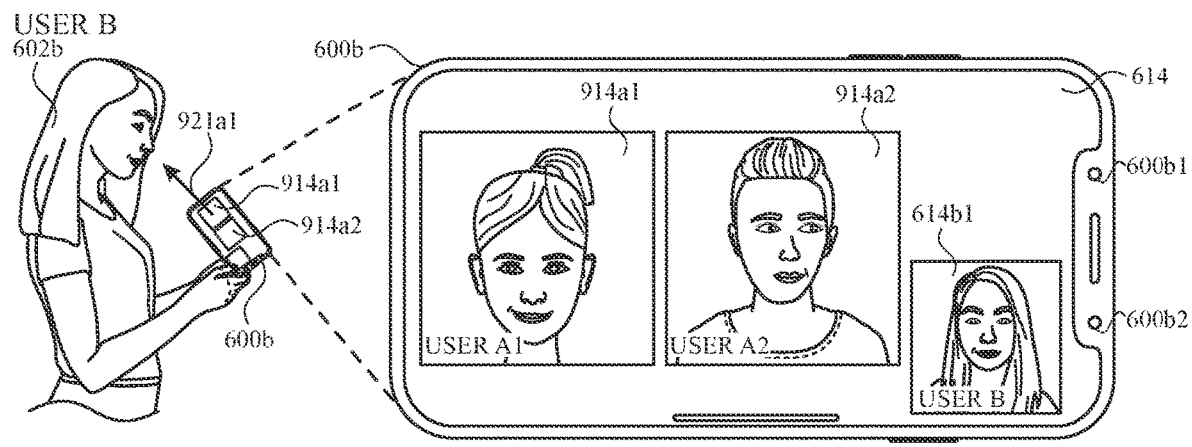
Figure 9B:
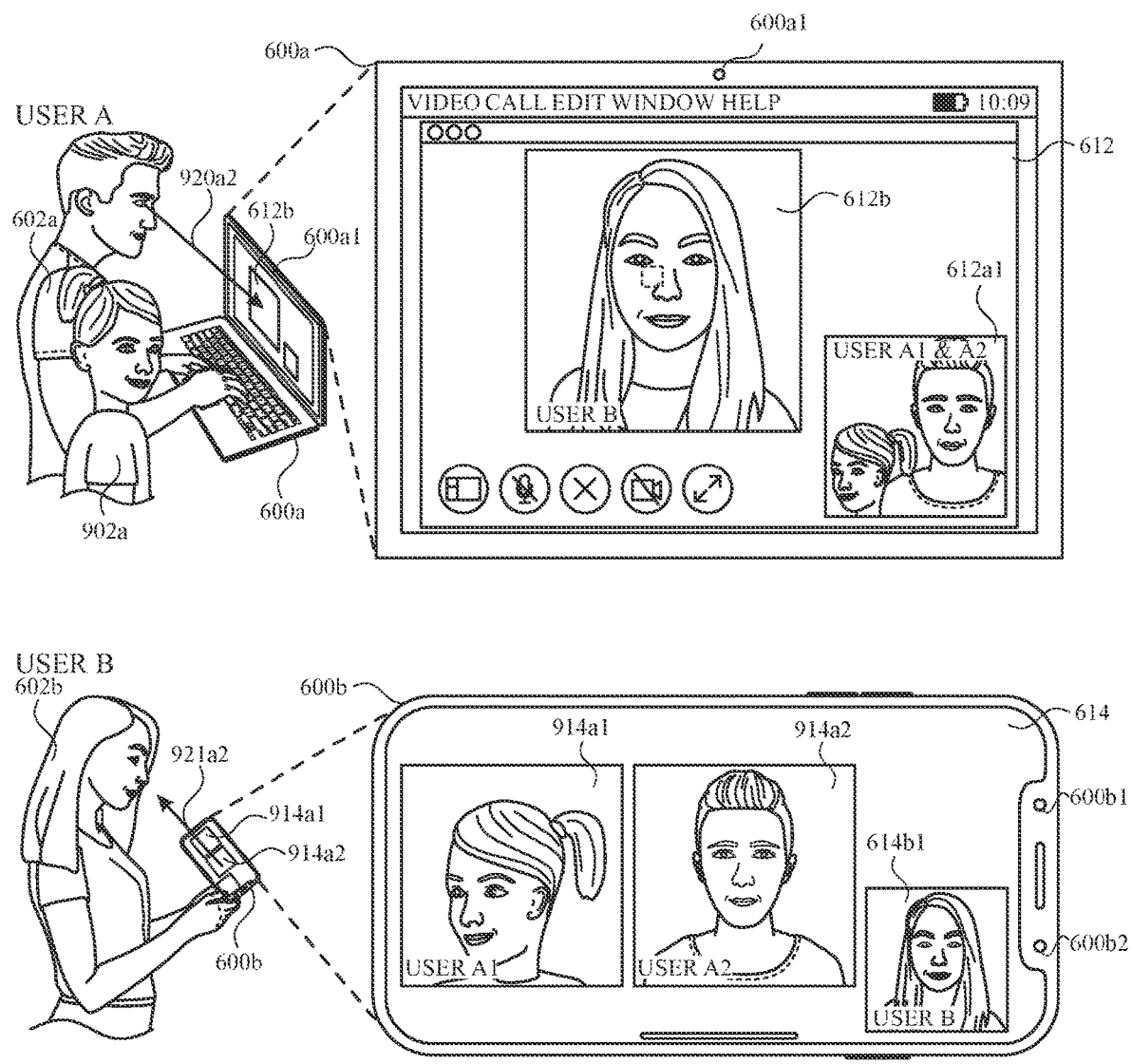
Figure 9C:
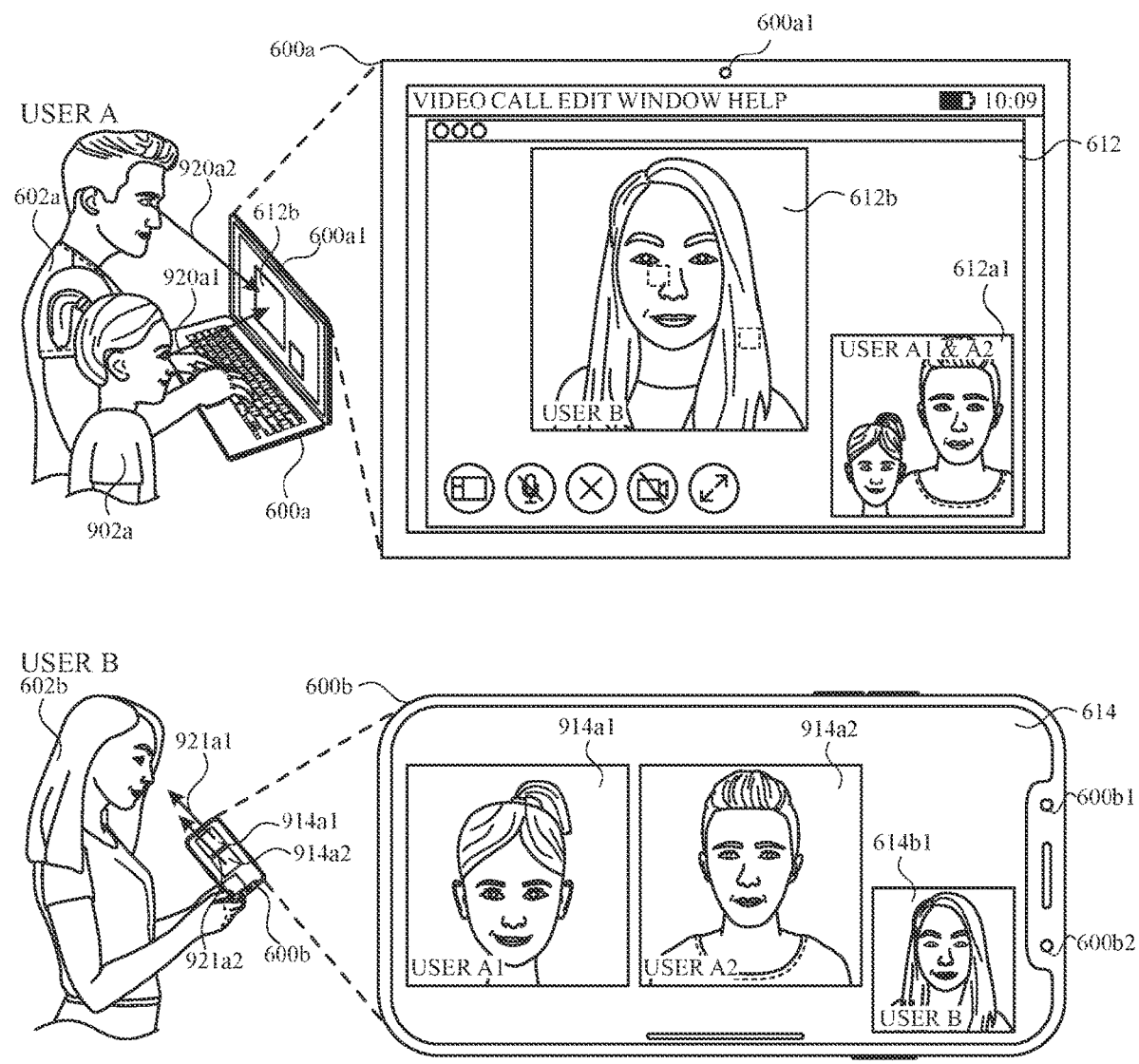

FIGS. 9A-9C illustrates exemplary techniques and user interfaces for managing live communication between multiple participants using a computer system in accordance with some embodiments. Among other things, FIGS. 9A-9C illustrate an embodiment where individual participant representations are displayed when multiple participants are captured by a camera. The user interfaces in these figures are used to illustrate the processes described below, including the processes in FIG. 12.

FIG. 9A illustrates computer system 600a and computer system 600b. At FIG. 9A, participant 602a and participant 902a are using computer system 600a to participant in a live video conference with participant 602b who is using computer system 600b. As illustrated in FIG. 9A, computer system 600a displays live video conference user interface 612, which includes participant representation 612b (e.g., a representation of participant 602b) and selfie-view representation 612a1. Selfie-view representation 612a1 is a representation of a view captured by camera 600a1 (which, in FIG. 9A, includes representations of participants 602a and participant 902a and that are in the field-of-view of and are captured by camera 600a1).

As illustrated in FIG. 9A, computer system 600b displays live video conference user interface 614, which includes selfie-view representation 614b1, participant representation 914a1, and participant representation 941a2. Selfie-view representation 614b1 is a representation of a view of one or more of cameras 600b1-600b2. Notably, participant representation 914a1 is a representation of participant 902a, and participant representation 914a2 is a representation of participant 902b. Thus, computer system 600b displays a separate representation of each participant in the field of view of camera 600a1 instead of displaying, e.g., a single representation that includes both participants (e.g., a participant representation like selfie-view 612a1). In some embodiments, computer 600b displays a representation of each participant in the field-of-view of camera 600a1 to allow participant 602b to identify which participant in the field-of-view of camera 600a1 is looking at participant 602b.

At FIG. 9A, computer system 600b captures gaze 920a1 of participant 902a and a determination is made that gaze 920a1 is directed to participant representation 612b and is the gaze of participant 902a. As illustrated in FIG. 9A, computer system 600b displays participant representation 914a1 that includes a modified representation of the gaze of participant 902a that is captured by camera 600a1 because of this determination. As illustrated in FIG. 9A, because a determination is not made that gaze 920a1 is the gaze of participant 602a, computer system 600b displays participant representation 914a2 with a representation of the gaze of participant 602a that is captured by camera 600a1 (e.g., unmodified representation of gaze).

At FIG. 9B, computer system 600b captures gaze 920a2 of participant 602a and a determination is made that gaze 920a2 is directed to participant representation 612b and is the gaze of participant 602a. As illustrated in FIG. 9B, computer system 600b displays participant representation 914a2 that includes a modified representation of the gaze of participant 602a that is captured by camera 600a1 because of this determination. As illustrated in FIG. 9B, because a determination is not made that gaze 920a2 is the gaze of participant 902a, computer system 600b displays participant representation 914a1 with the representation of the gaze of participant 902a that is captured by camera 600a1 (e.g., unmodified representation of gaze).

At FIG. 9C, computer system 600b captures gaze 902a1 of participant 902a and gaze 920a2 of participant 602a and a determination is made that gaze 902a1 and gaze 920a2 are directed to participant representation 612b. As illustrated in FIG. 9C, computer system 600b displays participant representation 914a1 and participant representation 914a2 with a modified representation of the gaze of participant 902a and a modified representation of the gaze of participant 602a, respectively, because both participants 602a and 902a are determined to be looking at participant representation 612b.

Figure 10A:
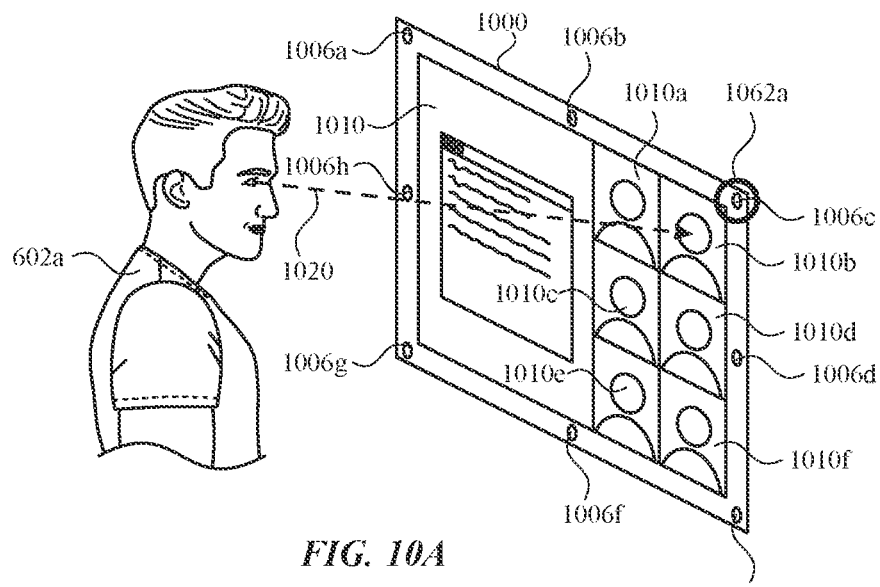
FIGS. 10A-10C illustrate exemplary user interfaces for managing live communication between multiple participants using a computer system in accordance with some embodiments.
Figure 10B:
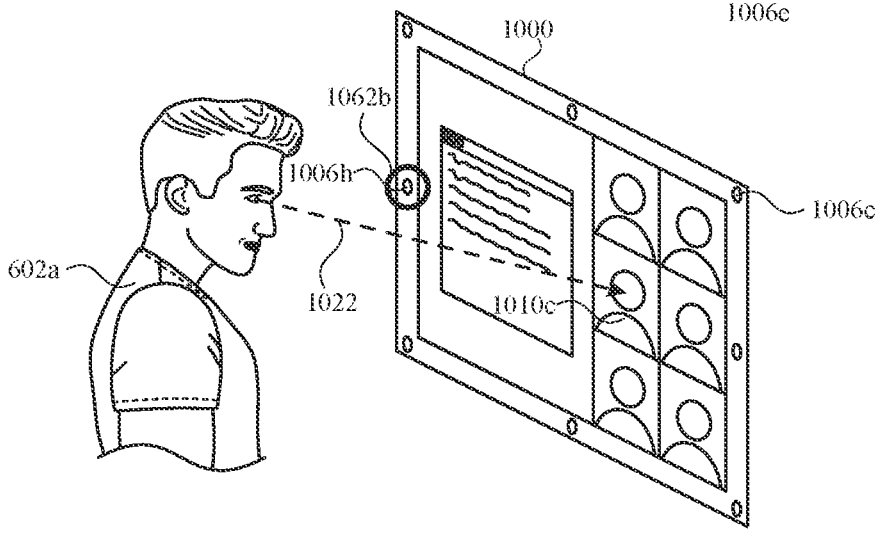
Figure 10C:
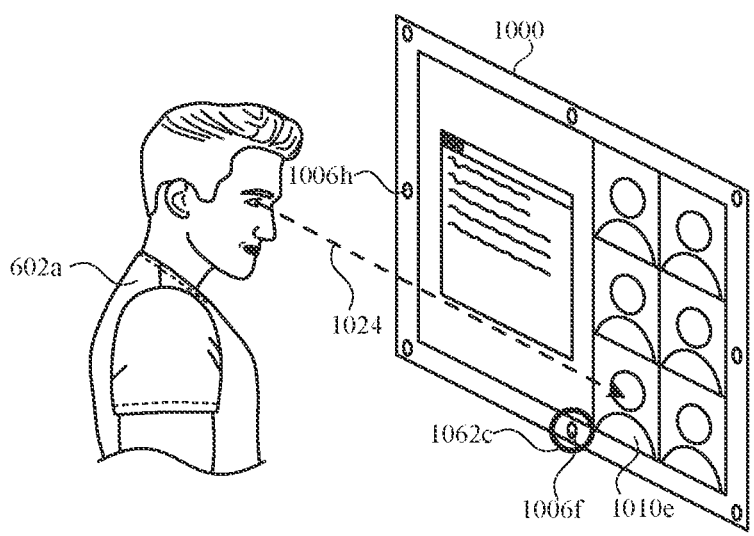
Figure 11:
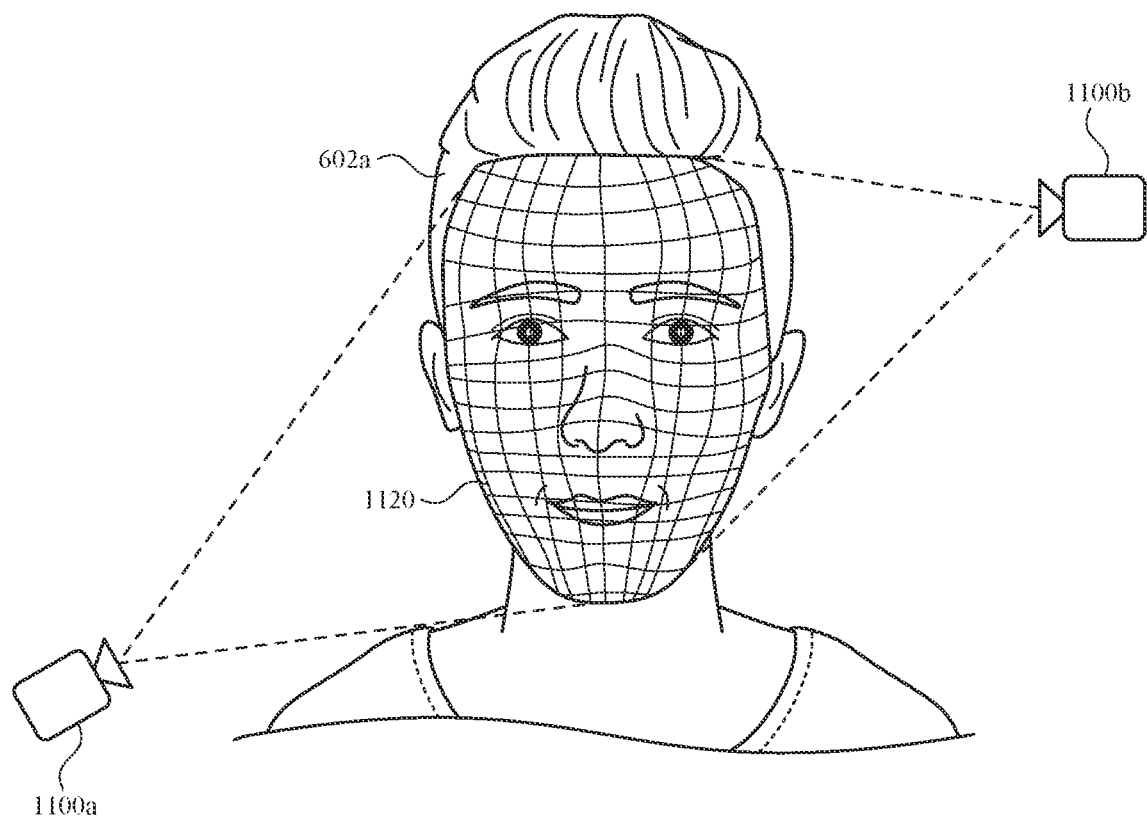
FIG. 11 illustrates an exemplary diagram for managing live communication between multiple participants using a computer system in accordance with some embodiments.

FIGS. 10A-10C illustrate exemplary techniques and user interfaces for managing live communication between multiple participants using a computer system in accordance with some embodiments. The user interfaces in these figures are used to illustrate the processes described below, including the processes in FIG. 12.

FIG. 10A illustrates computer system 1000 that includes a plurality of cameras 1006a-1006h. In some embodiments, computer system 1000 is and/or includes one or more features of devices 100, 300, and 500. At FIG. 10A, participant 602*a* is a communicating in a live video conference with the participants represented by participant representations 1010*a*-1010*f* that are displayed on video conference user interface 1010. At FIG. 10A, computer system 1000 captures gaze 1020 and a determination is made that gaze 1020 is directed to participant representation 1010*b*, which is the closest participant representation to camera 1006*c* (e.g., as indicated by camera indication 1062*a*). At FIG. 10A, because of this determination, computer system 1000 transmits (e.g., via direct or indirect (e.g., via one or more servers) transmission) information that includes data captured by camera 1006*c* to other computer systems for the participants in the live video conference. At FIG. 10B, computer system 1000 captures gaze 1022 and a determination is made that gaze 1022 is directed to participant representation 1010*c*, which is the closest participant representation to camera 1006*h* (e.g., as indicated by camera indication 1062*b*). At FIG. 10B, because of this determination, computer system 1000 transmits information that includes data captured by camera 1006*c* to other computer systems for the participants in the live video conference. At FIG. 10C, computer system 1000 captures gaze 1024 and a determination is made that gaze 1024 is directed to participant representation 1010, which is the closest participant representation to camera 1006*e* (e.g., as indicated by camera indication 1062*c*). At FIG. 10C, because of this determination, computer system 1000 transmits information that includes data captured by camera 1006*e* to other computer systems for the participants in the live video conference. In some embodiments, computer system 1000 transmits information described in reference to FIGS. 10A-10C to the computer system that is associated with participant representation at which participant 602*a* is looking. In some embodiments, transmitting information described in reference to FIGS. 10A-10C to the computer system that is associated with the participant representation at which participant 602*a* is looking allows one or more computer systems to modify the transmitted information in order to display a modified representation of the gaze of user 602*a* (e.g., in order to show participant 602*a* looking forward on the computer system of the participant represented by the participant representation at which participant 602*a* is looking). In some embodiments, participants represented by respective participant representations other than the participant representation that participant 602*a* is not looking at receive and display a representation of participant 602*a* using information captured by the camera of computer system 1000 that is closest to the respective participant representation.

FIG. 11 illustrates exemplary techniques and a diagram for managing live communication between multiple participants using a computer system in accordance with some embodiments. The diagram in this figure is used to illustrate the processes described below, including the processes in FIG. 12.

At FIG. 11, participant 602*a* is positioned between camera 1100*a* and camera 1100*b*, which are capturing portions of the face of participant 602*a*. At FIG. 11, the portions captured by camera 1100*a* and camera 1100*b* do not include the entirety of the face of participant 602*a*. However, various techniques can be used to create a three-dimensional representation of the face of participant 602*a* from the portions captured by camera 1100*a* and camera 1100*b*. In some embodiments, the three-dimensional representation of the face of participant 602*a* can be modified, such that a participant representation that includes a modified representation of the gaze of participant 602*a* can be shown via a computer system. In some embodiments, the technique described in relation to FIG. 11 can be applied to displaying modified representations of the participant's gaze as described above in relation to FIGS. 6A-6K, 7, 8A-8B, 9A-9C, 10A-10C, and 11. In some embodiments, FIGS. 6A-6K, 7, 8A-8B, 9A-9C, 10A-10C, and 11 can be combined to display video conference user interfaces in multiple ways and is not limited to the particular way that the techniques are described herein.

FIG. 12 is a flow diagram illustrating a method for managing live communication between multiple participants using a computer system in accordance with some embodiments. Method 1200 is performed at a computer system (e.g., 100, 300, 500, 600*a*, 600*b*, 600*c*)) (e.g., a smartphone, a smartwatch, a tablet, a computer) (e.g., a remote computer system (e.g., a server) (e.g., a local computer system) (e.g., a computer system having one or more cameras (e.g., one or more cameras (e.g., dual cameras, triple camera, quad cameras, etc.) on the same side or different sides (e.g., a front camera, a back camera) of the computer system)). Some operations in method 1200 are, optionally, combined, the orders of some operations are, optionally, changed, and some operations are, optionally, omitted.

As described below, method 1200 provides an intuitive way for managing live communication between multiple participants. The method reduces the cognitive burden on a user for managing live communication between multiple participants, thereby creating a more efficient human-machine interface. For battery-operated computing devices, enabling a user to manage live communication between multiple participants faster and more efficiently conserves power and increases the time between battery charges.

In some embodiments, the computer system is in communication with a display generation component (e.g., a display controller, a touch-sensitive display system). In some embodiments, the computer system is in communication with one or more input devices (e.g., a touch-sensitive surface).

The computer system obtains (1200) (e.g., detects, obtains from memory, receives from a server, receives from a remote computer system, receives (e.g., capturing) data from one or more cameras or camera sensors of the computer system used by the first participant) (e.g., obtains at the computer system) information about gaze (e.g., 620*a*, 622*a*, 624*a*, 626*a*, 628*a*, 632*a*, 634*a*, 636*a*, 640*a*) of a first participant (e.g., 602*a*) in a video conference while the first participant, a second participant (e.g., 602*b*), and a third participant (e.g., 602*c*) are participating in the video conference. In a first video conference user interface (e.g., 612) for the first participant (1204), a characteristic location (e.g., 612*b*) of (e.g., a viewpoint of or a graphical representation of) the second participant in the first video conference user interface for the first participant is located in a first direction (e.g., a line-of sight, a path) from a characteristic location (e.g., location of 602*a*) of (e.g., a viewpoint of or a graphical representation of) the first participant. In a second video conference user interface (e.g., 614) for the second participant (1206), a characteristic location (e.g., location of 602*b*) of (e.g., a viewpoint of or a graphical representation of) the second participant is located in a second direction (e.g., a line-of sight, a path) from a characteristic location (e.g., 614*a*) of (e.g., a viewpoint of or a graphical representation of) the first participant in the second video conference user interface for the second participant, where the second direction is different from the first direction. In a third video conference user interface (e.g., 616) for the third participant (1208), a characteristic location (e.g., 616*b*) of (e.g., a viewpoint of or a graphical representation of) the second participant in the third video conference user interface for the third participant is located in a third direction (e.g., a line-of sight, a path) from a characteristic location (e.g., 616*a*) of (e.g., a viewpoint of or a graphical representation of) the first participant in the third video conference user interface for the third participant, where the third direction is different from the first direction (and is also different from the second direction). In some embodiments, information about a gaze of a respective participant in the video conference is obtained when a determination is made that the respective participant is a speaking, is/has a higher activity level than at least one of the other participants (or highest activity level) in the live video conference, is determined to be a presenter, etc.

The computer system, in response to obtaining the information about the gaze of the first participant (e.g., 602*a*), (e.g., toward the representation of the first participant in the video conference user interface for the first participant) provides (1210) information that indicates which characteristic location of (e.g., a viewpoint of or a graphical representation of) another participant the first participant is looking at to one or more devices (e.g., 600*a*, 600*b*, 600*c*) (e.g., computer systems) displaying representations (e.g., participant representations, representations of live video (e.g., that is being captured by the one or more devices), graphical representations) of the video conference to enable video conference user interfaces at the one or more devices to indicate at which characteristic location of (e.g., a viewpoint of or a graphical representation of) another participant the first participant is looking, including (e.g., where indicating which characteristic location of (e.g., a viewpoint of or a graphical representation of) another participant the first participant is looking at includes) in accordance with a determination that a first set of criteria is satisfied, where the first set of criteria includes a criterion that is satisfied when the first participant is looking in the first direction in the video conference, modifying (1212) (e.g., changing, providing an instruction that causes a computer system/device to modify) a representation (e.g., 614*a*) of a gaze direction (e.g., representation of the eyes of a participant, the head of a participant, a visual indication and/or emphasis (e.g., highlighting, enlarging, positioning (e.g., relative to another participant)) of a participant) of the first participant (e.g., 602*a*) in the second video conference user interface (e.g., 614) to indicate, in the second video conference user interface for the second participant (e.g., 602*b*), that the first participant (e.g., 602*a*) is looking in the second direction at the characteristic location (e.g., location of 602*b*) of the second participant without modifying a representation (e.g., 616*a*) of a gaze direction of the first participant (e.g., 602*a*) in the third video conference user interface (e.g., 616) to indicate, in the third video conference user interface for the third participant, that the first participant (e.g., 602*a*) is looking at the third participant (e.g., 602*c*) (e.g., in a direction of or at a characteristic location of the third participant, in a direction of or at a characteristic location of the third participant that is displayed in the third user interface). In some embodiments, providing information that indicates which characteristic location of another participant that the first participant is looking at to the one or more devices includes modifying a representation of a gaze direction of the first participant in the second video conference user interface to indicate, in the second video conference user interface for the second participant, that the first participant is looking in the second direction at the characteristic location of the second participant in the second video conference user interface without modifying the representation of the gaze direction of the first participant to indicate that the first participant is looking in the third direction at the characteristic location of the second participant in the third video conference user interface. In some embodiments, modifying a representation of a gaze direction of the first participant in the second video conference user interface to indicate, in the second video conference user interface for the second participant, that the first participant is looking in the second direction at the characteristic location of the second participant in the second video conference user interface makes the gaze of the participant appear to be looking forward (e.g., head looking forward, eyes looking forward (e.g., head looking forward, eyes looking forward (e.g., eyes of the representation in a position that represents a forward gaze), eyes looking straight ahead (e.g., a straight ahead gaze with normal eye alignment), eyes looking forward with respect to a display of the another computer system in the second user interface). Providing information that includes modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant when the first set of criteria is satisfied provides a participant (e.g., second participant/third participant) with enhanced visual feedback about of the gaze of the first participant and allows the second participant (and/or the third participant) to quickly recognize whether or not the first participant is looking at the second participant (or the third participant). Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to (1210) obtaining the information about the gaze of the first participant (e.g., 620*a*, 622*a*, 624*a*, 626*a*, 628*a*, 632*a*, 634*a*, 636*a*, 640*a*), (e.g., toward the representation of the first participant in the video conference user interface for the first participant), the computer system provides information that indicates which characteristic location of (e.g., a viewpoint of or a graphical representation of) another participant the first participant (e.g., 602*a*) is looking at to the one or more devices (e.g., 600*a*, 600*b*, 600*c*) displaying representations of the video conference to enable video conference user interfaces at the one or more devices to indicate at which characteristic location of (e.g., a viewpoint of or a graphical representation of) another participant the first participant (e.g., 602*a*) is looking. In some embodiments, indicating which characteristic location of (e.g., a viewpoint of or a graphical representation of) another participant the first participant is looking at includes: in accordance with the determination that the first set of criteria is satisfied, modifying (1214) the representation (e.g., 616*a*) of the gaze direction of the first participant (e.g., 602*a*) in the third video conference user interface (e.g., 616) to indicate, in the third video conference user interface for the third participant, that the first participant (e.g., 602a) is looking in the third direction at the characteristic location (e.g., 616b) of the second participant (e.g., 602b) in the third video conference user interface (e.g., 616). Providing information that includes modifying the representation of the gaze direction of the first participant in the third video conference user interface to indicate, in the third video conference user interface for the third participant, that the first participant is looking in the third direction at the characteristic location of the second participant in the third video conference user interface when the first set of criteria is satisfied provides a user (e.g., third participant) with enhanced visual feedback about of the gaze of the first participant and allows the third participant to quickly recognize that the first participant is looking at the second participant. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in the first video conference user interface (e.g., 612) for the first participant (e.g., 602a), a characteristic location (e.g., 612c) of (e.g., a viewpoint of or a graphical representation of) the third participant (e.g., 602c) in the first video conference user interface (e.g., 612) for the first participant is located in a fourth direction (e.g., a line-of sight, a path) from the characteristic location of (e.g., a viewpoint of or a graphical representation of) the first participant. In some embodiments, in the second video conference user interface (e.g., 614) for the second participant (e.g., 602b), a characteristic location (e.g., 614c) of (e.g., a viewpoint of or a graphical representation of) the third participant in the second video conference user interface for the second participant is located in a fifth direction (e.g., a line-of sight, a path, defined by a degree of direction) from the characteristic location (e.g., 614a) of (e.g., a viewpoint of or a graphical representation of) the first participant in the second video conference user interface for the second participant, where the fifth direction is different from the fourth direction. In some embodiments, in the third video conference user interface (e.g., 616) for the third participant, a characteristic location (e.g., location of 602c) of (e.g., a viewpoint of or a graphical representation of) the third participant is located in a sixth direction from the characteristic location (e.g., 616a) of (e.g., a viewpoint of or a graphical representation of) the first participant in the third video conference user interface for the third participant, where the sixth direction (e.g., a line-of sight, a path) is different from the fourth direction (and is also different from the fifth direction). In some embodiments, in response to obtaining the information about the gaze (e.g., 620a, 622a, 624a, 626a, 628a, 632a, 634a, 636a, 640a) of the first participant, (e.g., toward the representation of the first participant in the video conference user interface for the first participant), the computer system provides information that indicates which characteristic location of (e.g., a viewpoint of or a graphical representation of) another participant the first participant is looking at to the one or more devices displaying representations of the video conference to enable video conference user interfaces at the one or more devices to indicate at which characteristic location of (e.g., a viewpoint of or a graphical representation of) another participant the first participant is looking. In some embodiments, indicating which characteristic location of (e.g., a viewpoint of or a graphical representation of) another participant the first participant is looking at includes: in accordance with a determination that the first participant (e.g., 602a) is looking in the fourth direction in the video conference (e.g., at a representation of the third participant in the first video conference user interface), modifying the representation (e.g., 616a) of the gaze direction of the first participant in the third video conference user interface (e.g., 616) to indicate, in the third video conference user interface for the third participant, that the first participant (e.g., 602a) is looking in the sixth direction at the characteristic location (e.g., location of 602c) of the third participant without modifying the representation (e.g., 614a) of the gaze direction of the first participant in the second video conference user interface (e.g., 614) to indicate, in the second video conference user interface for the second participant, that the first participant (e.g., 602a) is looking at the second participant (e.g., 602b) (e.g., without modifying the representation of the gaze direction of the first participant in the second video conference user interface to indicate, in the second video conference user interface for the second participant, that the first participant is looking in the second direction at the characteristic location of the second participant in the second video conference user interface). In some embodiments, providing information that indicates which characteristic location of another participant that the first participant is looking at to the one or more devices includes modifying the representation of the gaze direction of the first participant in the third video conference user interface to indicate, in the third video conference user interface for the third participant, that the first participant is looking in the sixth direction at the characteristic location of the third participant without modifying a representation of a gaze direction of the first participant in the second video conference user interface to indicate, in the second video conference user interface for the second participant, that the first participant is looking in the fifth direction at the characteristic location of the third participant in the second video conference user interface. In some embodiments, modifying the representation of the gaze direction of the first participant in the third video conference user interface to indicate, in the third video conference user interface for the third participant, that the first participant is looking in the sixth direction at the characteristic location of the third participant makes the gaze of the participant appear to be looking forward (e.g., head looking forward, eyes looking forward (e.g., eyes of the representation in a position that represents a forward gaze), eyes looking straight ahead (e.g., a straight ahead gaze with normal eye alignment), eyes looking forward with respect to a display of the another computer system in the second user interface). Providing information that includes modifying the representation of the gaze direction of the first participant in the third video conference user interface to indicate, in the third video conference user interface for the third participant, that the first participant is looking in the sixth direction at the characteristic location of the third participant without modifying the representation of the gaze direction of the first participant in the second video conference user interface to indicate, in the second video conference user interface for the second participant, that the first participant is looking at the second participant when the first participant is looking in the fourth direction in the video conference provides a user (e.g., second participant/third participant) with enhanced visual feedback about of the gaze of the first participant and allows the third participant (and/or the second participant) to quickly recognize whether or not the first participant is looking at the third participant (or the second participant). Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to obtaining the information about the gaze (e.g., 620a, 622a, 624a, 626a, 628a, 632a, 634a, 636a, 640a) of the first participant (e.g., 602a), (e.g., toward the representation of the first participant in the video conference user interface for the first participant) the computer system provides information that indicates which characteristic location of (e.g., a viewpoint of or a graphical representation of) another participant the first participant is looking at to the one or more devices displaying representations of the video conference to enable video conference user interfaces at the one or more devices to indicate at which characteristic location of (e.g., a viewpoint of or a graphical representation of) another participant the first participant is looking. In some embodiments, indicating which characteristic location of (e.g., a viewpoint of or a graphical representation of) another participant the first participant is looking at includes: in accordance with a determination that the first participant (e.g., 602a) is looking in the fourth direction in the video conference (e.g., at a representation of the third participant in the first video conference user interface), modifying a representation (e.g., 614a) of a gaze direction of the first participant (e.g., 602a) in the second video conference user interface to indicate (e.g., 615), in the second video conference user interface for the second participant, that the first participant is looking in the fifth direction at the characteristic location (e.g., 614c) of the third participant (e.g., 602c) in the second video conference user interface (e.g., 614). In some embodiments, the representation of the gaze direction for a participant who is looking at a respective participant is modified on a video conference user interface for a different respective participant so that the different respective participant is notified that the participant is looking at the respective participant (and not the different respective participant). Providing information that includes modifying a representation of a gaze direction of the first participant in the second video conference user interface to indicate, in the second video conference user interface for the second participant, that the first participant is looking in the fifth direction at the characteristic location of the third participant in the second video conference user interface when the first participant is looking in the fourth direction in the video conference provides a user (e.g., second participant) with enhanced visual feedback about of the gaze of the first participant and allows the second participant to quickly recognize that the first participant is looking at the third participant. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to obtaining information about gaze (e.g., 628b, 630b, 632b, 634b, 636b, 640b) of the second participant (e.g., 602b) (and while providing information that indicates which characteristic location of (e.g., a viewpoint of or a graphical representation of) another participant the first participant is looking at to the one or more devices displaying representations of the video conference to enable video conference user interfaces at the one or more devices to indicate at which characteristic location of (e.g., a viewpoint of or a graphical representation of) another participant the first participant is looking and in accordance with the determination that the first participant is looking in the first direction in the video conference), the computer system provides information that indicates which characteristic location (e.g., a viewpoint of or a graphical representation of) of another participant the second participant (e.g., 602b) is looking at to the one or more devices (e.g., 600a, 600b, 600c) displaying representations of the video conference to enable video conference user interfaces at the one or more devices to indicate at which characteristic location of (e.g., a viewpoint of or a graphical representation of) another participant the second participant is looking, including in accordance with a determination that the second participant is looking in the second direction: modifying a representation (e.g., 612b) of a gaze direction of the second participant (e.g., 602b) in the first video conference user interface (e.g., 612) to indicate, in the first video conference user interface for the first participant, that the second participant (e.g., 602b) is looking (e.g., in a direction that is opposite of the first direction, a direction that is a reciprocal direction to the first direction) at the characteristic location (e.g., location of 602a) of the first participant (e.g., 602a) without modifying a representation (e.g., 616b) of a gaze direction of the second participant in the third video conference user interface (e.g., 616) to indicate, in the third video conference user interface for the third participant, that the second participant is looking at the third participant. Providing information that includes modifying a representation of a gaze direction of the second participant in the first video conference user interface to indicate, in the first video conference user interface for the first participant, that the second participant is looking at the characteristic location of the first participant without modifying a representation of a gaze direction of the second participant in the third video conference user interface to indicate, in the third video conference user interface for the third participant, that the second participant is looking at the third participant provides a user with enhanced visual feedback about of the gaze of the a participant that is different from the first participant and allows the user to quickly recognize whether or not the participant other than the first participant is looking at the user. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation of a gaze direction of the second participant in the first video conference user interface is modified to indicate, in the first video conference user interface for the first participant, that the second participant is looking (e.g., in a direction that is opposite of the first direction, a direction that is a reciprocal direction to the first direction) at the characteristic location of the first participant without modifying a representation of a gaze direction of the second participant in the third video conference user interface to indicate, in the third video conference user interface for the third participant, that the second participant is looking at the third participant concurrently with modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant. In some embodiments, representation of the gaze of one participant is concurrently modified with the representation of the gaze of another participant. In some embodiments, the representation of the gaze direction of the second participant is modified in the third user interface (and, in some embodiments, concurrently modified with the gaze direction of the first participant in the third user interface). In some embodiments, while providing information that indicates which characteristic location of (e.g., a viewpoint of or a graphical representation of) another participant the first participant is looking at to the one or more devices displaying representations of the video conference to enable video conference user interfaces at the one or more devices to indicate which characteristic location of (e.g., a viewpoint of or a graphical representation of) another participant the first participant is looking in accordance with the determination that the first participant is looking in the first direction in the video conference and in response to obtaining information about the gaze of the second participant: providing information that indicates which characteristic location (e.g., a viewpoint of or a graphical representation of) of another participant the second participant is looking at to the one or more devices displaying representations of the video conference to enable video conference user interfaces at the one or more devices to indicate at which characteristic location of (e.g., a viewpoint of or a graphical representation of) another participant the second participant is looking includes, in accordance with the determination that the second participant is looking in the second direction, modifying the representation of the gaze direction of the second participant in the third video conference user interface to indicate, in the third video conference user interface for the third participant, that the second participant is looking (e.g., in a direction that is opposite of the third direction, a direction that is a reciprocal direction to the third direction) at the characteristic location of the first participant in the third video conference user interface.

In some embodiments, the first set of criteria includes a criterion that is satisfied when the first participant is determined to be a presenter in the live video conference. In some embodiments the first participant is determined to be a presenter when the first participant is determined to be actively communicating or communicating above a threshold amount in the live video conference. In some embodiments, the first set of criterion includes the criterion that is satisfied when the first participant is determined to be a presenter in the live video conference when the live video conference is in a presenter (e.g., screen sharing, teacher, lecturer, etc.) mode. In some embodiments, in response to obtaining the information about the gaze of the first participant, (e.g., toward the representation of the first participant in the video conference user interface for the first participant) providing information that indicates which characteristic location of (e.g., a viewpoint of or a graphical representation of) another participant the first participant is looking at to the one or more devices displaying representations of the video conference to enable video conference user interfaces at the one or more devices to indicate at which characteristic location of (e.g., a viewpoint of or a graphical representation of) another participant the first participant is looking includes, in accordance with a determination that the first set of criteria is not satisfied (e.g., because the first participant is determined to not be presenting in the live communication session), forgoing modifying the representation of the gaze direction (e.g., representation of the eyes of a participant, the head of a participant, a visual indication and/or emphasis (e.g., highlighting, enlarging, positioning (e.g., relative to another participant)) of a participant) of the first participant in the second video conference user interface to indicate, in the second video conference user interface for the second participant, that the first participant is looking in the second direction at the characteristic location of the second participant in the second video conference user interface without modifying the representation of the gaze direction of the first participant in the third video conference user interface to indicate, in the third video conference user interface for the third participant, that the first participant is looking at the third participant. In some embodiments, in response to obtaining the information about the gaze of the first participant, (e.g., toward the representation of the first participant in the video conference user interface for the first participant) providing information that indicates which characteristic location of (e.g., a viewpoint of or a graphical representation of) another participant the first participant is looking at to the one or more devices displaying representations of the video conference to enable video conference user interfaces at the one or more devices to indicate at which characteristic location of (e.g., a viewpoint of or a graphical representation of) another participant the first participant is looking, including in accordance with a determination the set of first criteria is not satisfied (e.g., because the first participant is determined to not be presenting in the live communication session), forgoing modifying the representation of the gaze direction of the first participant in the third video conference user interface to indicate, in the third video conference user interface for the third participant, that the first participant is looking in the third direction at the characteristic location of the second participant in the third video conference user interface.

In some embodiments, the determination that the first participant (e.g., 602a) is looking in the first direction in the video conference is made when the participant is determined to be looking in one or more directions (e.g., indicated by 620a, 622a, 624a, 626a, 628a, 632a, 634a, 636a, 640a) that correspond to (e.g., are within an angular threshold (e.g., 1-20 degrees) of, are associated with) the first direction. In some embodiments, at least one of the one or more directions is different from the first direction. In some embodiments, the gaze direction correction is not symmetrical to the direction in which the first participant is looking (e.g., when the first participant is detected to be looking in a direction that is within one or more degrees (to the right, left, up, down, right, etc.) of the characteristic location of the second participant in the first user interface (e.g., or the second participant), the representation of the gaze of the first participant can be corrected in the second video conference user interface for the second participant such that the first participant is looking at the second participant).

In some embodiments, in response to obtaining the information about the gaze (e.g., 626a, 820a) of the first participant (e.g., 602a), the computer system provides information that indicates which characteristic location of another participant the first participant is looking at to the one or more devices (e.g., 600a, 600b, 600c) displaying representations of the video conference to enable video conference user interfaces at the one or more devices to indicate which characteristic location of another participant the first participant is looking includes, in accordance with a determination that the first participant is looking in a direction of a camera (e.g., 600a1) (e.g., a camera in communication with a device (and/or computer system) of the first participant) (e.g., and not in the first direction in the video conference), modifying a representation (e.g., 614a) of a gaze direction of the first participant in the second video conference user interface (e.g., 614) to indicate, in the second video conference user interface (e.g., 614) for the second participant (e.g., 602b), that the first participant (e.g., 602a) is not looking in the second direction at the characteristic location (e.g., location of 602b) of the second participant (and, in some embodiments, irrespective of whether the representation of the gaze direction of the first participant in the third video conference user interface is or is not modified to indicate, in the third video conference user interface for the third participant, that the first participant is looking at the third participant). Providing information that includes modifying a representation of a gaze direction of the first participant in the second video conference user interface to indicate, in the second video conference user interface for the second participant, that the first participant is not looking in the second direction at the characteristic location of the second participant when the first participant is looking in a direction of a camera provides a user with visual feedback that the first participant is not looking at the second participant in situations where the first participant is looking at a camera and not the second participant. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to obtaining the information (e.g., 622a, 624a) about the gaze of the first participant (e.g., 602a), the computer system provides information that indicates which characteristic location of another participant the first participant is looking at to the one or more devices displaying representations of the video conference to enable video conference user interfaces at the one or more devices to indicate which characteristic location of another participant the first participant is looking includes: in accordance with a determination that the first participant (e.g., 602a) is looking in a direction (e.g., indicated by 622a) that corresponds to a predefined set of locations (e.g., 612) (e.g., locations on a display screen) (e.g., participant is looking within a particular area of the display screen, participant is looking at the display screen), modifying a representation (e.g., 614a, 616a) of a gaze direction of the first participant in the video conference (e.g., as discussed above (e.g., 1212, 1214)) (e.g., modifying (e.g., changing, providing an instruction that causes a computer system/device to modify) a representation of a gaze direction (e.g., representation of the eyes of a participant, the head of a participant, a visual indication and/or emphasis (e.g., highlighting, enlarging, positioning (e.g., relative to another participant)) of a participant) of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant); and in accordance with a determination that the first participant (e.g., 602a) is not looking in a direction (e.g., indicated by gaze 624a of participant 602a) that corresponds to the predefined set of locations (e.g., 608) (e.g., participant is looking outside a particular area of the display screen, participant is not looking at the display screen), forgoing modifying the representation (e.g., 614a, 616a in FIG. 6C) of the gaze direction of the first participant in the video conference (or, in some embodiments, modifying the representation of the gaze direction of the first participant in the video conference, such that the representation of the gaze of the first participant is not directed at any participant in the video conference in the user interface on the device that is associated with the first participant and/or in the user interface on devices that are associated with participants other than the first participant). Choosing whether to modify or not modify a representation of a gaze direction of the first participant based on whether or not the first participant is looking in a direction that corresponds to a predefined set of locations allows the system to provide information to correct the representation of the gaze direction based on whether the first participant is looking within the predefined set of locations. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the device more quickly and efficiently.

In some embodiments, the set of locations includes a plurality of locations (e.g., 612 and 608) on a display screen (e.g., the display screen is a display screen on which the first video conference user interface for the first participant is displayed). In some embodiments, the set of locations does not include a plurality of locations outside (e.g., not on) the display screen on which the first video conference user interface for the first participant is displayed. Choosing whether to modify or not modify a representation of a gaze direction of the first participant based on whether or not the first participant is looking in a direction that corresponds to a predefined set of locations allows the system to provide information to correct the representation of the gaze direction based on whether the first participant is looking at the display screen. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the device more quickly and efficiently.

In some embodiments, the set of locations includes a plurality of locations (e.g., 612) on a display screen at which the first video conference user interface for the first participant is displayed and does not includes a plurality of locations (e.g., 608) on the display screen at which the first video conference user interface for the first participant is not displayed. Choosing whether to modify or not modify a representation of a gaze direction of the first participant based on whether or not the first participant is looking in a direction that corresponds to a predefined set of locations allows the system to provide information to correct the representation of the gaze direction based on whether the first participant is looking at a particular portion of the display screen. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the device more quickly and efficiently.

In some embodiments, modifying the representation (e.g., 614a) of the gaze direction of the first participant in the second video conference user interface (e.g., 614) to indicate, in the second video conference user interface for the second participant (e.g., 602b), that the first participant (e.g., 602a) is looking in the second direction at the characteristic location (e.g., location of 602b) of the second participant includes modifying a representation (e.g., 614a) of a head of the first participant and a representation of eyes of the first participant (e.g., changed) (e.g., shift head, eyes; rotate/tilt head; move head/eyes laterally) in the second video conference user interface for the second participant. Modifying a representation of a head of the first participant and a representation of eyes of the first participant when the representation of the gaze direction of the first participant in the second video conference user interface is modified to indicate, in the second video conference user interface for the second participant, that the first participant is looking in the second direction at the characteristic location of the second participant allows a user (e.g., a second participant) to quickly identify that the heads and eyes of the first participant are facing the second participant while the first participant is participating in the live video conference. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first participant (e.g., 602a) and a fourth participant (e.g., 902a) are both in a field-of-view of a camera (e.g., 600a1) (e.g., a single camera). In some embodiments, in the second video conference user interface (e.g., 614) for the second participant, a representation (e.g., 914a2) of a direction of gaze of the first participant is adjusted separately from adjustment of a representation (e.g., 914a1) of a direction of gaze of the fourth participant. In some embodiments, the first participant and the fourth participant are displayed in separate user interface regions in the second video conference user interface to enabled the representation of gaze of the first participant and the representation of gaze of the fourth participant to be adjusted separately (e.g., while, in the second video user interface for the second participant, the characteristic location of the second participant is located in the second direction from the characteristic location of the first participant in the second video conference user interface for the second participant). In some embodiments, in the first video conference user interface for the first participant, a characteristic location of the second participant in the first video conference user interface for the first participant is located in the first direction from a characteristic location of the fourth participant. In some embodiments, in the third video conference user interface for the third participant, the characteristic location of the second participant in the third video conference user interface for the third participant is located in the third direction from the characteristic location of the first participant in the third video conference user interface for the third participant and the characteristic location of the second participant in the third video conference user interface for the third participant is located in the seventh direction from the characteristic location of the fourth participant in the third video conference user interface for the third participant, where the third direction is different from the seventh direction. Having a second video conference user interface for the second participant where a representation of a direction of gaze of the first participant is adjusted separately from adjustment of a representation of a direction of gaze of the fourth participant while both the first participant and the fourth participant are in the field-of-view of a camera allows the user to quickly distinguish between the different gazes of multiple users that are in the field-of-view of the same camera. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to obtaining information about gaze (e.g., 920a1) of the fourth participant (e.g., 902a) (and while providing information that indicates which characteristic location of (e.g., a viewpoint of or a graphical representation of) another participant the first participant is looking at to the one or more devices displaying representations of the video conference to enable video conference user interfaces at the one or more devices to indicate at which characteristic location of (e.g., a viewpoint of or a graphical representation of) another participant the first participant is looking and in accordance with the determination that the first participant is looking in the first direction in the video conference), the computer system provides information that indicates which characteristic location (e.g., a viewpoint of or a graphical representation of) of another participant the fourth participant is looking at to the one or more devices displaying representations of the video conference to enable video conference user interfaces at the one or more devices to indicate at which characteristic location of (e.g., a viewpoint of or a graphical representation of) another participant the fourth participant is looking, including in accordance with a determination that the fourth participant is looking in the first direction (and, in some embodiments, in accordance with a determination that the first participant is not looking in the first direction): modifying a representation (e.g., 914a1) of a gaze direction of the fourth participant in the second video conference user interface to indicate, in the second video conference user interface (e.g., 614) for the second participant, that the fourth participant (e.g., 902a) is looking in the seventh direction at the characteristic location of the second participant (e.g., 602b) without modifying (e.g., 914a2) a representation of the gaze direction of the first participant (e.g., 602a) in the second video conference user interface to indicate, in the second video conference user interface (e.g., 614) for the second participant, that the first participant is looking in the second direction at the characteristic location of the second participant (and without modifying a representation of a gaze direction of the fourth participant in the third video conference user interface to indicate, in the third video conference user interface for the third participant, that the fourth participant is looking at the third participant).

In some embodiments, in response to obtaining the information about the gaze of the first participant, the computer system provides information that indicates which characteristic location of another participant the first participant is looking at to the one or more devices displaying representations of the video conference to enable video conference user interfaces at the one or more devices to indicate at which characteristic location of another participant the first participant is looking includes, in accordance with the determination the first set of criteria is satisfied: modifying the representation (e.g., 614*a*) of the gaze direction of the first participant in the second video conference user interface (e.g., 614) to indicate, in the second video conference user interface for the second participant, that the first participant is looking in the second direction at the characteristic location of the second participant includes applying a first modification (e.g., changing the eye position of a representation of a participant, changing the head position of a representation of a participant, changing a position of the representation of a participant, changing the highlighting of representation of a participant, changing the text of representation of a participant, changing the location of the representation of the participant, changing a visual indication of the representation of the participant that is displayed on another representation of a participant); and modifying a representation (e.g., 616*a*) of the gaze direction of the first participant in the third video conference user interface (e.g., 616) to indicate, in the third video conference user interface for the third participant, that the first participant is looking in the third direction at the characteristic location of the second participant in the third video conference user interface, where modifying the representation of the gaze direction of the first participant in the third video conference user interface includes applying a second modification different from the first modification (e.g., changing the eye position of a representation of a participant, changing the head position of a representation of a participant, changing a position of the representation of a participant, changing the highlighting of representation of a participant, changing the text of representation of a participant, changing the location of the representation of the participant, changing a visual indication of the representation of the participant that is displayed on another representation of a participant) that is different from the first modification (e.g., second modification includes a change in eye/head in a direction that is different the change in eye/head direction included in the first modification).

In some embodiments, the representation (e.g., 614*a*, 616*a*, indicated by 1120) of the gaze direction of the first participant includes a computer-generated (e.g., created by a computer system/device using one or more captured images) three-dimensional graphical representation. In some embodiments, modifying the representation of the gaze direction of the first participant in the second video conference user interface to indicate, in the second video conference user interface for the second participant, that the first participant is looking in the second direction at the characteristic location of the second participant includes manipulating live media (e.g., video, photo media) of the first participant to include a three-dimensional representation, where the head, eyes, body of the first participant in the three-dimensional representation has been changed (e.g., positioned differently, manipulated in three-dimensional space) from the head, eyes, body of the first participant that were actually captured in the live media. In some embodiments, the computer-generated three-dimensional representation is generated from an image of the face of a participant that has been taken from a particular angle. In some embodiments, the computer-generated three-dimensional graphical representation could be a three-dimensional graphical representation that is displayed in a virtual reality and/or augmented reality environment (or context). In some embodiments, the computer system (and/or one or more of the computer systems displaying the first video conference interface, the second video conference interface, and/or the third video conference interface) is a head-mounted display device displaying a virtual reality and/or augmented reality environment that includes the three-dimensional graphical representation. Modifying a representation of the first participant that includes a three-dimensional graphical representation allows a user (e.g., a second participant) to quickly identify where the first participant is looking in three-dimensional space. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first video conference user interface (e.g., 612) includes a representation (e.g., 612*b*) of the second participant (e.g., 602*b*). In some embodiments, in response to obtaining the information about the gaze (e.g., 620*a*, 622*a*, 624*a*, 626*a*, 628*a*, 632*a*, 634*a*, 636*a*, 640*a*) of the first participant (e.g., 602*a*), the computer system provides information that indicates which characteristic location of another participant the first participant is looking at to the one or more devices displaying representations of the video conference to enable video conference user interfaces at the one or more devices to indicate at which characteristic location of another participant the first participant is looking. In some embodiments, indicating which characteristic location of (e.g., a viewpoint of or a graphical representation of) another participant the first participant is looking at includes, in accordance with the determination the first set of criteria is satisfied, visually distinguishing the representation (e.g., 612*b*) (e.g., a graphical representation (e.g., text, image, video, etc.)) of the second participant (e.g., displayed at the characteristic location of the second participant in the first video conference user interface for the first participant), included in the first video conference user interface (e.g., 612) for the first participant (e.g., 602*a*) (e.g., increasing/decreasing the size of a representation, changing location of a representation (e.g., in a respective user interface), highlighting/ceasing to highlight a representation, changing color of a representation, emphasizing/de-emphasizing a representation relative to other representations and/or user interface objects) (e.g., visually distinguishing the representation of the second participant, included in the first video conference user interface for the first participant, from one or more representations of other participants in the first video user interface for the first participant). In some embodiments, in accordance with the determination the first set of criteria is satisfied, the representation of the second participant included in the third video conference user interface for the third participant is visually distinguished (and, in some embodiments, the representation of the second participant included in the third video conference user interface for the third participant is distinguished in the same way as the representation of the second participant included in the first video conference user interface for the first participant). Providing information that visually distinguishing the representation, included in the first video conference user interface for the first participant when the first set of criteria is satisfied allows a user (e.g., first participant) to quickly recognize that the first participant is looking at the second participant. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second video conference user interface (e.g., 614) includes a representation (e.g., 614a) of the first participant (e.g., 602a) (e.g., a graphical representation (e.g., text, image, video, etc.) displayed at the characteristic location of the first participant in the second video conference user interface for the second participant). In some embodiments, modifying the representation (e.g., 614a) of the gaze direction of the first participant in the second video conference user interface (e.g., 614) to indicate, in the second video conference user interface for the second participant, that the first participant is looking in the second direction at the characteristic location of the second participant includes visually distinguishing the representation of the first participant (602a), included in the second video conference user interface (e.g., 614) for the second participant (e.g., 602b) (e.g., increasing/decreasing the size of a representation, changing location of a representation (e.g., in a respective user interface), highlighting/ceasing to highlight a representation, changing color of a representation, emphasizing/de-emphasizing a representation relative to other representations and/or user interface objects) (e.g., visually distinguishing the representation of the first participant, included in the second video conference user interface for the second participant, from one or more representations of other participants in the second video user interface for the second participant). In some embodiments, in accordance with the determination the first set of criteria is satisfied, the representation of the first participant included in the third video conference user interface for the third participant is visually distinguished (and, in some embodiments, the representation of the first participant included in the third video conference user interface for the third participant is distinguished in the same way as the representation of the first participant included in the second video conference user interface for the second participant). Providing information that visually distinguishes the representation of the first participant, included in the second video conference user interface for the second participant when the first set of criteria is satisfied allows a user (e.g., second participant) to quickly recognize that the first participant is looking at the second participant. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with the determination that the first set of criteria is satisfied (and in response to obtaining the information about the gaze of the first participant, the computer system provides information that indicates which characteristic location of another participant the first participant is looking at to the one or more devices displaying representations of the video conference to enable video conference user interfaces at the one or more devices to indicate at which characteristic location of another participant the first participant is looking includes), modifying the representation (e.g., 616a) of the gaze direction of the first participant (e.g., 602a) in the third video conference user interface (e.g., 616) to indicate, in the third video conference user interface for the third participant, that the first participant is looking in the third direction at the characteristic location of the second participant in the third video conference user interface, where modifying the representation of the gaze direction of the first participant in the third video conference user interface includes: displaying, in the third video conference user interface (e.g., 616), a representation (e.g., 692b, 692c, 692a) (e.g., a name, a face, a color associated with the first participant, an icon associated with the first participant) of the first participant adjacent to (e.g., on top of) a representation of the second participant that is displayed at the characteristic location of the second participant in the third video conference user interface. In some embodiments, the representation of the first participant that is displayed adjacent to the representation of the second participant is smaller than the representation of the second participant. In some embodiments, the representation of the first participant that is displayed adjacent to the representation of the second participant is a non-live representation (e.g., a still image, text, visual indication, non-animated) while the representation of the second participant is a live representation (e.g., live video (a live video stream)) (e.g., on the third video conference user interface). In some embodiments, a second representation of the first participant is displayed concurrently with the representation of the first participant that is displayed adjacent to the representation of the second participant (e.g., on the third video conference user interface). In some embodiments, the second representation of the first participant is bigger than the representation of the first participant that is displayed adjacent to the representation of the second participant (e.g., on the third video conference user interface). In some embodiments, the second representation of the first participant is not displayed adjacent to a representation of a participant (e.g., on the third video conference user interface). In some embodiments, the second representation of the first participant was displayed before the representation of the first participant that is displayed adjacent to the second representation of the second participant (e.g., on the third video conference user interface). In some embodiments, the representation of the first participant continues to be displayed after the representation of the first participant that is displayed adjacent to the representation of the second participant ceases to be displayed (e.g., on the third video conference user interface). Providing information that causes the display of, in the third video conference user interface, a representation of the first participant adjacent to be a representation of the second participant that is displayed at the characteristic location of the second participant in the third video conference user interface allows a user to quickly recognize that the first participant is looking at the second participant and/or vice-versa. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to obtaining the information about the gaze (e.g., 636a) of the first participant (e.g., 602a), the computer system provides information that indicates which characteristic location of another participant the first participant is looking at to the one or more devices (e.g., 600a, 600b, 600c) displaying representations of the video conference to enable video conference user interfaces at the one or more devices to indicate at which characteristic location of another participant the first participant is looking. In some embodiments, indicating which characteristic location of (e.g., a viewpoint of or a graphical representation of) another participant the first participant is looking at includes in accordance with a determination that the first set of criteria is satisfied, moving a representation (e.g., 612b) of the second participant displayed at the characteristic location of (e.g., a viewpoint of or a graphical representation of) the second participant in the first video conference user interface for the first participant closer to a location of a camera of a device that is displaying the first video conference user interface (and/or closer to a location of a predetermined location on the first video conference user interface). In some embodiments, the location of the camera of the device that is displaying the first video conference user interface is adjacent to and/or the closet point, on the display screen of the device that is displaying the second conference user interface, to the location of the camera of the device that is displaying the first video conference user interface. Providing information that moves a representation of the second participant displayed at the characteristic location of the second participant in the first video conference user interface for the first participant closer to a location of a camera of a device that is displaying the first video conference user interface when the first set of criteria is satisfied allows the first participant to quickly identify that the first participant is looking at the second participant. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, modifying the representation (e.g., 614a in FIG. 6J) of the gaze direction of the first participant in the second video conference user interface to indicate, in the second video conference user interface for the second participant, that the first participant is looking in the second direction at the characteristic location of the second participant includes moving a representation (e.g., 614a) of the first participant that is displayed in the second video conference user interface closer to a location of a camera of a device that is displaying the second video conference user interface. In some embodiments, the location of the camera of the device that is displaying the second video conference user interface is adjacent to and/or the closet point, on the display screen of the device that is displaying the second conference user interface, to the location of the camera of the device that is displaying the second video conference user interface. Providing information that moves a representation of the first participant that is displayed in the second video conference user interface closer to a location of a camera of a device that is displaying the second video conference user interface when the first set of criteria is satisfied allows the second participant to quickly identify that the first participant is looking at the second participant and positions the second participant's gaze closer to the position of the camera when the second participant is looking at the representation of the first participant in the second video conference user interface. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, before obtaining information about the gaze of the first participant in a video conference and while the first participant, the second participant, and the third participant are participating in the video conference, the second video conference user interface is displayed on a first device (e.g., 600b) that is associated with the second participant and includes a first representation (e.g., 614a) of the first participant in the second video conference user interface (e.g., 614) for the second participant (e.g., 602b). In some embodiments, in response to obtaining the information about the gaze of the first participant and in accordance with a determination that a first set of criteria is satisfied (and, in some embodiments, while the second video conference user interface is displayed on the first device that is associated with the second participant, modifying the representation of the gaze direction of the first participant in the second video conference user interface to indicate, in the second video conference user interface for the second participant, that the first participant is looking in the second direction at the characteristic location of the second participant includes), the computer system causes a second device (e.g., 800d) that is associated with the second participant (e.g., 602b) to display a seventh video conference user interface for the second participant that includes a second representation (e.g., 614d) of the first participant (e.g., 602a) in the seventh video conference user interface for the second participant (e.g., where the second representation of the first participant in the seventh video conference user interface was not displayed before the first set of criteria was satisfied). In some embodiments, the first representation of the first participant ceases to be displayed within a predetermined period of time (e.g., 0-5 seconds) after (or before) the second video conference user interface for the second participant is displayed. In some embodiments, the seventh video conference user interface for the second participant includes less representations of participants than the second video conference user interface for the second participant. In some embodiments, while the second video conference user interface is displayed on the first device that is associated with the second participant and includes the first representation of the first participant in the second video conference user interface for the second participant, a camera of the first device is activated (or is capturing) to capture data (e.g., image data) related to the field-of-view of the camera of the first device (e.g., of the participant using the first device). In some embodiments, in accordance with a determination that a first set of criteria is satisfied (and while the second device is displaying the seventh video conference user interface for the second participant that includes the second representation of the first participant in the seventh video conference user interface for the second participant), a camera of the second device is activated (or is capturing) to capture data (e.g., image data) related to the field-of-view of the camera of the second device (e.g., of the participant using the first device). In some embodiments, in accordance with a determination that a first set of criteria is satisfied (and while the second device is displaying the seventh video conference user interface for the second participant that includes the second representation of the first participant in the seventh video conference user interface for the second participant), the camera of the first device is deactivated and/or not capturing data (e.g., image data) related to the field-of-view of the camera of the first device (e.g., of the participant using the first device) (e.g., while the camera of the second device is activated). Causing a second device that is associated with the second participant to display a seventh video conference user interface for the second participant that includes a second representation of the first participant in the second video conference user interface for the second participant allows a user to quickly identify that a particular participant (e.g., first participant) is looking at the user (e.g., second user). Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation of the gaze is corrected using image manipulation. In some embodiments, the image manipulation involves capturing an image (e.g., via one or more cameras 1100a, 1100b) of a portion of the face a participant and generating a three-dimensional image of the face of the participant from the image.

In some embodiments, the representation of the gaze direction is corrected by selecting a camera (e.g., 1006a-1006h) closet to the representation (e.g., 1010a-1010f) of the participant at which a participant (e.g., 602a) is locking. In some embodiments, the representation of the gaze direction is corrected by capturing one or more images at a camera that is moving towards the representation of the contact at which the participant is looking.

In some embodiments, the participant (e.g., 602a) is a presenter (e.g., indicated by 690). In some embodiments, the participant is a presenter based on movements, audio level being above a threshold level in the video conference. In some embodiments, the representation of the gaze direction of a respective is corrected only when the respective participant is a presenter and/or when the respective is interactive in the communication.

In some embodiments, a computer system displays participant representations (e.g., 714a, 714b, 714c) in a line. In some embodiments, one or more of the participants are displayed on one side of the line that are looking towards a location (e.g., central location) which contains the participant (e.g., presenter) (e.g., to show that those different people are looking at the participant (e.g., presenter) and/or show that the participant is looking at those different participants or in the direction of those different participant, where participant representation for the presenter is in the middle of display).

In some embodiments, a determination is made as to whether (or how often) to correct the representation of the gaze direction of a respective participant based on whether a respective computer system is operating in a certain mode (e.g., in presenter mode, correct gaze irrespective of where the participant is looking and/or do more gaze direction correction; in another mode, do less gaze direction correction).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve multi-participant live communication sessions. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to modify representations of a gaze direction for a respective participant in order to improve multi-participant live communication sessions. Accordingly, use of such personal information data enables users to have calculated control of the personal information that is shared to improve multi-participant live communication sessions. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of multi-participant live communication sessions, the present technology can be configured to allow users to select to "opt in" or "opt out" of participation in the collection of personal information data during registration for services or anytime thereafter. In another example, users can select not to share data associated with the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a representation of gaze for a particular user can be corrected at a system of another user by inferring preferences and/or the gaze direction of the particular user and/or the other user based on non-personal information data or a bare minimum amount of personal information, such as the content being requested by the device associated with a user, other non-personal information available to the multi-participant live communication services, or publicly available information.

What is claimed is:

1. A computer system, comprising:
   one or more processors; and
   memory storing one or more programs configured to be executed by the one or more processors, the one or more programs including instructions for:
     obtaining information about gaze of a first participant in a video conference while the first participant, a second participant, and a third participant are participating in the video conference, wherein:
       in a first video conference user interface for the first participant, a characteristic location of the second participant in the first video conference user interface for the first participant is located in a first direction from a characteristic location of the first participant;
       in a second video conference user interface for the second participant, a characteristic location of the second participant is located in a second direction from a characteristic location of the first participant in the second video conference user interface for the second participant, wherein the second direction is different from the first direction; and
       in a third video conference user interface for the third participant, a characteristic location of the second participant in the third video conference user interface for the third participant is located in a third direction from a characteristic location of the first participant in the third video conference user interface for the third participant, wherein the third direction is different from the first direction; and
     in response to obtaining the information about the gaze of the first participant, providing information that indicates which characteristic location of another participant the first participant is looking at to one or more devices displaying representations of the video conference to enable video conference user interfaces at the one or more devices to indicate at which characteristic location of another participant the first participant is looking, including in accordance with a determination that a first set of criteria is satisfied, wherein the first set of criteria includes a criterion that is satisfied when the first participant is looking in the first direction in the video conference:
       modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface.

2. The computer system of claim 1, wherein:
   in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:
     in accordance with the determination that the first set of criteria is satisfied, modifying the representation of the gaze direction of the first participant in the third video conference user interface to indicate, in the third video conference user interface for the third participant, that the first participant is looking in the third direction at the characteristic location of the second participant in the third video conference user interface.

3. The computer system of claim 1, wherein:
   in the first video conference user interface for the first participant, a characteristic location of the third participant in the first video conference user interface for the first participant is located in a fourth direction from the characteristic location of the first participant;

in the second video conference user interface for the second participant, a characteristic location of the third participant in the second video conference user interface for the second participant is located in a fifth direction from the characteristic location of the first participant in the second video conference user interface for the second participant, wherein the fifth direction is different from the fourth direction;

in the third video conference user interface for the third participant, a characteristic location of the third participant is located in a sixth direction from the characteristic location of the first participant in the third video conference user interface for the third participant, wherein the sixth direction is different from the fourth direction; and in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with a determination that the first participant is looking in the fourth direction in the video conference, modifying the representation of the gaze direction of the first participant in the third video conference user interface to indicate, in the third video conference user interface for the third participant, that the first participant is looking in the sixth direction at the characteristic location of the third participant without modifying the representation of the gaze direction of the first participant in the second video conference user interface to indicate, in the second video conference user interface for the second participant, that the first participant is looking at the second participant.

4. The computer system of claim 3, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with a determination that the first participant is looking in the fourth direction in the video conference, modifying a gaze direction of the first participant in the second video conference user interface to indicate, in the second video conference user interface for the second participant, that the first participant is looking in the fifth direction at the characteristic location of the third participant in the second video conference user interface.

5. The computer system of claim 1, wherein the one or more programs further include:

in response to obtaining information about gaze of the second participant:

providing information that indicates which characteristic location of another participant the second participant is looking at to the one or more devices displaying representations of the video conference to enable video conference user interfaces at the one or more devices to indicate at which characteristic location of another participant the second participant is looking, including in accordance with a determination that the second participant is looking in the second direction:

modifying a representation of a gaze direction of the second participant in the first video conference user interface to indicate, in the first video conference user interface for the first participant, that the second participant is looking at the characteristic location of the first participant without modifying a representation of a gaze direction of the second participant in the third video conference user interface to indicate, in the third video conference user interface for the third participant, that the second participant is looking at the third participant.

6. The computer system of claim 1, wherein the determination that the first participant is looking in the first direction in the video conference is made when the first participant is determined to be looking in one or more directions that correspond to the first direction, and wherein at least one of the one or more directions is different from the first direction.

7. The computer system of claim 1, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate which characteristic location of another participant the first participant is looking includes:

in accordance with a determination that the first participant is looking in a direction of a camera:

modifying a representation of a gaze direction of the first participant in the second video conference user interface to indicate, in the second video conference user interface for the second participant, that the first participant is not looking in the second direction at the characteristic location of the second participant.

8. The computer system of claim 1, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate which characteristic location of another participant the first participant is looking includes:

in accordance with a determination that the first participant is looking in a direction that corresponds to a predefined set of locations of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant; and in accordance with a determination that the first participant is not looking in a direction that corresponds to the predefined set of locations, forgoing modifying the representation of the gaze direction of the first participant in the video conference.

9. The computer system of claim 8, wherein the predefined set of locations includes a plurality of locations on a display screen.

10. The computer system of claim 8, wherein the predefined set of locations includes a plurality of locations on a display screen at which the first video conference user interface for the first participant is displayed and does not include a plurality of locations on the display screen at which the first video conference user interface for the first participant is not displayed.

11. The computer system of claim 1, wherein modifying the representation of the gaze direction of the first participant in the second video conference user interface to indicate, in the second video conference user interface for the second participant, that the first participant is looking in the second direction at the characteristic location of the second participant includes modifying a representation of a head of the first participant and a representation of eyes of the first participant in the second video conference user interface for the second participant.

12. The computer system of claim 1, wherein:
the first participant and a fourth participant are both in a field-of-view of a camera; and
in the second video conference user interface for the second participant, a representation of a direction of gaze of the first participant is adjusted separately from adjustment of a representation of a direction of gaze of the fourth participant.

13. The computer system of claim 12, wherein:
in response to obtaining information about gaze of the fourth participant:
providing information that indicates which characteristic location of another participant the fourth participant is looking at to the one or more devices displaying representations of the video conference to enable video conference user interfaces at the one or more devices to indicate at which characteristic location of another participant the fourth participant is looking, including in accordance with a determination that the fourth participant is looking in the first direction:
modifying a representation of a gaze direction of the fourth participant in the second video conference user interface to indicate, in the second video conference user interface for the second participant, that the fourth participant is looking in a seventh direction at the characteristic location of the second participant without modifying a representation of the gaze direction of the first participant in the second video conference user interface to indicate, in the second video conference user interface for the second participant, that the first participant is looking in the second direction at the characteristic location of the second participant.

14. The computer system of claim 1, wherein:
in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking includes:
in accordance with the determination the first set of criteria is satisfied:
modifying the representation of the gaze direction of the first participant in the second video conference user interface to indicate, in the second video conference user interface for the second participant, that the first participant is looking in the second direction at the characteristic location of the second participant includes applying a first modification; and
modifying a representation of the gaze direction of the first participant in the third video conference user interface to indicate, in the third video conference user interface for the third participant, that the first participant is looking in the third direction at the characteristic location of the second participant in the third video conference user interface, where modifying the representation of the gaze direction of the first participant in the third video conference user interface includes applying a second modification different from the first modification that is different from the first modification.

15. The computer system of claim 1, wherein the representation of the gaze direction of the first participant includes a computer-generated three-dimensional graphical representation.

16. The computer system of claim 1, wherein:
the first video conference user interface includes a representation of the second participant; and
in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:
in accordance with the determination the first set of criteria is satisfied, visually distinguishing the representation of the second participant, included in the first video conference user interface for the first participant.

17. The computer system of claim 1, wherein:
the second video conference user interface includes a representation of the first participant; and
modifying the representation of the gaze direction of the first participant in the second video conference user interface to indicate, in the second video conference user interface for the second participant, that the first participant is looking in the second direction at the characteristic location of the second participant includes visually distinguishing the representation of the first participant, included in the second video conference user interface for the second participant.

18. The computer system of claim 1, wherein:
in accordance with the determination that the first set of criteria is satisfied:
modifying the representation of the gaze direction of the first participant in the third video conference user interface to indicate, in the third video conference user interface for the third participant, that the first participant is looking in the third direction at the characteristic location of the second participant in the third video conference user interface, wherein modifying the representation of the gaze direction of the first participant in the third video conference user interface includes:
displaying, in the third video conference user interface, a representation of the first participant adjacent to a representation of the second participant that is displayed at the characteristic location of the second participant in the third video conference user interface.

19. The computer system of claim 1, wherein:
in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:
in accordance with a determination that the first set of criteria is satisfied, moving a representation of the second participant displayed at the characteristic location of the second participant in the first video conference user interface for the first participant closer to a location of a camera of a device that is displaying the first video conference user interface.

20. The computer system of claim 1, wherein:
modifying the representation of the gaze direction of the first participant in the second video conference user interface to indicate, in the second video conference user interface for the second participant, that the first participant is looking in the second direction at the characteristic location of the second participant includes moving a representation of the first participant that is displayed in the second video conference user interface closer to a location of a camera of a device that is displaying the second video conference user interface.

21. The computer system of claim 1, wherein:
before obtaining information about the gaze of the first participant in a video conference and while the first participant, the second participant, and the third participant are participating in the video conference, the second video conference user interface is displayed on a first device that is associated with the second participant and includes a first representation of the first participant in the second video conference user interface for the second participant, the one or more programs further including instructions for:
in response to obtaining the information about the gaze of the first participant:
in accordance with a determination that a first set of criteria is satisfied, causing a second device that is associated with the second participant to display a seventh video conference user interface for the second participant that includes a second representation of the first participant in the seventh video conference user interface for the second participant.

22. A non-transitory computer-readable storage medium storing one or more programs configured to be executed by one or more processors of a computer system, the one or more programs including instructions for:
obtaining information about gaze of a first participant in a video conference while the first participant, a second participant, and a third participant are participating in the video conference, wherein:
in a first video conference user interface for the first participant, a characteristic location of the second participant in the first video conference user interface for the first participant is located in a first direction from a characteristic location of the first participant;
in a second video conference user interface for the second participant, a characteristic location of the second participant is located in a second direction from a characteristic location of the first participant in the second video conference user interface for the second participant, wherein the second direction is different from the first direction; and
in a third video conference user interface for the third participant, a characteristic location of the second participant in the third video conference user interface for the third participant is located in a third direction from a characteristic location of the first participant in the third video conference user interface for the third participant, wherein the third direction is different from the first direction; and
in response to obtaining the information about the gaze of the first participant, providing information that indicates which characteristic location of another participant the first participant is looking at to one or more devices displaying representations of the video conference to enable video conference user interfaces at the one or more devices to indicate at which characteristic location of another participant the first participant is looking, including in accordance with a determination that a first set of criteria is satisfied, wherein the first set of criteria includes a criterion that is satisfied when the first participant is looking in the first direction in the video conference:
modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface.

23. A method, comprising:
at a computer system:
obtaining information about gaze of a first participant in a video conference while the first participant, a second participant, and a third participant are participating in the video conference, wherein:
in a first video conference user interface for the first participant, a characteristic location of the second participant in the first video conference user interface for the first participant is located in a first direction from a characteristic location of the first participant;

in a second video conference user interface for the second participant, a characteristic location of the second participant is located in a second direction from a characteristic location of the first participant in the second video conference user interface for the second participant, wherein the second direction is different from the first direction; and in a third video conference user interface for the third participant, a characteristic location of the second participant in the third video conference user interface for the third participant is located in a third direction from a characteristic location of the first participant in the third video conference user interface for the third participant, wherein the third direction is different from the first direction; and in response to obtaining the information about the gaze of the first participant, providing information that indicates which characteristic location of another participant the first participant is looking at to one or more devices displaying representations of the video conference to enable video conference user interfaces at the one or more devices to indicate at which characteristic location of another participant the first participant is looking, including in accordance with a determination that a first set of criteria is satisfied, wherein the first set of criteria includes a criterion that is satisfied when the first participant is looking in the first direction in the video conference:

modifying a representation of a gaze direction of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate.

24. The non-transitory computer-readable storage medium of claim 22, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with the determination that the first set of criteria is satisfied, modifying the representation of the gaze direction of the first participant in the third video conference user interface to indicate, in the third video conference user interface for the third participant, that the first participant is looking in the third direction at the characteristic location of the second participant in the third video conference user interface.

25. The non-transitory computer-readable storage medium of claim 22, wherein:

in the first video conference user interface for the first participant, a characteristic location of the third participant in the first video conference user interface for the first participant is located in a fourth direction from the characteristic location of the first participant;

in the second video conference user interface for the second participant, a characteristic location of the third participant in the second video conference user interface for the second participant is located in a fifth direction from the characteristic location of the first participant in the second video conference user interface for the second participant, wherein the fifth direction is different from the fourth direction;

in the third video conference user interface for the third participant, a characteristic location of the third participant is located in a sixth direction from the characteristic location of the first participant in the third video conference user interface for the third participant, wherein the sixth direction is different from the fourth direction; and in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with a determination that the first participant is looking in the fourth direction in the video conference, modifying the representation of the gaze direction of the first participant in the third video conference user interface to indicate, in the third video conference user interface for the third participant, that the first participant is looking in the sixth direction at the characteristic location of the third participant without modifying the representation of the gaze direction of the first participant in the second video conference user interface to indicate, in the second video conference user interface for the second participant, that the first participant is looking at the second participant.

26. The non-transitory computer-readable storage medium of claim 25, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with a determination that the first participant is looking in the fourth direction in the video conference, modifying a gaze direction of the first participant in the second video conference user interface to indicate, in the second video conference user interface for the second participant, that the first participant is looking in the fifth direction at the characteristic location of the third participant in the second video conference user interface.

27. The non-transitory computer-readable storage medium of claim 22, wherein the one or more programs further include:

in response to obtaining information about gaze of the second participant:
  providing information that indicates which characteristic location of another participant the second participant is looking at to the one or more devices displaying representations of the video conference to enable video conference user interfaces at the one or more devices to indicate at which characteristic location of another participant the second participant is looking, including in accordance with a determination that the second participant is looking in the second direction:
    modifying a representation of a gaze direction of the second participant in the first video conference user interface to indicate, in the first video conference user interface for the first participant, that the second participant is looking at the characteristic location of the first participant without modifying a representation of a gaze direction of the second participant in the third video conference user interface to indicate, in the third video conference user interface for the third participant, that the second participant is looking at the third participant.

28. The non-transitory computer-readable storage medium of claim 22, wherein the determination that the first participant is looking in the first direction in the video conference is made when the first participant is determined to be looking in one or more directions that correspond to the first direction, and wherein at least one of the one or more directions is different from the first direction.

29. The non-transitory computer-readable storage medium of claim 22, wherein:
  in response to obtaining the information about the gaze of the first participant, providing information that indicates which characteristic location of another participant the first participant is looking at to the one or more devices displaying representations of the video conference to enable video conference user interfaces at the one or more devices to indicate which characteristic location of another participant the first participant is looking includes:
    in accordance with a determination that the first participant is looking in a direction of a camera:
      modifying a representation of a gaze direction of the first participant in the second video conference user interface to indicate, in the second video conference user interface for the second participant, that the first participant is not looking in the second direction at the characteristic location of the second participant.

30. The non-transitory computer-readable storage medium of claim 22, wherein:
  in response to obtaining the information about the gaze of the first participant, providing information that indicates which characteristic location of another participant the first participant is looking at to the one or more devices displaying representations of the video conference to enable video conference user interfaces at the one or more devices to indicate which characteristic location of another participant the first participant is looking includes:
    in accordance with a determination that the first participant is looking in a direction that corresponds to a predefined set of locations of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant; and
    in accordance with a determination that the first participant is not looking in a direction that corresponds to the predefined set of locations, forgoing modifying the representation of the gaze direction of the first participant in the video conference.

31. The non-transitory computer-readable storage medium of claim 22, wherein modifying the representation of the gaze direction of the first participant in the second video conference user interface to indicate, in the second video conference user interface for the second participant, that the first participant is looking in the second direction at the characteristic location of the second participant includes modifying a representation of a head of the first participant and a representation of eyes of the first participant in the second video conference user interface for the second participant.

32. The non-transitory computer-readable storage medium of claim 22, wherein:
  the first participant and a fourth participant are both in a field-of-view of a camera; and
  in the second video conference user interface for the second participant, a representation of a direction of gaze of the first participant is adjusted separately from adjustment of a representation of a direction of gaze of the fourth participant.

33. The non-transitory computer-readable storage medium of claim 32, wherein:
  in response to obtaining information about gaze of the fourth participant:
    providing information that indicates which characteristic location of another participant the fourth participant is looking at to the one or more devices displaying representations of the video conference to enable video conference user interfaces at the one or more devices to indicate at which characteristic location of another participant the fourth participant is looking, including in accordance with a determination that the fourth participant is looking in the first direction:
    modifying a representation of a gaze direction of the fourth participant in the second video conference user interface to indicate, in the second video conference user interface for the second participant, that the fourth participant is looking in a seventh direction at the characteristic location of the second participant without modifying a representation of the gaze direction of the first participant in the second video conference user interface to indicate, in the second video conference user interface for the second participant, that the first participant is looking in the second direction at the characteristic location of the second participant.

34. The non-transitory computer-readable storage medium of claim 22, wherein:
  in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking includes:

in accordance with the determination the first set of criteria is satisfied:

modifying the representation of the gaze direction of the first participant in the second video conference user interface to indicate, in the second video conference user interface for the second participant, that the first participant is looking in the second direction at the characteristic location of the second participant includes applying a first modification; and modifying a representation of the gaze direction of the first participant in the third video conference user interface to indicate, in the third video conference user interface for the third participant, that the first participant is looking in the third direction at the characteristic location of the second participant in the third video conference user interface, where modifying the representation of the gaze direction of the first participant in the third video conference user interface includes applying a second modification different from the first modification that is different from the first modification.

35. The non-transitory computer-readable storage medium of claim 22, wherein the representation of the gaze direction of the first participant includes a computer-generated three-dimensional graphical representation.

36. The non-transitory computer-readable storage medium of claim 22, wherein:

in accordance with the determination that the first set of criteria is satisfied:

modifying the representation of the gaze direction of the first participant in the third video conference user interface to indicate, in the third video conference user interface for the third participant, that the first participant is looking in the third direction at the characteristic location of the second participant in the third video conference user interface, wherein modifying the representation of the gaze direction of the first participant in the third video conference user interface includes:

displaying, in the third video conference user interface, a representation of the first participant adjacent to a representation of the second participant that is displayed at the characteristic location of the second participant in the third video conference user interface.

37. The non-transitory computer-readable storage medium of claim 22, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with a determination that the first set of criteria is satisfied, moving a representation of the second participant displayed at the characteristic location of the second participant in the first video conference user interface for the first participant closer to a location of a camera of a device that is displaying the first video conference user interface.

38. The non-transitory computer-readable storage medium of claim 22, wherein:

modifying the representation of the gaze direction of the first participant in the second video conference user interface to indicate, in the second video conference user interface for the second participant, that the first participant is looking in the second direction at the characteristic location of the second participant includes moving a representation of the first participant that is displayed in the second video conference user interface closer to a location of a camera of a device that is displaying the second video conference user interface.

39. The non-transitory computer-readable storage medium of claim 22, wherein:

before obtaining information about the gaze of the first participant in a video conference and while the first participant, the second participant, and the third participant are participating in the video conference, the second video conference user interface is displayed on a first device that is associated with the second participant and includes a first representation of the first participant in the second video conference user interface for the second participant, the one or more programs further including instructions for:

in response to obtaining the information about the gaze of the first participant:

in accordance with a determination that a first set of criteria is satisfied, causing a second device that is associated with the second participant to display a seventh video conference user interface for the second participant that includes a second representation of the first participant in the seventh video conference user interface for the second participant.

40. The method of claim 23, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with the determination that the first set of criteria is satisfied, modifying the representation of the gaze direction of the first participant in the third video conference user interface to indicate, in the third video conference user interface for the third participant, that the first participant is looking in the third direction at the characteristic location of the second participant in the third video conference user interface.

41. The method of claim 23, wherein:

in the first video conference user interface for the first participant, a characteristic location of the third participant in the first video conference user interface for the first participant is located in a fourth direction from the characteristic location of the first participant;

in the second video conference user interface for the second participant, a characteristic location of the third participant in the second video conference user interface for the second participant is located in a fifth direction from the characteristic location of the first participant in the second video conference user interface for the second participant, wherein the fifth direction is different from the fourth direction;

in the third video conference user interface for the third participant, a characteristic location of the third participant is located in a sixth direction from the characteristic location of the first participant in the third video conference user interface for the third participant, wherein the sixth direction is different from the fourth direction; and in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with a determination that the first participant is looking in the fourth direction in the video conference, modifying the representation of the gaze direction of the first participant in the third video conference user interface to indicate, in the third video conference user interface for the third participant, that the first participant is looking in the sixth direction at the characteristic location of the third participant without modifying the representation of the gaze direction of the first participant in the second video conference user interface to indicate, in the second video conference user interface for the second participant, that the first participant is looking at the second participant.

42. The method of claim 41, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:

in accordance with a determination that the first participant is looking in the fourth direction in the video conference, modifying a gaze direction of the first participant in the second video conference user interface to indicate, in the second video conference user interface for the second participant, that the first participant is looking in the fifth direction at the characteristic location of the third participant in the second video conference user interface.

43. The method of claim 23, wherein the method further comprises:

in response to obtaining information about gaze of the second participant:

providing information that indicates which characteristic location of another participant the second participant is looking at to the one or more devices displaying representations of the video conference to enable video conference user interfaces at the one or more devices to indicate at which characteristic location of another participant the second participant is looking, including in accordance with a determination that the second participant is looking in the second direction:

modifying a representation of a gaze direction of the second participant in the first video conference user interface to indicate, in the first video conference user interface for the first participant, that the second participant is looking at the characteristic location of the first participant without modifying a representation of a gaze direction of the second participant in the third video conference user interface to indicate, in the third video conference user interface for the third participant, that the second participant is looking at the third participant.

44. The method of claim 23, wherein the determination that the first participant is looking in the first direction in the video conference is made when the first participant is determined to be looking in one or more directions that correspond to the first direction, and wherein at least one of the one or more directions is different from the first direction.

45. The method of claim 23, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate which characteristic location of another participant the first participant is looking includes:

in accordance with a determination that the first participant is looking in a direction of a camera:

modifying a representation of a gaze direction of the first participant in the second video conference user interface to indicate, in the second video conference user interface for the second participant, that the first participant is not looking in the second direction at the characteristic location of the second participant.

46. The method of claim 23, wherein:

in response to obtaining the information about the gaze of the first participant, providing information that indicates which characteristic location of another participant the first participant is looking at to the one or more devices displaying representations of the video conference to enable video conference user interfaces at the one or more devices to indicate which characteristic location of another participant the first participant is looking includes:

in accordance with a determination that the first participant is looking in a direction that corresponds to a predefined set of locations of the first participant in the second video conference user interface to indicate, in the second video conference user interface for the second participant, that the first participant is looking in the second direction at the characteristic location of the second participant without modifying a representation of a gaze direction of the first participant in the third video conference user interface to indicate, in the third video conference user interface for the third participant, that the first participant is looking at the third participant; and in accordance with a determination that the first participant is not looking in a direction that corresponds to the predefined set of locations, forgoing modifying the representation of the gaze direction of the first participant in the video conference.

47. The method of claim 23, wherein modifying the representation of the gaze direction of the first participant in the second video conference user interface to indicate, in the second video conference user interface for the second participant, that the first participant is looking in the second direction at the characteristic location of the second participant includes modifying a representation of a head of the first participant and a representation of eyes of the first participant in the second video conference user interface for the second participant.

48. The method of claim 23, wherein:
the first participant and a fourth participant are both in a field-of-view of a camera; and
in the second video conference user interface for the second participant, a representation of a direction of gaze of the first participant is adjusted separately from adjustment of a representation of a direction of gaze of the fourth participant.

49. The method of claim 48, wherein:
in response to obtaining information about gaze of the fourth participant:
providing information that indicates which characteristic location of another participant the fourth participant is looking at to the one or more devices displaying representations of the video conference to enable video conference user interfaces at the one or more devices to indicate at which characteristic location of another participant the fourth participant is looking, including in accordance with a determination that the fourth participant is looking in the first direction:
modifying a representation of a gaze direction of the fourth participant in the second video conference user interface to indicate, in the second video conference user interface for the second participant, that the fourth participant is looking in a seventh direction at the characteristic location of the second participant without modifying a representation of the gaze direction of the first participant in the second video conference user interface to indicate, in the second video conference user interface for the second participant, that the first participant is looking in the second direction at the characteristic location of the second participant.

50. The method of claim 23, wherein:
in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking includes:
in accordance with the determination the first set of criteria is satisfied:
modifying the representation of the gaze direction of the first participant in the second video conference user interface to indicate, in the second video conference user interface for the second participant, that the first participant is looking in the second direction at the characteristic location of the second participant includes applying a first modification; and
modifying a representation of the gaze direction of the first participant in the third video conference user interface to indicate, in the third video conference user interface for the third participant, that the first participant is looking in the third direction at the characteristic location of the second participant in the third video conference user interface, where modifying the representation of the gaze direction of the first participant in the third video conference user interface includes applying a second modification different from the first modification that is different from the first modification.

51. The method of claim 23, wherein the representation of the gaze direction of the first participant includes a computer-generated three-dimensional graphical representation.

52. The method of claim 23, wherein:
in accordance with the determination that the first set of criteria is satisfied:
modifying the representation of the gaze direction of the first participant in the third video conference user interface to indicate, in the third video conference user interface for the third participant, that the first participant is looking in the third direction at the characteristic location of the second participant in the third video conference user interface, wherein modifying the representation of the gaze direction of the first participant in the third video conference user interface includes:
displaying, in the third video conference user interface, a representation of the first participant adjacent to a representation of the second participant that is displayed at the characteristic location of the second participant in the third video conference user interface.

53. The method of claim 23, wherein:
in response to obtaining the information about the gaze of the first participant, providing information that indicates which characteristic location of another participant the first participant is looking at to the one or more devices displaying representations of the video conference to enable video conference user interfaces at the one or more devices to indicate at which characteristic location of another participant the first participant is looking, wherein indicating which characteristic location of another participant the first participant is looking at includes:
in accordance with a determination that the first set of criteria is satisfied, moving a representation of the second participant displayed at the characteristic location of the second participant in the first video conference user interface for the first participant closer to a location of a camera of a device that is displaying the first video conference user interface.

54. The method of claim 23, wherein:
modifying the representation of the gaze direction of the first participant in the second video conference user interface to indicate, in the second video conference user interface for the second participant, that the first participant is looking in the second direction at the characteristic location of the second participant includes moving a representation of the first participant that is displayed in the second video conference user interface closer to a location of a camera of a device that is displaying the second video conference user interface.

55. The method of claim 23, wherein:
before obtaining information about the gaze of the first participant in a video conference and while the first participant, the second participant, and the third participant are participating in the video conference, the second video conference user interface is displayed on a first device that is associated with the second participant and includes a first representation of the first participant in the second video conference user interface for the second participant, the method further comprising:
  in response to obtaining the information about the gaze of the first participant:
    in accordance with a determination that a first set of criteria is satisfied, causing a second device that is associated with the second participant to display a seventh video conference user interface for the second participant that includes a second representation of the first participant in the seventh video conference user interface for the second participant.

* * * * *

UNITED STATES PATENT AND TRADEMARK OFFICE
CERTIFICATE OF CORRECTION

PATENT NO. : 12,170,579 B2
APPLICATION NO. : 17/684843
DATED : December 17, 2024
INVENTOR(S) : Adam Stern Meyer et al.

Page 1 of 1

It is certified that error appears in the above-identified patent and that said Letters Patent is hereby corrected as shown below:

In the Claims

In Column 79, Lines 39-40, Claim 23, delete "interface to indicate." and insert -- interface. --, therefor.

Signed and Sealed this
First Day of April, 2025

Coke Morgan Stewart
*Acting Director of the United States Patent and Trademark Office*